United States Patent
Fichera

(10) Patent No.: US 12,376,606 B2
(45) Date of Patent: Aug. 5, 2025

(54) PROVIDING SINGLE SERVINGS OF COOLED FOODS AND DRINKS

(71) Applicant: ColdSnap, Corp., Billerica, MA (US)

(72) Inventor: Benjamin Fichera, Newburyport, MA (US)

(73) Assignee: ColdSnap, Corp., Billerica, MA (US)

( * ) Notice: Subject to any disclaimer, the term of this patent is extended or adjusted under 35 U.S.C. 154(b) by 0 days.

(21) Appl. No.: 18/134,809

(22) Filed: Apr. 14, 2023

(65) Prior Publication Data

US 2023/0248017 A1  Aug. 10, 2023

Related U.S. Application Data

(63) Continuation of application No. 17/947,569, filed on Sep. 19, 2022, now Pat. No. 11,627,747, which is a continuation of application No. 17/845,545, filed on Jun. 21, 2022, now Pat. No. 11,490,636, which is a continuation of application No. 16/459,388, filed on
(Continued)

(51) Int. Cl.
| | |
|---|---|
| A23G 9/28 | (2006.01) |
| A23G 9/08 | (2006.01) |
| A23G 9/22 | (2006.01) |
| B65D 85/804 | (2006.01) |
| C09K 5/04 | (2006.01) |
| F25B 13/00 | (2006.01) |
| F25B 41/20 | (2021.01) |
| F25B 41/24 | (2021.01) |
| F25B 47/02 | (2006.01) |

(52) U.S. Cl.
CPC .......... *A23G 9/28* (2013.01); *A23G 9/08* (2013.01); *A23G 9/22* (2013.01); *B65D 85/8055* (2020.05); *C09K 5/042* (2013.01); *F25B 13/00* (2013.01); *F25B 41/20* (2021.01); *F25B 41/24* (2021.01); *F25B 47/022* (2013.01); *C09K 2205/12* (2013.01); *F25B 2347/02* (2013.01); *F25B 2600/2501* (2013.01)

(58) Field of Classification Search
CPC ........ F25B 41/20; F25B 41/24; F25B 41/385; F25B 13/00; F25B 47/022; F25B 2347/02; F25B 2600/2501; A23G 9/08; A23G 9/28; A23G 9/22; C09K 5/042; C09K 2205/12
See application file for complete search history.

(56) References Cited

U.S. PATENT DOCUMENTS

| | | |
|---|---|---|
| 1,438,523 A | 12/1922 | Duren |
| 1,555,701 A | 9/1925 | Prichard et al. |

(Continued)

FOREIGN PATENT DOCUMENTS

| | | |
|---|---|---|
| CN | 1517647 | 8/2004 |
| CN | 1894154 | 1/2007 |

(Continued)

OTHER PUBLICATIONS

JP Office Action in Japanese Appln. No. 2021178427, mailed on Aug. 17, 2023, 9 pages (with English translation).

(Continued)

*Primary Examiner* — Miguel A Diaz
(74) *Attorney, Agent, or Firm* — Fish & Richardson P.C.

(57) ABSTRACT

Systems and methods have demonstrated the capability of rapidly cooling the contents of pods containing the ingredients for food and drinks.

41 Claims, 32 Drawing Sheets

Related U.S. Application Data

Jul. 1, 2019, now Pat. No. 11,470,855, which is a continuation-in-part of application No. 16/104,758, filed on Aug. 17, 2018, now Pat. No. 10,334,868.

(60) Provisional application No. 62/831,657, filed on Apr. 9, 2019, provisional application No. 62/831,646, filed on Apr. 9, 2019, provisional application No. 62/831,666, filed on Apr. 9, 2019, provisional application No. 62/831,600, filed on Apr. 9, 2019, provisional application No. 62/801,587, filed on Feb. 5, 2019, provisional application No. 62/758,110, filed on Nov. 9, 2018.

(56) References Cited

U.S. PATENT DOCUMENTS

| | | |
|---|---|---|
| 1,944,114 A | 1/1934 | Skowlund |
| 2,350,534 A | 6/1944 | Rosinger |
| 2,506,101 A | 5/1950 | Oltz |
| 2,518,758 A | 8/1950 | Cook |
| 2,541,814 A | 2/1951 | Gaddini |
| 2,577,916 A | 12/1951 | Rollman |
| 3,061,280 A | 10/1962 | Kraft et al. |
| 3,393,900 A | 7/1968 | Wagner et al. |
| 3,635,147 A | 1/1972 | Lee |
| 3,896,959 A | 7/1975 | Roy |
| 3,914,673 A | 10/1975 | Wallin |
| 3,951,289 A | 4/1976 | Landen |
| 4,110,476 A | 8/1978 | Rhodes |
| 4,162,855 A | 7/1979 | Bender |
| 4,359,283 A | 11/1982 | McClellan |
| 4,408,690 A | 10/1983 | Ferrero |
| 4,535,604 A | 8/1985 | Cavalli et al. |
| 4,538,427 A | 9/1985 | Cavalli |
| 4,563,880 A | 1/1986 | Cipelletti |
| 4,568,192 A | 2/1986 | Kudermann |
| 4,573,329 A | 3/1986 | Cavalli |
| 4,583,863 A | 4/1986 | Pandolfi |
| 4,632,566 A | 12/1986 | Masel et al. |
| 4,635,560 A | 1/1987 | Ballantyne |
| 4,664,529 A | 5/1987 | Cavalli |
| 4,784,866 A | 11/1988 | Wissgott |
| 4,784,886 A | 11/1988 | Wissgott |
| 4,796,440 A | 1/1989 | Shiotani et al. |
| 4,827,732 A | 5/1989 | Suyama et al. |
| 4,885,917 A | 12/1989 | Spector |
| 4,910,972 A | 3/1990 | Jaster |
| 4,913,645 A | 4/1990 | Daouse et al. |
| 4,926,390 A | 5/1990 | Murzsa |
| 4,993,238 A | 2/1991 | Inagaki |
| 5,203,492 A | 4/1993 | Schellenberg |
| 5,264,237 A | 11/1993 | Traitler et al. |
| 5,331,820 A | 7/1994 | Faries et al. |
| 5,343,710 A | 9/1994 | Cathenaut et al. |
| 5,363,746 A | 11/1994 | Gordon |
| 5,435,143 A | 7/1995 | Heinrich |
| 5,447,036 A | 9/1995 | Heinrich |
| 5,533,800 A | 7/1996 | Stiegelmann et al. |
| 5,549,042 A | 8/1996 | Bukoschek et al. |
| 5,556,659 A | 9/1996 | De Pedro et al. |
| 5,568,729 A | 10/1996 | Heinrich et al. |
| 5,571,282 A | 11/1996 | Earle |
| 5,603,965 A | 2/1997 | Daouse |
| 5,653,118 A * | 8/1997 | Cocchi .......... A23G 9/045 62/197 |
| 5,692,633 A | 12/1997 | Gordon |
| 5,823,675 A | 10/1998 | Myerly |
| 5,834,739 A | 11/1998 | Lockwood et al. |
| 5,839,292 A * | 11/1998 | Hwang .......... F25B 41/20 62/278 |
| 5,843,512 A | 12/1998 | Daouse et al. |
| 5,879,731 A | 3/1999 | Beckett et al. |
| 5,888,562 A | 3/1999 | Hansen et al. |
| 5,888,567 A | 3/1999 | Daouse |
| 5,932,275 A | 8/1999 | Nalur |
| 5,955,136 A | 9/1999 | Laaman et al. |
| 5,967,381 A | 10/1999 | Van Zeeland et al. |
| 6,004,606 A | 12/1999 | French et al. |
| 6,012,383 A | 1/2000 | Lande |
| 6,045,836 A | 4/2000 | Saunier et al. |
| 6,060,094 A | 5/2000 | Nalur |
| 6,071,546 A | 6/2000 | Nalur |
| 6,089,747 A | 7/2000 | Huang |
| 6,174,157 B1 | 1/2001 | Daouse et al. |
| 6,194,014 B1 | 2/2001 | Busse et al. |
| 6,210,739 B1 | 4/2001 | Nalur |
| 6,220,047 B1 | 4/2001 | Vogel et al. |
| 6,221,409 B1 | 4/2001 | Bueno Ceresuela |
| 6,251,455 B1 | 6/2001 | Thomas |
| 6,251,456 B1 | 6/2001 | Maul et al. |
| 6,267,049 B1 | 7/2001 | Silvano |
| 6,267,073 B1 | 7/2001 | Busse et al. |
| 6,272,974 B1 | 8/2001 | Pascotti et al. |
| 6,280,783 B1 | 8/2001 | Blaschke et al. |
| 6,284,294 B1 | 9/2001 | French et al. |
| 6,299,923 B1 | 10/2001 | Meziane |
| 6,338,569 B1 | 1/2002 | McGill |
| 6,338,863 B1 | 1/2002 | Amiel et al. |
| 6,340,488 B1 | 1/2002 | French et al. |
| 6,379,724 B1 | 4/2002 | Best et al. |
| 6,399,134 B1 | 6/2002 | Best et al. |
| 6,413,563 B1 | 7/2002 | Blaschke et al. |
| 6,431,395 B1 | 8/2002 | San Martin et al. |
| 6,444,044 B1 | 9/2002 | Beckett et al. |
| 6,454,455 B1 | 9/2002 | Jungvig |
| 6,479,085 B1 | 11/2002 | Archibald |
| 6,524,634 B2 | 2/2003 | Busse et al. |
| 6,524,635 B1 | 2/2003 | Aebi |
| 6,531,169 B2 | 3/2003 | Best et al. |
| 6,548,097 B1 | 4/2003 | Best et al. |
| 6,565,902 B2 | 5/2003 | Ruano Del Campo et al. |
| 6,579,375 B2 | 6/2003 | Beckett et al. |
| 6,592,928 B2 | 7/2003 | Makela et al. |
| 6,616,963 B1 | 9/2003 | Zerby et al. |
| 6,623,784 B2 | 9/2003 | Zerby et al. |
| 6,627,239 B1 | 9/2003 | Gavie et al. |
| 6,645,538 B2 | 11/2003 | Best et al. |
| 6,689,406 B2 | 2/2004 | Kuehl et al. |
| 6,713,101 B2 | 3/2004 | Lometillo et al. |
| 6,726,944 B2 | 4/2004 | Blaschke et al. |
| 6,739,475 B2 | 5/2004 | San Martin et al. |
| 6,758,056 B1 | 7/2004 | Cathenaut et al. |
| 6,790,467 B2 | 9/2004 | Kostival et al. |
| 6,818,238 B2 | 11/2004 | Napolitano et al. |
| 6,820,765 B2 | 11/2004 | Pahl |
| 6,824,808 B2 | 11/2004 | Best et al. |
| 6,835,406 B1 | 12/2004 | Wurzel et al. |
| 6,861,082 B2 | 3/2005 | Laffont et al. |
| 6,890,577 B2 | 5/2005 | Vaghela et al. |
| 6,936,794 B2 | 8/2005 | Zhang et al. |
| 6,942,885 B2 | 9/2005 | Ross et al. |
| 6,971,248 B1 | 12/2005 | Wiggs |
| 7,211,283 B2 | 5/2007 | Jones et al. |
| 7,314,307 B2 | 1/2008 | Cai |
| 7,407,681 B2 | 8/2008 | Marchon et al. |
| 7,451,613 B2 | 11/2008 | Barraclough et al. |
| 7,513,213 B2 | 4/2009 | Mange et al. |
| 7,619,188 B2 | 11/2009 | Oghafua et al. |
| 7,650,834 B2 | 1/2010 | Bravo |
| 7,658,960 B2 | 2/2010 | Thomas et al. |
| 7,727,573 B2 | 6/2010 | Vaghela et al. |
| 7,730,831 B2 | 6/2010 | Mange et al. |
| 7,736,681 B2 | 6/2010 | Belzowski et al. |
| 7,754,260 B2 | 7/2010 | Kruik et al. |
| 7,918,334 B2 | 4/2011 | Gaetano et al. |
| 8,182,853 B2 | 5/2012 | Puaud et al. |
| 8,273,392 B2 | 9/2012 | Ho et al. |
| 8,347,808 B2 | 1/2013 | Belzowski et al. |
| 8,425,967 B2 | 4/2013 | Vaghela et al. |
| 8,459,497 B2 | 6/2013 | Milan et al. |
| 8,628,811 B2 | 1/2014 | Panyam et al. |
| 8,685,477 B2 | 4/2014 | Almblad et al. |
| 8,720,493 B2 | 5/2014 | Dose et al. |

(56) References Cited

U.S. PATENT DOCUMENTS

| | | |
|---|---|---|
| 8,777,057 B2 | 7/2014 | Fiedler |
| 8,784,091 B2 | 7/2014 | Henriet et al. |
| 8,840,943 B2 | 9/2014 | Amend |
| 8,844,426 B2 | 9/2014 | Ochoa et al. |
| 8,877,179 B2 | 11/2014 | Mercenier et al. |
| 8,906,437 B2 | 12/2014 | Green et al. |
| 8,936,821 B2 | 1/2015 | Ummadi et al. |
| 8,940,352 B2 | 1/2015 | Ambrogi et al. |
| 8,960,992 B2 | 2/2015 | de Jong |
| 8,960,999 B1 | 2/2015 | Ochoa et al. |
| 8,980,354 B2 | 3/2015 | Harlaux-Pasquier et al. |
| 9,155,322 B2 | 10/2015 | Ricco et al. |
| 9,232,811 B2 | 1/2016 | Panyam et al. |
| 9,242,387 B2 | 1/2016 | Amend et al. |
| 9,253,993 B2 | 2/2016 | Ummadi et al. |
| 9,346,611 B1 | 5/2016 | Roberts et al. |
| 9,351,503 B2 | 5/2016 | Amend et al. |
| 9,351,504 B2 | 5/2016 | Ricco et al. |
| 9,448,006 B2 | 9/2016 | Kulkarni et al. |
| 9,572,358 B2 | 2/2017 | Whitehouse |
| 9,573,726 B2 | 2/2017 | Danesin et al. |
| 9,591,865 B2 | 3/2017 | Ravji et al. |
| 9,826,756 B2 | 11/2017 | Ummadi et al. |
| 9,861,114 B2 | 1/2018 | Lallemand et al. |
| 9,888,706 B2 | 2/2018 | Ummadi et al. |
| 9,913,486 B2 | 3/2018 | Nalur |
| 10,039,298 B2 | 8/2018 | Noth et al. |
| 10,058,833 B2 | 8/2018 | Bloch |
| 10,111,447 B2 | 10/2018 | Noth et al. |
| 10,117,445 B2 | 11/2018 | Imer |
| 10,149,487 B2 | 12/2018 | Shuntich |
| 10,279,973 B2 | 5/2019 | Butscher et al. |
| 10,314,320 B2 | 6/2019 | Roberts et al. |
| 10,334,868 B2 | 7/2019 | Fonte |
| 10,358,284 B2 | 7/2019 | Fonte |
| 10,368,680 B2 | 8/2019 | Ryan |
| 10,421,589 B1 | 9/2019 | Quinn |
| 10,426,180 B1 | 10/2019 | Fonte |
| 10,543,978 B1 | 1/2020 | Fonte et al. |
| 10,604,337 B2 | 3/2020 | Fonte et al. |
| 10,612,835 B2 | 4/2020 | Fonte et al. |
| 10,667,542 B2 | 6/2020 | Fonte |
| 10,701,953 B2 | 7/2020 | Merlini |
| 10,752,432 B2 | 8/2020 | Fonte et al. |
| 10,782,049 B1 | 9/2020 | Fonte et al. |
| 10,830,529 B2 | 11/2020 | Fonte et al. |
| 10,897,916 B2 | 1/2021 | Fonte |
| 10,973,240 B1 | 4/2021 | Fonte |
| 11,021,319 B2 | 6/2021 | Fonte |
| 11,033,044 B1 | 6/2021 | Fonte et al. |
| 11,109,610 B2 | 9/2021 | Fonte et al. |
| 11,175,075 B2 | 11/2021 | Flynn et al. |
| 11,230,429 B2 | 1/2022 | Fonte et al. |
| 11,279,609 B2 | 3/2022 | Fonte et al. |
| 11,280,543 B2 | 3/2022 | Fonte et al. |
| 11,311,026 B2 | 4/2022 | Fonte et al. |
| 11,337,438 B2 | 5/2022 | Fonte et al. |
| 11,337,439 B2 | 5/2022 | Fonte et al. |
| 11,420,787 B2 | 8/2022 | Falvey |
| 11,470,855 B2 | 10/2022 | Fonte et al. |
| 11,490,636 B2 | 11/2022 | Fonte et al. |
| 11,564,402 B2 | 1/2023 | Fonte et al. |
| 11,627,747 B2 | 4/2023 | Fonte et al. |
| 2001/0035016 A1 | 11/2001 | Weber et al. |
| 2001/0052294 A1 | 12/2001 | Schmed |
| 2002/0001644 A1 | 1/2002 | Busse et al. |
| 2002/0020659 A1 | 2/2002 | Sweeney et al. |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0012864 A1 | 1/2003 | Gerber |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |
| 2004/0219269 A1 | 11/2004 | Cathenaut et al. |
| 2005/0098561 A1 | 5/2005 | Schwoebel |
| 2005/0178796 A1 | 8/2005 | Schraiber |
| 2005/0189375 A1 | 9/2005 | McGill |
| 2005/0193896 A1 | 9/2005 | McGill |
| 2005/0229622 A1 | 10/2005 | Franck et al. |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0011776 A1 | 6/2006 | Maurer et al. |
| 2006/0254429 A1 | 11/2006 | Sinton |
| 2006/0255066 A1 | 11/2006 | Damiano et al. |
| 2006/0263490 A1 | 11/2006 | Wall et al. |
| 2006/0266751 A1 | 11/2006 | Ali et al. |
| 2006/0277936 A1* | 12/2006 | Norden ............... F25B 5/02 |
| | | 62/340 |
| 2006/0280826 A1 | 12/2006 | Mange et al. |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0239867 A1 | 10/2008 | Gilbert |
| 2008/0282723 A1 | 11/2008 | Perrier et al. |
| 2009/0017149 A1 | 1/2009 | Richman |
| 2009/0038322 A1* | 2/2009 | Senf, Jr. ............... F25B 41/385 |
| | | 418/55.1 |
| 2009/0090254 A1 | 4/2009 | Rusch |
| 2009/0110559 A1 | 4/2009 | Bell et al. |
| 2009/0110786 A1 | 4/2009 | Wells |
| 2009/0147618 A1 | 6/2009 | Kovacic et al. |
| 2009/0179042 A1 | 7/2009 | Milan et al. |
| 2009/0191318 A1 | 7/2009 | Cocchi et al. |
| 2009/0223386 A1 | 9/2009 | Edwards et al. |
| 2009/0269452 A1 | 10/2009 | Dufort |
| 2009/0291170 A1 | 11/2009 | Rousset et al. |
| 2009/0304866 A1 | 12/2009 | Bovetto et al. |
| 2010/0034937 A1 | 2/2010 | Schmitt et al. |
| 2010/0068340 A1 | 3/2010 | Wille et al. |
| 2010/0068354 A1 | 3/2010 | Roberson et al. |
| 2010/0108696 A1 | 5/2010 | Farrell et al. |
| 2010/0124599 A1 | 5/2010 | Saikali et al. |
| 2010/0132310 A1 | 6/2010 | Dose et al. |
| 2010/0189866 A1 | 7/2010 | Denger |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0206875 A1 | 8/2010 | Bratsch |
| 2010/0209562 A1 | 8/2010 | Henriet et al. |
| 2010/0209571 A1 | 8/2010 | Vaghela et al. |
| 2010/0269534 A1 | 10/2010 | Kumakiri et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0142996 A1 | 6/2011 | Kruger |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |

(56) References Cited

U.S. PATENT DOCUMENTS

| | | |
|---|---|---|
| 2012/0138621 A1 | 6/2012 | Bratsch |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0074535 A1 | 3/2013 | Schmidt |
| 2013/0098088 A1 | 4/2013 | Lin et al. |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0152620 A1 | 6/2013 | Ugolini |
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0106055 A1 | 4/2014 | Gamay |
| 2014/0123859 A1 | 5/2014 | Verbeek |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0211586 A1 | 7/2014 | Conti |
| 2014/0231562 A1 | 8/2014 | Potter et al. |
| 2014/0242229 A1 | 8/2014 | Whitehouse |
| 2014/0255558 A1 | 9/2014 | Amend et al. |
| 2014/0263415 A1 | 9/2014 | San Miguel et al. |
| 2014/0272016 A1 | 9/2014 | Nowak |
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0064330 A1 | 3/2015 | Ummadi et al. |
| 2015/0099050 A1 | 4/2015 | Ummadi et al. |
| 2015/0128619 A1 | 5/2015 | Wild |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0201810 A1 | 7/2015 | Sands |
| 2015/0219506 A1 | 8/2015 | Izadi-Zamanabadi et al. |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0329282 A1 | 11/2015 | Bartoli et al. |
| 2015/0351426 A1 | 12/2015 | Ricco et al. |
| 2015/0351430 A1 | 12/2015 | Pipe et al. |
| 2015/0353261 A1 | 12/2015 | Gupta |
| 2016/0051081 A1 | 2/2016 | Grassia et al. |
| 2016/0135479 A1 | 5/2016 | Ummadi et al. |
| 2016/0176624 A1 | 6/2016 | Talon |
| 2016/0192675 A1 | 7/2016 | Abu-Ali |
| 2016/0213026 A1 | 7/2016 | Lepagnol et al. |
| 2016/0214787 A1 | 7/2016 | Iotti |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrsekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0332188 A1 | 11/2016 | Agnello |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0079305 A1 | 3/2017 | Barniol Gutierrez et al. |
| 2017/0112326 A1 | 4/2017 | Ochoa et al. |
| 2017/0173544 A1 | 6/2017 | Laby |
| 2017/0183210 A1 | 6/2017 | Wyatt et al. |
| 2017/0188600 A1 | 7/2017 | Scharfman et al. |
| 2017/0215456 A1 | 8/2017 | Noth et al. |
| 2017/0217648 A1 | 8/2017 | Bouzaid et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouzaid et al. |
| 2017/0280745 A1 | 10/2017 | Herbert et al. |
| 2017/0318833 A1 | 11/2017 | Curschellas et al. |
| 2017/0318995 A1 | 11/2017 | Rai |
| 2017/0326749 A1 | 11/2017 | Amend |
| 2017/0332656 A1 | 11/2017 | Amend |
| 2017/0332844 A1 | 11/2017 | Behar et al. |
| 2017/0339976 A1 | 11/2017 | Amend |
| 2017/0360061 A1 | 12/2017 | Fonte |
| 2017/0367371 A1 | 12/2017 | Lebleu et al. |
| 2018/0008087 A1 | 1/2018 | Miller et al. |
| 2018/0042258 A1 | 2/2018 | Roberts et al. |
| 2018/0042279 A1 | 2/2018 | Kerler et al. |
| 2018/0056256 A1 | 3/2018 | Sun et al. |
| 2018/0064127 A1 | 3/2018 | Chisholm et al. |
| 2018/0064131 A1 | 3/2018 | Noth |
| 2018/0064132 A1 | 3/2018 | Noth |
| 2018/0084800 A1 | 3/2018 | Noth |
| 2018/0092378 A1 | 4/2018 | Webering et al. |
| 2018/0117545 A1 | 5/2018 | Noth |
| 2018/0141011 A1 | 5/2018 | Mou |
| 2018/0146695 A1 | 5/2018 | Amend et al. |
| 2018/0146699 A1 | 5/2018 | Vafeiadi et al. |
| 2018/0169599 A1 | 6/2018 | Ahmad et al. |
| 2018/0177545 A1 | 6/2018 | Boudreaux et al. |
| 2018/0199760 A1 | 7/2018 | Rai |
| 2018/0213816 A1 | 8/2018 | Amend |
| 2018/0263274 A1 | 9/2018 | Ray et al. |
| 2018/0271115 A1 | 9/2018 | Ray et al. |
| 2019/0021548 A1 | 1/2019 | Eisner |
| 2019/0029248 A1 | 1/2019 | Cutting |
| 2019/0053513 A1 | 2/2019 | Halachmi |
| 2019/0053514 A1 | 2/2019 | Fonte et al. |
| 2019/0069725 A1 | 3/2019 | Wang et al. |
| 2019/0239534 A1 | 8/2019 | Halachmi |
| 2019/0254307 A1 | 8/2019 | Noth et al. |
| 2019/0269148 A1 | 9/2019 | Bouzaid et al. |
| 2019/0270555 A1 | 9/2019 | Noth et al. |
| 2019/0291947 A1 | 9/2019 | Kruger |
| 2019/0313665 A1 | 10/2019 | Fonte |
| 2019/0320679 A1 | 10/2019 | Halachmi |
| 2019/0325182 A1 | 10/2019 | Noth et al. |
| 2019/0329948 A1 | 10/2019 | Ritzenhoff et al. |
| 2019/0330038 A1 | 10/2019 | Melrose |
| 2019/0344955 A1 | 11/2019 | Fonte |
| 2019/0357564 A1 | 11/2019 | Yang et al. |
| 2020/0022382 A1 | 1/2020 | Fonte |
| 2020/0055664 A1 | 2/2020 | Fonte et al. |
| 2020/0055665 A1 | 2/2020 | Fonte et al. |
| 2020/0056814 A1 | 2/2020 | Fonte et al. |
| 2020/0056834 A1 | 2/2020 | Fonte et al. |
| 2020/0056835 A1 | 2/2020 | Fonte et al. |
| 2020/0146308 A1 | 5/2020 | Roberts et al. |
| 2020/0146311 A1 | 5/2020 | Halachmi |
| 2020/0245818 A1 | 8/2020 | Halkes et al. |
| 2020/0292212 A1 | 9/2020 | Fonte et al. |

(56) References Cited

U.S. PATENT DOCUMENTS

| | | |
|---|---|---|
| 2020/0292229 A1 | 9/2020 | Fonte et al. |
| 2020/0315206 A1 | 10/2020 | Fonte |
| 2020/0326124 A1 | 10/2020 | Fonte et al. |
| 2020/0333056 A1 | 10/2020 | Ito et al. |
| 2020/0378659 A1 | 12/2020 | Novak et al. |
| 2021/0002066 A1 | 1/2021 | Fonte |
| 2021/0002067 A1 | 1/2021 | Fonte |
| 2021/0003342 A1 | 1/2021 | Fonte et al. |
| 2021/0007370 A1 | 1/2021 | Fonte |
| 2021/0032015 A1 | 2/2021 | Fonte |
| 2021/0076694 A1 | 3/2021 | Prewett et al. |
| 2021/0084930 A1 | 3/2021 | Fonte |
| 2021/0127706 A1 | 5/2021 | Fonte |
| 2021/0130083 A1 | 5/2021 | Fonte et al. |
| 2021/0212337 A1 | 7/2021 | Fonte et al. |
| 2021/0212338 A1 | 7/2021 | Fonte et al. |
| 2021/0325105 A1 | 10/2021 | Fonte et al. |
| 2021/0368819 A1 | 12/2021 | Fonte et al. |
| 2021/0368820 A1 | 12/2021 | Fonte et al. |
| 2021/0371265 A1 | 12/2021 | Fonte et al. |
| 2022/0127070 A1 | 4/2022 | Fonte et al. |
| 2022/0322696 A1 | 10/2022 | Fonte et al. |
| 2023/0000104 A1 | 1/2023 | Fonte et al. |
| 2023/0016913 A1 | 1/2023 | Fonte et al. |

FOREIGN PATENT DOCUMENTS

| | | | |
|---|---|---|---|
| CN | 101142454 | 3/2008 | |
| CN | 101166424 | 4/2008 | |
| CN | 101536806 | 9/2009 | |
| CN | 203314023 | 12/2013 | |
| CN | 103635767 | 3/2014 | |
| CN | 104080356 | 10/2014 | |
| CN | 105682469 | 6/2016 | |
| CN | 106455852 | 2/2017 | |
| CN | 106492721 | 3/2017 | |
| CN | 106595115 | 4/2017 | |
| DE | 1211905 | 3/1966 | |
| DE | 202004005357 | 7/2004 | |
| EP | 0129706 | 1/1985 | |
| EP | 0471904 | 2/1992 | |
| EP | 1009678 | 6/2000 | |
| EP | 1139837 | 10/2001 | |
| EP | 1312880 A2 * | 5/2003 | ......... F01C 21/0809 |
| EP | 1415543 | 5/2004 | |
| EP | 1907300 | 4/2008 | |
| EP | 2266418 | 12/2010 | |
| EP | 2281464 | 2/2011 | |
| EP | 2311324 | 4/2011 | |
| EP | 2679100 | 1/2014 | |
| EP | 2775855 | 9/2014 | |
| EP | 3044125 | 7/2016 | |
| EP | 3160870 | 5/2017 | |
| EP | 3473950 A1 * | 4/2019 | ............ A23G 9/045 |
| FR | 59475 E | 5/1954 | |
| FR | 2501009 | 9/1982 | |
| FR | 2501080 | 9/1982 | |
| GB | 978808 | 12/1964 | |
| GB | 2135037 | 8/1984 | |
| JP | S63003760 A | 1/1988 | |
| JP | S6375769 U | 5/1988 | |
| JP | H11-507295 | 6/1999 | |
| JP | 2002-068304 | 3/2002 | |
| JP | 2003-505056 | 2/2003 | |
| JP | 2005-126755 | 5/2005 | |
| JP | 2005299997 | 10/2005 | |
| JP | 2005-318869 | 11/2005 | |
| JP | 2006-027662 | 2/2006 | |
| JP | 2010-163211 | 7/2010 | |
| JP | 2013-544529 | 12/2013 | |
| JP | 2014-008063 | 1/2014 | |
| JP | 2014058323 | 4/2014 | |
| JP | 2016537146 | 12/2016 | |
| JP | 2017-080511 | 5/2017 | |
| JP | 2017-521997 | 8/2017 | |
| JP | 2017538413 | 12/2017 | |
| JP | 2018-028422 | 2/2018 | |
| JP | 2018-118031 | 8/2018 | |
| JP | 2019-525770 | 9/2019 | |
| KR | 101709870 B1 | 2/2017 | |
| KR | 20170117328 | 10/2017 | |
| WO | WO 1996/001224 | 1/1996 | |
| WO | WO 1998/046486 | 10/1998 | |
| WO | WO 2004/054380 | 7/2004 | |
| WO | WO 2010/103483 | 9/2010 | |
| WO | WO 2010/149509 | 12/2010 | |
| WO | WO 2013/121421 | 8/2013 | |
| WO | WO 2015/032787 | 3/2015 | |
| WO | WO 2015/063092 | 5/2015 | |
| WO | WO 2015/063094 | 5/2015 | |
| WO | WO 2015/077825 | 6/2015 | |
| WO | WO 2015/169841 | 11/2015 | |
| WO | WO 2015/197513 | 12/2015 | |
| WO | WO 2016/079641 | 5/2016 | |
| WO | WO 2016/081477 | 5/2016 | |
| WO | WO 2016/154037 | 9/2016 | |
| WO | WO 2017/087970 | 5/2017 | |
| WO | WO 2017/139395 | 8/2017 | |
| WO | WO 2017/176580 | 10/2017 | |
| WO | WO 2017/214357 | 12/2017 | |
| WO | WO 2018/109765 | 6/2018 | |
| WO | WO 2019/117804 | 6/2019 | |
| WO | WO 2019/140251 | 7/2019 | |
| WO | WO 2019/171588 | 9/2019 | |
| WO | WO 2020/037287 | 2/2020 | |
| WO | WO 2020/037293 | 2/2020 | |
| WO | WO 2020/037296 | 2/2020 | |
| WO | WO 2020/039439 | 2/2020 | |
| WO | WO 2020/053859 | 3/2020 | |
| WO | WO 2020/089919 | 5/2020 | |
| WO | WO 2020/163369 | 8/2020 | |

OTHER PUBLICATIONS

Allpax, "Shaka Retorts 1300 and 1600," 2020, retrieved Apr. 16, 2020 from URL <https://www.allpax.A3:A41com/products/production-shaka-retorts/>, 4 pages.

Arellano et al., "Online ice crystal size measurements during sorbet freezing by means of the focused beam reflectance measurement (FBRM) technology," Influence of Operating Conditions, Journal of Food Engineering, Nov. 1, 2012, 113(2):351-9.

ASM International, "Properties and Characteristics of Aluminum and Aluminum Alloys: Melting Aluminum and its Alloys," Fire Resistance of Aluminum and Aluminum Alloys and Measuring the Effects of Fire Exposure on the Properties of Aluminum Alloys, 1st ed., Kaufman (ed), 2016, Chapter 1, 9 pages.

Caldwell et al., "A low-temperature scanning electron microscopy study of ice cream. II. Influence of selected ingredients and processes," Food Structure, 1992; 11(1):2, 10 pages.

Cook et al., "Mechanisms of Ice Crystallization in Ice Cream production," Comprehensive Reviews in Food Science and Food safety, Mar. 2010, 9(2):213-22.

Design Integrated Technology, "Propellant Equipment Used by Arsenals Worldwide," 2016, retrieved on Apr. 16, 2020 from URL <https://www.ditusa.com/sc_helicone mixers.php>, 3 pages.

Drewett et al., "Ice crystallization in a scraped surface freezer," Journal of Food Engineering, Feb. 1, 2007, 78(3):1060-6.

EP European Office Action by European Appln. No. 19762064.4, dated Oct. 25, 2021, 10 pages.

EP European Search Report in European Appln. No. 21181499.1, dated Nov. 3, 2021, 14 pages.

EP European Search Report in European Appln. No. 21199240.9, dated Feb. 2, 2022, 13 pages.

EP European Search Report in European Appln. No. 21199244.1, dated Feb. 2, 2022, 13 pages.

EP European Search Report in European Appln. No. 21199245.8, dated Feb. 2, 2022, 12 pages.

EP European Search Report in European Appln. No. 21199250.8, dated Feb. 2, 2022, 13 pages.

(56) References Cited

OTHER PUBLICATIONS

EP European Search Report in European Appln. No. 21199252.4, dated Feb. 2, 2022, 11 pages.
EP European Search Report in European Appln. No. 21199271.4, dated Feb. 2, 2022, 8 pages.
EP Extended Search Report in European Appln. No. 17814210.5, dated Jan. 24, 2020, 11 pages.
EP Office Action by European Appln. No. 19762063.6, dated Feb. 11, 2022, 6 pages.
Gonzalez-Ramirez et al., "Moments model for a continuous sorbet crystallization process," The 23rd IIR International Congress of Refrigeration, Refrigeration for Sustainable Development, Prague, Czech Republic, Aug. 2011, 21-6.
Hagiwara et al., "Effect of sweetener, stabilizer, and storage temperature on ice recrystallization in ice cream," Journal of Dairy Science, May 1, 1996, 79(5):735-44.
Hosford et al., "The aluminum beverage can," Scientific American, Sep. 1, 1994, 271(3):48-53.
Ice Cream Science, "How Long Does Homemade Ice Cream Last in the Freezer," Jun. 3, 2016, retrieved Apr. 16, 2020 from URL <http://icecreamscience.com/long-ice-cream-last-freezer/>, 18 pages.
Ice Cream Science, "Ice Crystals in Ice Cream," Oct. 20, 2016, retrieved on Apr. 16, 2020 from URL <http://icecreamscience.com/ice-crystals-in-ice-cream/>, 18 pages.
Ice Cream, 2nd Edition, Arbuckle, 1972, pp. 96 and 240.
Inoue et al., "Modeling of the effect of freezer conditions on the principal constituent parameters of ice cream by using response surface methodology," Journal of Dairy Science, May 1, 2008, 91(5):1722-32.
JP Japanese Office Action in Japanese Appln. No. 2022-203487, dated Feb. 28, 2023, 6 pages (with English translation).
JP Office Action in Japanese Appln. No. 2019-518176, dated Jan. 6, 2021, 8 pages (with English translation).
JP Office Action in Japanese Appln. No. 2021-507923, dated Oct. 4, 2022, 8 pages (with English Translation).
KR Office Action in Korean Appln. No. 10-2021-7007353, dated Apr. 28, 2023, 19 pages (with English translation).
PCT Authorized Officer Gwenaelle Llorca, European Patent Office, International Application No. PCT/US2019/013286, "Invitation to Pay Additional Fees and, Where Applicable, Protest Fee", International Searching Authority, Apr. 4, 2019, 16 pages.
PCT International Preliminary Report on Patentability in International Appln. No. PCT/US17/37972, dated Dec. 18, 2018, 12 pages.
PCT International Preliminary Report on Patentability in International Appln. No. PCT/US2019/046946, dated Feb. 23, 2021, 16 pages.
PCT International Preliminary Report on Patentability in International Appln. No. PCT/US2019/046954, dated Feb. 23, 2021, 14 pages.
PCT International Preliminary Report on Patentability in International Appln. No. PCT/US2019/046958, dated Feb. 23, 2021, 17 pages.
PCT International Preliminary Report on Patentability in International Appln. No. PCT/US2020/051664, dated Mar. 31, 2022, 12 pages.
PCT International Report on Patentability in International Appln. No. PCT/2019/013286, dated Jul. 23, 2020, 16 pages.
PCT International Search Report and Written Opinion in International Appln. No. PCT/US17/37972, dated Oct. 27, 2017, 16 pages.
PCT International Search Report and Written Opinion in International Appln. No. PCT/US2019/013286, dated May 31, 2019, 21 pages.
PCT International Search Report and Written Opinion in International Appln. No. PCT/US2019/046946, dated Jan. 24, 2020, 24 pages.
PCT International Search Report and Written Opinion in International Appln. No. PCT/US2019/046954, dated Nov. 21, 2019, 20 pages.
PCT International Search Report and Written Opinion in International Appln. No. PCT/US2019/046958, dated Jan. 24, 2020, 25 pages.
PCT International Search Report and Written Opinion in International Appln. No. PCT/US2020/051664, dated Dec. 17, 2020, 44 pages.
PCT International Search Report and Written Opinion in International Appln. No. PCT/US2021/013619, dated Jun. 2, 2021, 15 pages.
PCT International Search Report and Written Opinion in International Appln. No. PCT/US2021/035260, dated Oct. 1, 2021, 18 pages.
PCT International Search Report and Written Opinion in International Appln. No. PCT/US2022/070483, dated May 23, 2022, 15 pages.
PCT Invitation to Pay Additional Fees in International Appln. No. PCT/US2019/046946, dated Dec. 2, 2019, 19 pages.
Reichart, "Speed of Dasher and Scraper as Affecting the Quality of Ice Cream and Sherbet," Journal of Dairy Science, Mar. 1, 1931, 14(2):107-15.
Shaka Process, "Higher Quality Ambient Foods," 2018, retrieved Apr. 16, 2020 from URL <http://shakaprocess.com/>, 2 pages.
Tetra Pak Homogenizers, "Ice Cream Homogenization for Sounds Performance," 2014, retrieved Apr. 16, 2020 from URL <https://assets.tetrapak.com/static/documents/tetra_pak_homogenizers_br_63880_low.pdf>, 4 pages.
U.S. Notice of Allowance in U.S. Appl. No. 16/592,031, dated Jan. 10, 2020, 8 pages.
Waste Management Inc. et al "Tip: Aluminum Trays and Pans are Recyclable," Nov. 2016 pp. 1-2 https://www.stocktonrecycles.conn/alunninunn-trays-pans-recyclable/.
Xiao-Wim, "This New Kitchen Gadget Makes Fro-Yo in Minutes," by Bloomberg, Aug. 8, 2017, retrieved on Oct. 12, 2018, retrieved from URL<http://fortune.com/2017/08/08/wim-frozen-yogurt-minutes/>, 4 pages.
EP Extended European Search Report in European Appln. No. 23201302.9, mailed on Feb. 15, 2024, 9 pages.
CN Office Action in Chinese Appln. No. 201980068185.0, mailed on Jul. 29, 2023, 41 pages (with English translation).
CN Office Action in Chinese Appln. No. 201980068712.8, mailed on Sep. 1, 2023, 53 pages (with English translation).
CN Office Action in Chinese Appln. No. 201980068716.6, mailed on Sep. 1, 2023, 44 pages (with English translation).
EP Office Action in European Appln. No. 19702778.2, mailed on Feb. 2, 2024, 6 pages.
EP Office Action in European Appln. No. 19765352.0, mailed on Apr. 25, 2024, 10 pages.
Notice in Allowance in Japanese Appln. No. 2023-110572, mailed Feb. 12, 2025, 6 pages (with English translation).
Office Action in European Appln. No. 21181499.1, mailed on Apr. 7, 2025, 6 pages.
Office Action in Mexican Appln. No. MX/a/2020/007437, mailed on Apr. 24, 2025, 20 pages.
Office Action in Mexican Appln. No. MX/a/2021/001815, mailed Feb. 10, 2025, 8 pages (with English translation).
Office Action in Mexican Appln. No. MX/a/2021/001818, mailed on Feb. 17, 2025, 8 pages (with English translation).
Office Action in U.S. Appl. No. 18/507,730, mailed on Mar. 11, 2025, 6 pages.

* cited by examiner

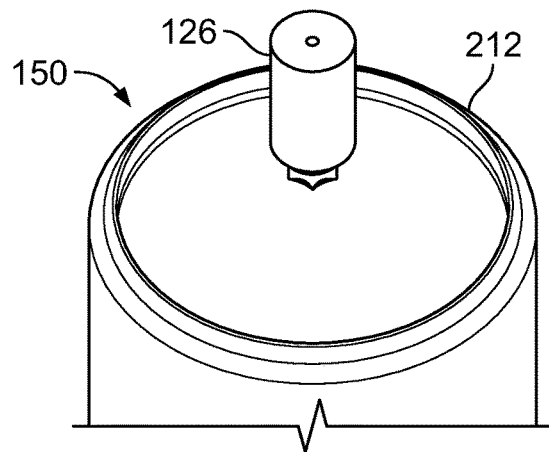 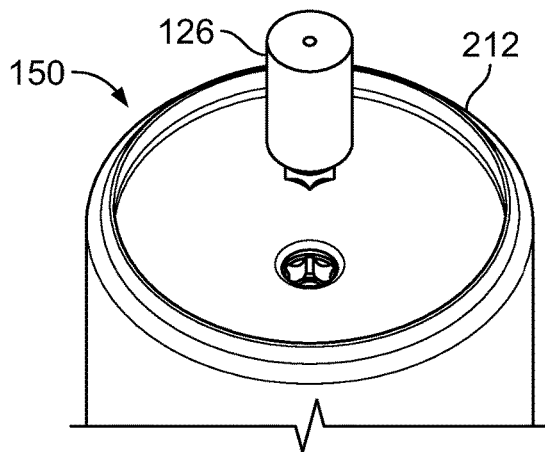
FIG. 7A  FIG. 7B
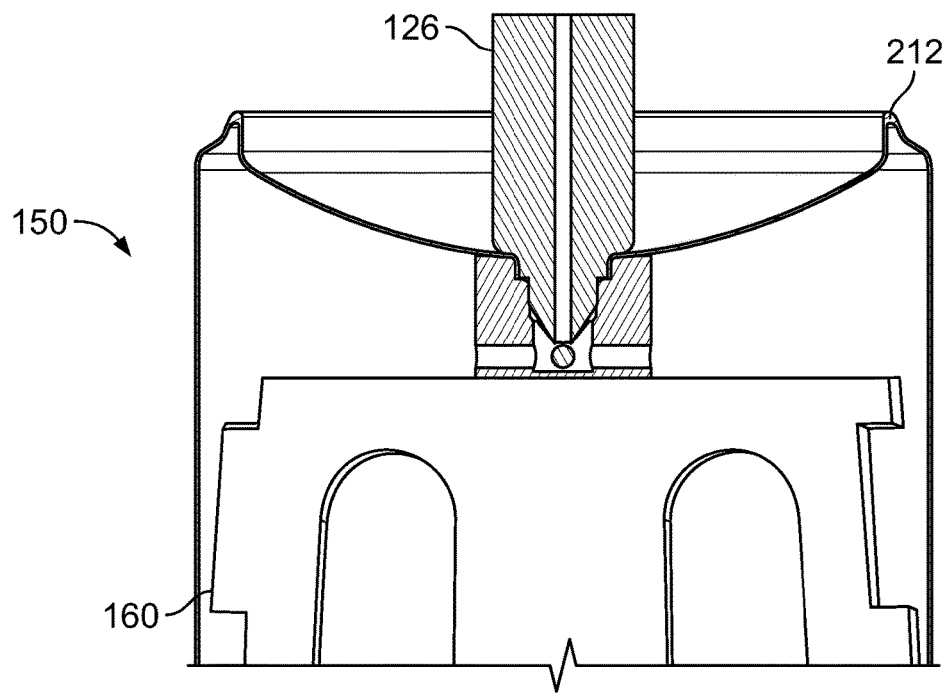
FIG. 7C

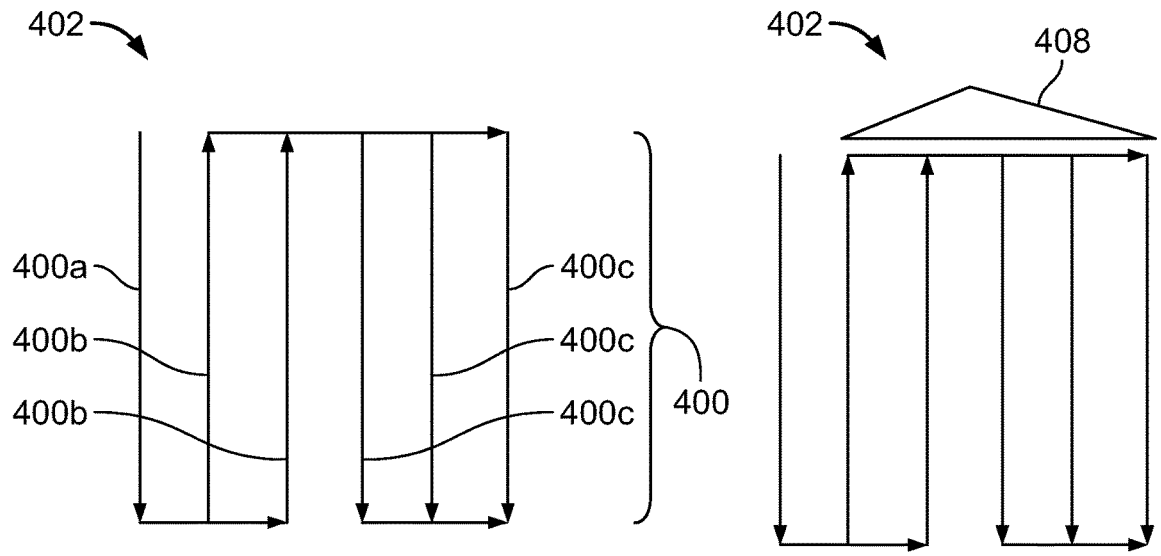
FIG. 20A
FIG. 20B
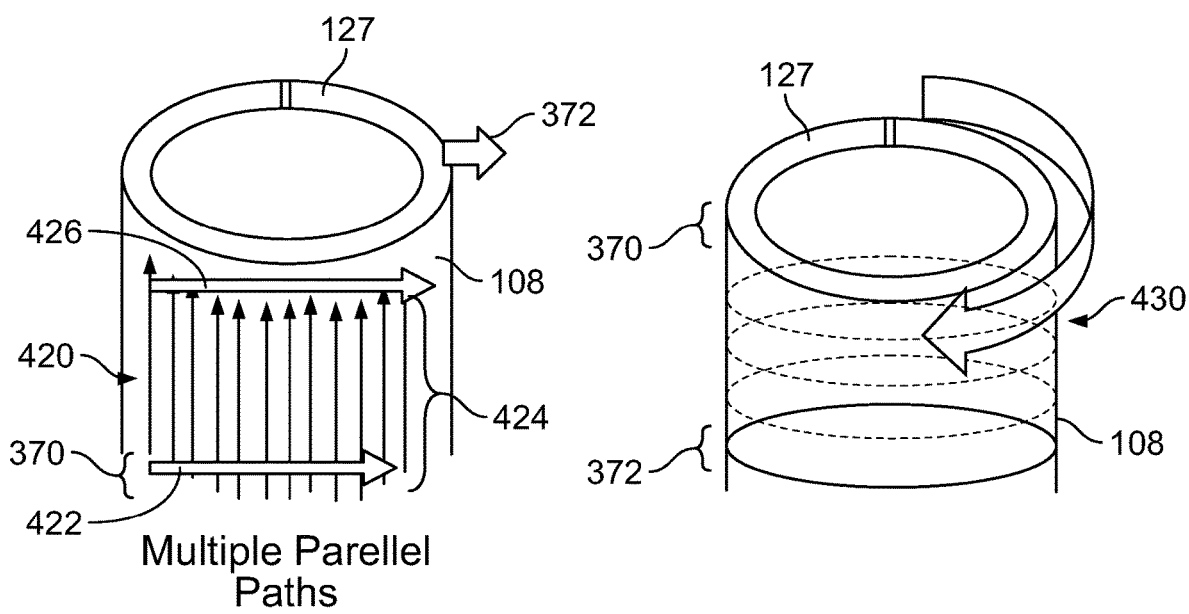
FIG. 20C
FIG. 20D

Overlay Clad

Inlay Clad

Edge Clad

PROVIDING SINGLE SERVINGS OF COOLED FOODS AND DRINKS

CROSS-REFERENCE TO RELATED APPLICATIONS

This patent application is a continuation of patent application U.S. Ser. No. 17/947,569, filed on Sep. 19, 2022, which is a continuation of patent application U.S. Ser. No. 17/845,545, filed on Jun. 21, 2022 (now U.S. Pat. No. 11,490,636), which is a continuation of patent application U.S. Ser. No. 16/459,388 (now U.S. Pat. No. 11,470,855), filed on Jul. 1, 2019, which is a continuation-in-part of patent application U.S. Ser. No. 16/104,758, filed on Aug. 17, 2018 (now U.S. Pat. No. 10,334,868) and claims the benefit of provisional patent applications U.S. Ser. No. 62/758,110, filed on Nov. 9, 2018; U.S. Ser. No. 62/801,587, filed on Feb. 5, 2019; U.S. Ser. No. 62/831,657, filed on Apr. 9, 2019; U.S. Ser. No. 62/831,600, filed on Apr. 9, 2019; U.S. Ser. No. 62/831,646, filed on Apr. 9, 2019; and U.S. Ser. No. 62/831,666, filed on Apr. 9, 2019, all of which are hereby incorporated herein by reference in their entirety.

TECHNICAL FIELD

This disclosure relates to systems and methods for rapidly cooling food and drinks.

BACKGROUND

Beverage brewing system have been developed that rapidly prepare single servings of hot beverages. Some of these brewing systems rely on single use pods to which water is added before brewing occurs. The pods can be used to prepare hot coffees, teas, cocoas, and dairy-based beverages.

Home use ice cream makers can be used to make larger batches (e.g., 1.5 quarts or more) of ice cream for personal consumption. These ice cream maker appliances typically prepare the mixture by employing a hand-crank method or by employing an electric motor that is used, in turn, to assist in churning the ingredients within the appliance. The resulting preparation is often chilled using a pre-cooled vessel that is inserted into the machine.

SUMMARY

This specification describes systems and methods for rapidly cooling food and drinks. Some of these systems and methods can cool food and drinks in a container inserted into a counter-top or installed machine from room temperature to freezing in less than two minutes. For example, the approach described in this specification has successfully demonstrated the ability make soft-serve ice cream from room-temperature pods in approximately 90 seconds. This approach has also been used to chill cocktails and other drinks including to produce frozen drinks. These systems and methods are based on a refrigeration cycle with low startup times and a pod-machine interface that is easy to use and provides extremely efficient heat transfer. Some of the pods described are filled with ingredients in a manufacturing line and subjected to a sterilization process (e.g., retort, aseptic packaging, ultra-high temperature processing (UHT), ultra-heat treatment, ultra-pasteurization, or high pressure processing (HPP)). HPP is a cold pasteurization technique by which products, already sealed in its final package, are introduced into a vessel and subjected to a high level of isostatic pressure (300-600 megapascals (MPa) (43,500-87,000 pounds per square inch (psi)) transmitted by water. The pods can be used to store ingredients including, for example, dairy products at room temperature for long periods of time (e.g., 9-12 months) following sterilization.

Cooling is used to indicate the transfer of thermal energy to reduce the temperature, for example, of ingredients contained in a pod. In some cases, cooling indicates the transfer of thermal energy to reduce the temperature, for example, of ingredients contained in a pod to below freezing.

Some machines for producing cooled food or drinks from ingredients in a pod containing the ingredients include: an evaporator of a refrigeration system, the evaporator defining a receptacle sized to receive the pod; and wherein the refrigeration system has a working fluid loop that runs from the evaporator to a compressor to a condenser to an expansion valve or capillary tube back to the evaporator and also includes a first bypass line that extends from the working fluid loop between the compressor and the condenser to the working fluid loop between the expansion valve and the evaporator.

Some machines for reducing the temperature of ingredients in a pod containing the ingredients and at least one mixing paddle include: an evaporator of a refrigeration system, the evaporator defining a receptacle sized to receive the pod; a motor operable to move the at least one internal mixing paddle of a pod in the receptacle; wherein the refrigeration system has a working fluid loop that runs from the evaporator to a compressor to a condenser to an expansion valve back to the evaporator and also includes a first bypass line that extends from the working fluid loop between the compressor and the condenser to the working fluid loop between the expansion valve and the evaporator and a bypass valve on the first bypass line.

Some machines for producing cooling ingredients in a pod containing the ingredients and at least one internal mixing paddle include: an evaporator of a refrigeration system, the evaporator defining a receptacle sized to receive the single use pod; and a motor operable to move the at least one internal mixing paddle of a pod in the receptacle; wherein the refrigeration system has a working fluid loop that runs from the evaporator to a compressor to a condenser to an expansion valve back to the evaporator and also includes a first bypass line that extends from the working fluid loop between the compressor and the condenser to the working fluid loop between the expansion valve and the evaporator and a bypass valve on the first bypass line.

Some machines for producing cooling ingredients in a pod containing the ingredients and at least one internal mixing paddle include: an evaporator of a refrigeration system, the evaporator defining a receptacle sized to receive the pod; and a motor operable to move the internal mixing paddle of a pod in the receptacle; wherein the refrigeration system has a working fluid loop that runs from the evaporator to a compressor to a condenser to an expansion valve back to the evaporator and also includes a first bypass line that extends from the working fluid loop between the compressor and the condenser to the working fluid loop between the evaporator and the compressor.

Some machines for producing cooling ingredients in a pod containing the ingredients and at least one internal mixing paddle include: an evaporator of a refrigeration system, the evaporator defining a receptacle sized to receive the pod; and a motor operable to move the internal mixing paddle of a pod in the receptacle; wherein the refrigeration system has a working fluid loop that runs from the evaporator to a compressor to a condenser to a pressure vessel to an expansion valve back to the evaporator and the working fluid loop includes a first isolation valve between the pressure vessel and the expansion valve and a second isolation valve between the compressor and the condenser.

Some machines for producing cooling ingredients in a pod containing the ingredients and at least one internal mixing paddle include: an evaporator of a refrigeration system, the evaporator defining a receptacle sized to receive the pod; and a motor operable to move the internal mixing paddle of a pod in the receptacle; wherein the refrigeration system has a working fluid loop that runs from the evaporator to a compressor to a condenser to an expansion valve back to the evaporator and the working fluid loop passes through a thermoelectric cooler between the condenser and the expansion valve.

Some machines for producing cooled food or drinks from ingredients in a pod containing the ingredients include: an evaporator of a refrigeration system, the evaporator defining a receptacle sized to receive the pod; and wherein the refrigeration system has a working fluid loop that runs from the evaporator to a compressor to a condenser to an expansion valve or capillary tube back to the evaporator; and wherein the evaporator is made of a material that has at least 160 W/mk thermal conductivity.

Some machines for producing cooled food or drinks from ingredients in a pod containing the ingredients include: an evaporator of a refrigeration system, the evaporator defining a receptacle sized to receive the pod; wherein the refrigeration system has a working fluid loop that runs from the evaporator to a compressor to a condenser to an expansion valve or capillary tube back to the evaporator; and wherein a refrigerant is selected from the group consisting of R143A, R134a, R410a, R32 and R404a, carbon dioxide, ammonia, propane and isobutane.

Some machines for producing cooled food or drinks from ingredients in a pod containing the ingredients include: an evaporator of a refrigeration system, the evaporator defining a receptacle sized to receive the pod; wherein the refrigeration system has a working fluid loop that runs from the evaporator to a compressor to a condenser to an expansion sub-system, comprising multiple orifices or expansion devices in parallel, back to the evaporator.

Some machines for producing cooled food or drinks from ingredients in a pod containing the ingredients include: an evaporator of a refrigeration system, the evaporator defining a receptacle sized to receive the pod; wherein the refrigeration system has a working fluid loop that runs from the evaporator to a compressor to a condenser to an expansion valve or capillary tube to a refrigerant line that pre-chills a tank of water, back to the evaporator.

Some machines for producing cooled food or drinks from ingredients in a pod containing the ingredients include: an evaporator of a refrigeration system, the evaporator defining a receptacle sized to receive the pod; wherein the refrigeration system has a working fluid loop that runs from the evaporator to the one side of a thermal battery to a compressor to a condenser to the other side of a thermal battery to an expansion valve or capillary tube, back to the evaporator.

Embodiments of these machines can include one or more of the following features.

In some embodiments, machines also include a bypass valve on the first bypass line.

In some embodiments, machines also include a second bypass line that extends from the working fluid loop between the compressor and the condenser to the working fluid loop between the evaporator and the compressor. In some cases, machines also include a bypass valve on the second bypass line. In some cases, machines also include a suction line heat exchanger.

In some embodiments, the working fluid loop passes through a reservoir of phase change material disposed between the compressor and the condenser. In some cases, the phase change material comprises ethylene glycol and water mixture, salt water, paraffin wax, alkanes, or pure water or a combination thereof. In some cases, the working fluid loop includes a pressure vessel between the condenser and the evaporator, a first isolation valve between the pressure vessel and the expansion valve, and a second isolation valve between the compressor and the condenser. In some cases, the working fluid loop passes through a thermoelectric cooler between the condenser and the expansion valve.

In some embodiments, machines also include an aluminum evaporator with a mass of not exceeding 1.50 pounds.

In some embodiments, machines also include a pressure drop through the refrigeration system less than 2 psi.

In some embodiments, machines also include a pod to evaporator heat transfer surface of up to 50 square inches.

In some embodiments, machines also include an evaporator has cooling channels in it allowing for the fluid mass velocity up to 180,000 lb/(hour feet squared). has refrigerant wetted surface area of up to 200 square inches.

In some embodiments, machines also include an evaporator refrigerant wetted surface area of up to 200 square inches.

In some embodiments, machines also include an evaporator that clamps down on the pod.

In some embodiments, machines also include an evaporator that has an internal wall of copper adjacent to the pod.

In some embodiments, machines also include an evaporator that is constructed of microchannels.

The systems and methods described in this specification can provide a number of advantages. Some embodiments of these systems and methods can provide single servings of cooled food or drink. This approach can help consumers with portion control. Some embodiments of these systems and methods can provide consumers the ability to choose their single-serving flavors, for example, of soft serve ice cream. Some embodiments of these systems and methods incorporate shelf-stable pods that do not require pre-cooling, pre-freezing or other preparation. Some embodiments of these systems and methods can generate frozen food or drinks from room-temperature pods in less than two minutes (in some cases, less than one minute). Some embodiments of these systems and methods do not require post-processing clean up once the cooled or frozen food or drink is generated. Some embodiments of these systems and methods utilize aluminum pods that are recyclable.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIGS. 7A and 7B are perspective views of a pod and an associated driveshaft.

FIG. 7C is a cross-section of a portion of the pod with the driveshaft engaged with a mixing paddle in the pod.

FIGS. 20A-20D are schematics of flow paths formed by the channels of the evaporator and an associated lid.

Like reference symbols in the various drawings indicate like elements.

DETAILED DESCRIPTION

This specification describes systems and methods for rapidly cooling food and drinks. Some of these systems and methods use a counter-top or installed machine to cool food and drinks in a container from room temperature to freezing in less than two minutes. For example, the approach described in this specification has successfully demonstrated the ability make soft-serve ice cream, frozen coffees, frozen smoothies, and frozen cocktails, from room temperature pods in approximately 90 seconds. This approach can also be used to chill cocktails, create frozen smoothies, frozen protein and other functional beverage shakes (e.g., collagen-based, energy, plant-based, non-dairy, CBD shakes), frozen coffee drinks and chilled coffee drinks with and without nitrogen in them, create hard ice cream, create milk shakes, create frozen yogurt and chilled probiotic drinks. These systems and methods are based on a refrigeration cycle with low startup times and a pod-machine interface that is easy to use and provides extremely efficient heat transfer. Some of the pods described can be sterilized (e.g., using retort sterilization) and used to store ingredients including, for example, dairy products at room temperature for up to 18 months.

Figure 1A:
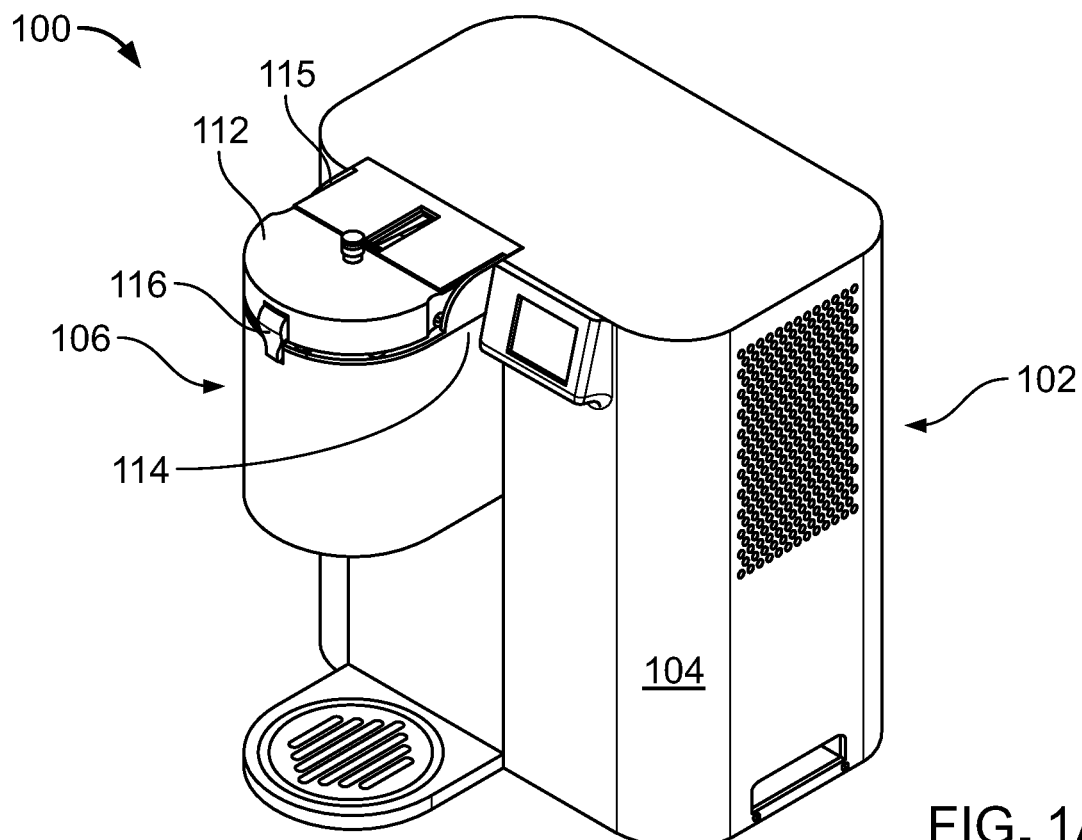
FIG. 1A is a perspective view of a machine for rapidly cooling food and drinks.
Figure 1B:
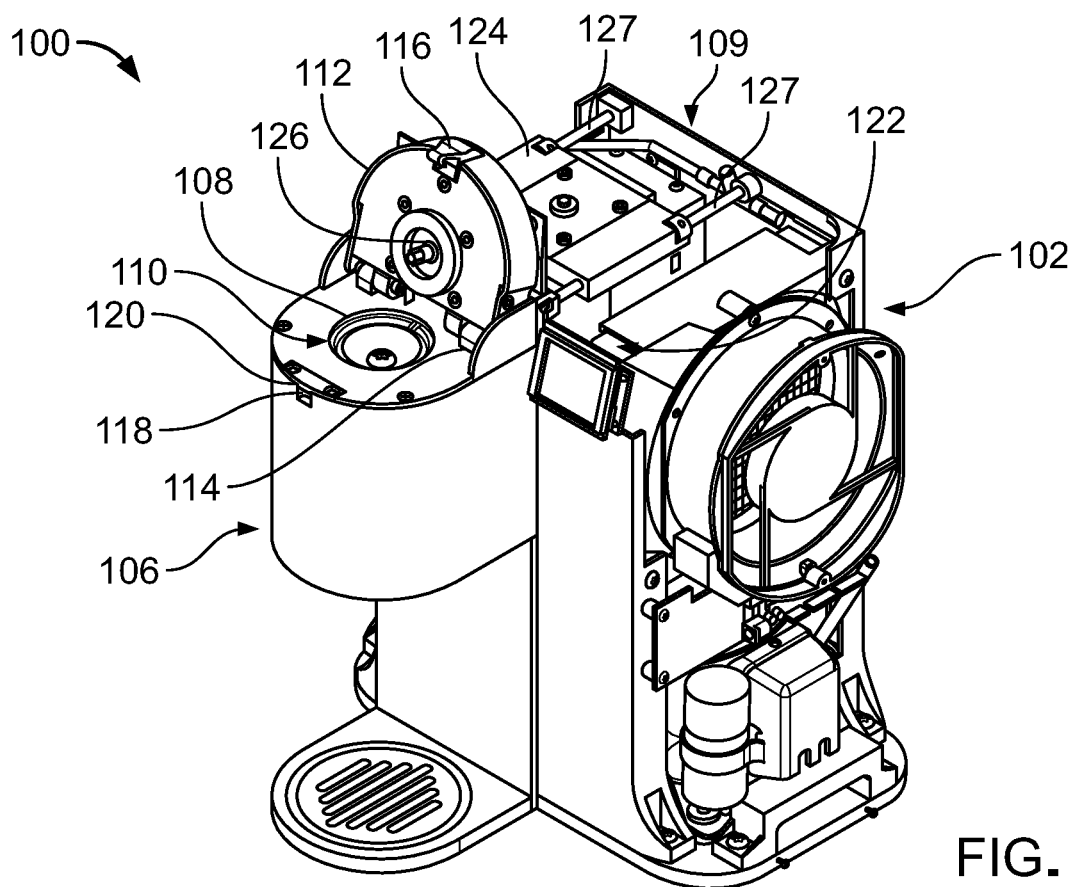
FIG. 1B shows the machine without its housing.

FIG. 1A is a perspective view of a machine 100 for cooling food or drinks. FIG. 1B shows the machine without its housing. The machine 100 reduces the temperature of ingredients in a pod containing the ingredients. Most pods include a mixing paddle used to mix the ingredients before dispensing the cooled or frozen products. The machine 100 includes a body 102 that includes a compressor, a condenser, a fan, an evaporator, capillary tubes, a control system, a lid system and a dispensing system with a housing 104 and a pod-machine interface 106. The pod-machine interface 106 includes an evaporator 108 of a refrigeration system 109 whose other components are disposed inside the housing 104. As shown on FIG. 1B, the evaporator 108 defines a receptacle 110 sized to receive a pod.

A lid 112 is attached to the housing 104 via a hinge 114. The lid 112 can rotate between a closed position covering the receptacle 110 (FIG. 1A) and an open position exposing the receptacle 110 (FIG. 1B). In the closed position, the lid 112 covers the receptacle 110 and is locked in place. In the machine 100, a latch 116 on the lid 112 engages with a latch recess 118 on the pod-machine interface 106. A latch sensor 120 is disposed in the latch recess 118 to determine if the latch 116 is engaged with the latch recess 118. A processor 122 is electronically connected to the latch sensor 120 and recognizes that the lid 112 is closed when the latch sensor 120 determines that the latch 116 and the latch recess 118 are engaged.

An auxiliary cover 115 rotates upward as the lid 112 is moved from its closed position to its open position. Some auxiliary covers slide into the housing when the lid moves into the open position.

In the machine 100, the evaporator 108 is fixed in position with respect to the body 102 of the machine 100 and access to the receptacle 110 is provided by movement of the lid 112. In some machines, the evaporator 108 is displaceable relative to the body 102 and movement of the evaporator 108 provides access to the receptacle 110.

A motor 124 disposed in the housing 104 is mechanically connected to a driveshaft 126 that extends from the lid 112. When the lid 112 is in its closed position, the driveshaft 126 extends into the receptacle 110 and, if a pod is present, engages with the pod to move a paddle or paddles within the pod. The processor 122 is in electronic communication with the motor 124 and controls operation of the motor 124. In some machines, the shaft associated with the paddle(s) of the pod extends outward from the pod and the lid 112 has a rotating receptacle (instead of the driveshaft 126) mechanically connected to the motor 124.

Figure 1C:
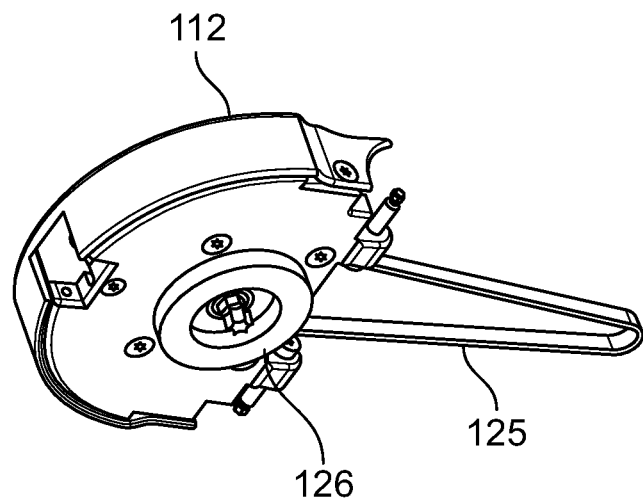
FIG. 1C is a perspective view of a portion of the machine of FIG. 1A.

FIG. 1C is perspective view of the lid 112 shown separately so the belt 125 that extends from motor 124 to the driveshaft 126 is visible. Referring again to FIG. 1B, the motor 124 is mounted on a plate that runs along rails 127. The plate can move approximately 0.25 inches to adjust the tension on the belt. During assembly, the plate slides along the rails. Springs disposed between the plate and the lid 112 bias the lid 112 away from the plate to maintain tension in the belt.

Figure 2A:
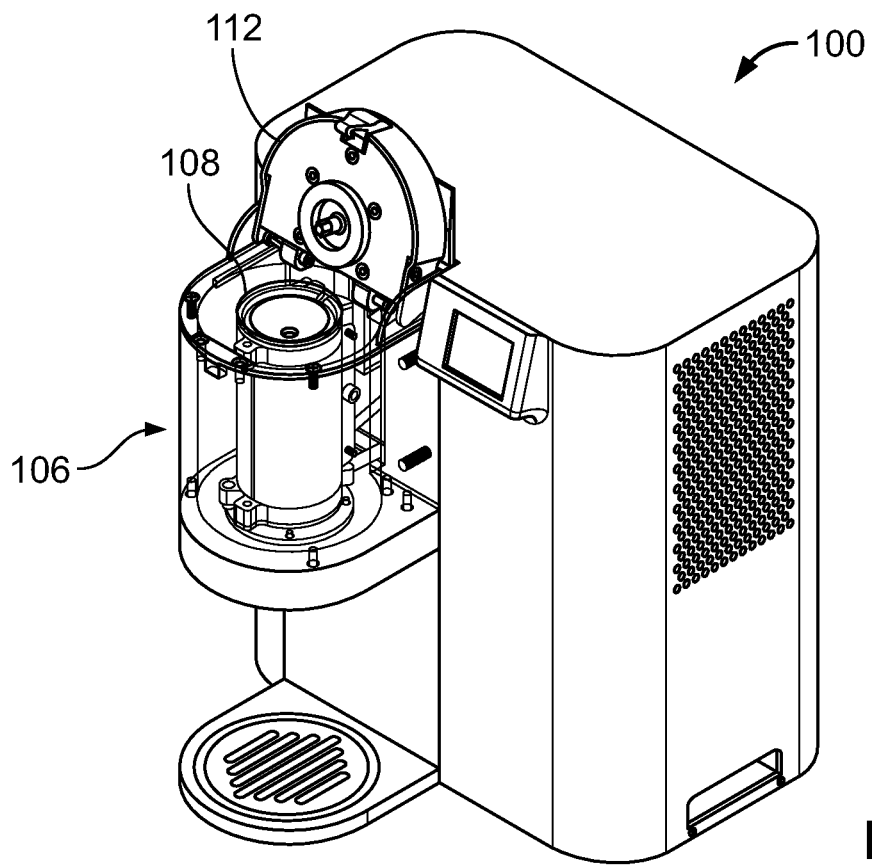
FIG. 2A is perspective view of the machine of FIG. 1A with the cover of the pod-machine interface illustrated as being transparent to allow a more detailed view of the evaporator to be seen.
Figure 2B:
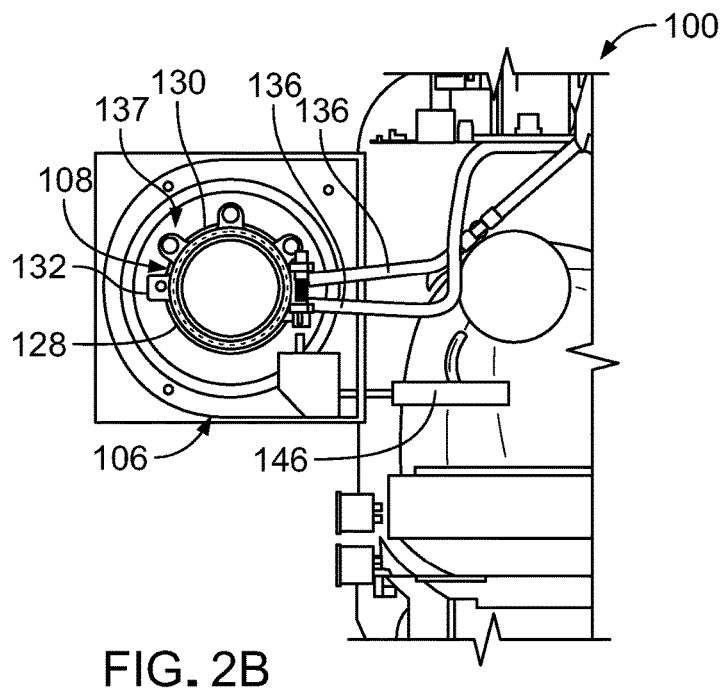
FIG. 2B is a top view of a portion of the machine without the housing and the pod-machine interface without the lid.
Figure 2C:
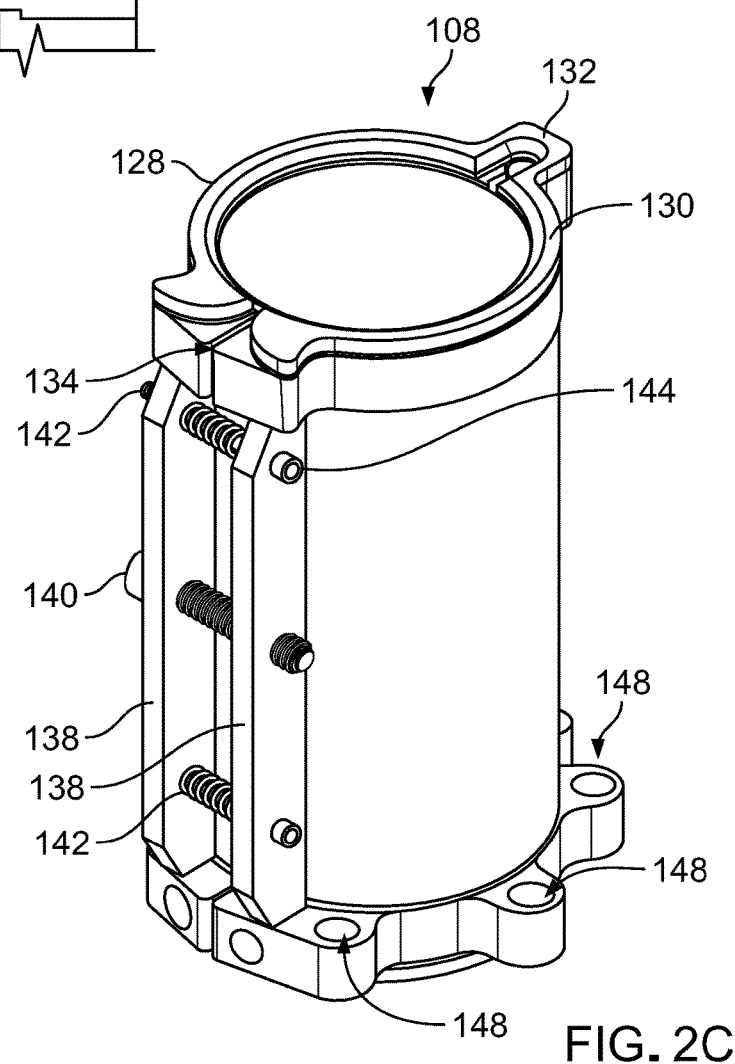
FIGS. 2C and 2D are, respectively, a perspective view and a side view of the evaporator.
Figure 2D:
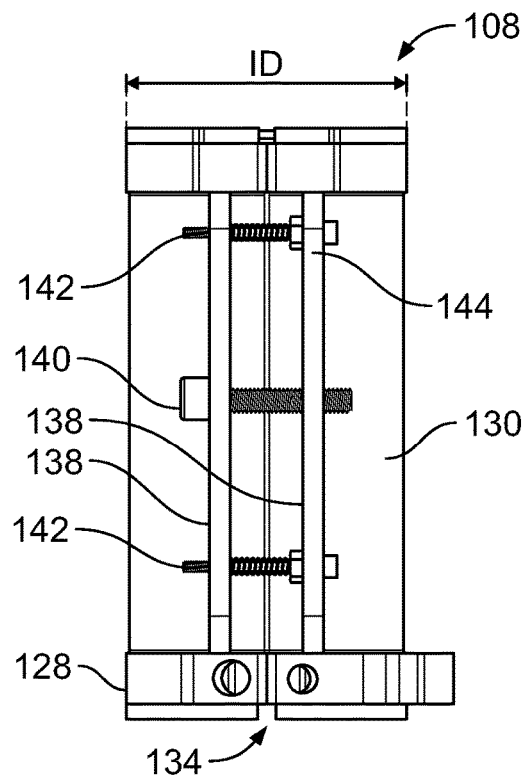

FIG. 2A is a perspective view of the machine 100 with the cover of the pod-machine interface 106 illustrated as being transparent to allow a more detailed view of the evaporator 108 to be seen. FIG. 2B is a top view of a portion of the machine 100 without housing 104 and the pod-machine interface 106 without the lid 112. FIGS. 2C and 2D are, respectively, a perspective view and a side view of the evaporator 108. Other pod-machine interfaces are described in more detail in U.S. patent application Ser. No. 16/459,176 filed Jul. 1, 2019 and incorporated herein by reference in its entirety.

The evaporator 108 has a clamshell configuration with a first portion 128 attached to a second portion 130 by a living hinge 132 on one side and separated by a gap 134 on the other side. Refrigerant flows to the evaporator 108 from other components of the refrigeration system through fluid channels 136 (best seen on FIG. 2B). The refrigerant flows through the evaporator 108 in internal channels through the first portion 128, the living hinge 132, and the second portion 130.

The space 137 (best seen on FIG. 2B) between the outer wall of the evaporator 108 and the inner wall of the casing of the pod-machine interface 106 is filled with an insulating material to reduce heat exchange between the environment and the evaporator 108. In the machine 100, the space 137 is filled with an aerogel (not shown). Some machines use other insulating material, for example, an annulus (such as an airspace), insulating foams made of various polymers, or fiberglass wool.

The evaporator 108 has an open position and a closed position. In the open position, the gap 134 opens to provide an air gap between the first portion 128 and the second portion 130. In the machine 100, the first portion 128 and the second portion 130 are pressed together in the closed position. In some machines, the first and second portion are pressed towards each other and the gap is reduced, but still defined by a space between the first and second portions in the closed position.

The inner diameter ID of the evaporator 108 is slightly larger in the open position than in the closed position. Pods can be inserted into and removed from the evaporator 108 while the evaporator is in the open position. Transitioning the evaporator 108 from its open position to its closed position after a pod is inserted tightens the evaporator 108 around the outer diameter of the pod. For example, the machine 100 is configured to use pods with 2.085" outer diameter. The evaporator 108 has an inner diameter of 2.115" in the open position and an inner diameter inner diameter of 2.085" in the closed position. Some machines have evaporators sized and configured to cool other pods. The pods can be formed from commercially available can sizes, for example, "slim" cans with diameters ranging from 2.080 inches-2.090 inches and volumes of 180 milliliters (ml)-300 ml, "sleek" cans with diameters ranging from 2.250 inches-2.400 inches and volumes of 180 ml-400 ml and "standard" size cans with diameters ranging from 2.500 inches-2.600 inches and volumes of 200 ml-500 ml. The machine 100 is configured to use pods with 2.085 inches outer diameter. The evaporator 108 has an inner diameter of 2.115 inches in its open position and an inner diameter inner diameter of 2.085 inches in its closed position. Some machines have evaporators sized and configured to cool other pods.

The closed position of evaporator 108 improves heat transfer between inserted pod 150 and the evaporator 108 by increasing the contact area between the pod 150 and the evaporator 108 and reducing or eliminating an air gap between the wall of the pod 150 and the evaporator 108. In some pods, the pressure applied to the pod by the evaporator 108 is opposed by the mixing paddles, pressurized gases within the pod, or both to maintain the casing shape of the pod.

In the evaporator 108, the relative position of the first portion 128 and the second portion 130 and the size of the gap 134 between them is controlled by two bars 138 connected by a bolt 140 and two springs 142. Each of the bars 138 has a threaded central hole through which the bolt 140 extends and two end holes engaging the pins 144. Each of the two springs 142 is disposed around a pin 144 that extends between the bars 138. Some machines use other systems to control the size of the gap 134, for example, circumferential cable systems with cables that extend around the outer diameter of the evaporator 108 with the cable being tightened to close the evaporator 108 and loosened to open the evaporator 108. In other evaporators, there are a plurality of bolts and end holes, one or more than two springs, and one or more than engaging pins.

One bar 138 is mounted on the first portion 128 of the evaporator 108 and the other bar 138 is mounted on the second portion 130 of the evaporator 108. In some evaporators, the bars 138 are integral to the body of the evaporator 108 rather than being mounted on the body of the evaporator. The springs 142 press the bars 138 away from each other. The spring force biases the first portion 128 and the second portion 130 of the evaporator 108 away from each at the gap 134. Rotation of the bolt 140 in one direction increases a force pushing the bars 138 towards each and rotation of the bolt in the opposite direction decreases this force. When the force applied by the bolt 140 is greater than the spring force, the bars 138 bring the first portion 128 and the second portion 130 of the evaporator together.

The machine 100 includes an electric motor 146 (shown on FIG. 2B) that is operable to rotate the bolt 140 to control the size of the gap 134. Some machines use other mechanisms to rotate the bolt 140. For example, some machines use a mechanical linkage, for example, between the lid 112 and the bolt 140 to rotate the bolt 140 as the lid 112 is opened and closed. Some machines include a handle that can be attached to the bolt to manually tighten or loosen the bolt. Some machines have a wedge system that forces the bars into a closed position when the machine lid is shut. This approach may be used instead of the electric motor 146 or can be provided as a backup in case the motor fails.

The electric motor 146 is in communication with and controlled by the processor 122 of the machine 100. Some electric drives include a torque sensor that sends torque measurements to the processor 122. The processor 122 signals to the motor to rotate the bolt 140 in a first direction to press the bars 138 together, for example, when a pod sensor indicates that a pod is disposed in the receptacle 110 or when the latch sensor 120 indicates that the lid 112 and pod-machine interface 106 are engaged. It is desirable that the clamshell evaporator be shut and holding the pod in a tightly fixed position before the lid closes and the shaft pierces the pod and engages the mixing paddle. This positioning can be important for driveshaft-mixing paddle engagement. The processor 122 signals to the electric drive to rotate the bolt 140 in the second direction, for example, after the food or drink being produced has been cooled/frozen and dispensed from the machine 100, thereby opening the evaporator gap 134 and allowing for easy removal of pod 150 from evaporator 108.

The base of the evaporator 108 has three bores 148 (see FIG. 2C) which are used to mount the evaporator 108 to the floor of the pod-machine interface 106. All three of the bores 148 extend through the base of the second portion 130 of the evaporator 108. The first portion 128 of the evaporator 108 is not directly attached to the floor of the pod-machine interface 106. This configuration enables the opening and closing movement described above. Other configurations that enable the opening and closing movement of the evaporator 108 can also be used. Some machines have more or fewer than three bores 148. Some evaporators are mounted to components other than the floor of the pod-machine interface, for example, the dispensing mechanism.

Many factors affect the performance of a refrigeration system. Important factors include mass velocity of refrigerant flowing through the system, the refrigerant wetted surface area, the refrigeration process, the area of the pod/evaporator heat transfer surface, the mass of the evaporator, and the thermal conductivity of the material of the heat transfer surface. Extensive modeling and empirical studies in the development of the prototype systems described in this specification have determined that appropriate choices for the mass velocity of refrigerant flowing through the system and the refrigerant wetted surface area are the most important parameters to balance to provide a system capable of freezing up to 12 ounces of confection in less than 2 minutes.

The evaporators described in this specification can have the following characteristics:

TABLE 1

Evaporator parameters

| | |
|---|---|
| Mass Velocity | 60,000 to 180,000 lb/(hour feet squared) |
| Refrigerant Wetted Surface Area | 35 to 200 square inches |
| Pressure drop Through Refrigeration Process | less than 2 psi pressure drop across the evaporator |
| Pod/Evaporator Heat Transfer Surface | 15 to 50 square inches |
| Mass of Evaporator | 0.100 to 1.50 pounds |
| Minimum Conductivity of the Material | 160 W/mK |

The following paragraphs describe the significance of these parameters in more detail.

Mass velocity accounts for the multi-phase nature or refrigerant flowing through an evaporator. The two-phase process takes advantage of the high amounts of heat absorbed and expended when a refrigerant fluid (e.g., R-290 propane) changes state from a liquid to gas and a gas to a liquid, respectively. The rate of heat transfer depends in part on exposing the evaporator inner surfaces with a new liquid refrigerant to vaporize and cool the liquid ice cream mix. To do this the velocity of the refrigerant fluid must be high enough for vapor to channel or flow down the center of the flow path within the walls of evaporator and for liquid refrigerant to be pushed thru these channel passages within the walls. One approximate measurement of fluid velocity in a refrigeration system is mass velocity—the mass flow of refrigerant in a system per unit cross sectional area of the flow passage in units of lb/hr ft$^2$. Velocity as measured in ft/s (a more familiar way to measure "velocity") is difficult to apply in a two-phase system since the velocity (ft/s) is constantly changing as the fluid flow changes state from liquid to gas. If liquid refrigerant is constantly sweeping across the evaporator walls, it can be vaporized and new liquid can be pushed against the wall of the cooling channels by the "core" of vapor flowing down the middle of the passage. At low velocities, flow separates based on gravity and liquid remains on the bottom of the cooling passage within the evaporator and vapor rises to the top side of the cooling passage channels. If the amount of area exposed to liquid is reduced by half, for example, this could cut the amount of heat transfer almost half. According to the American Society of Heating, Refrigerating and Air-Conditioning Engineers (ASHRAE), a mass velocity of 150,000 lb/hr ft$^2$ maximizes performance for the majority of the evaporator flow path. Mass velocity is one of the parameters that must be balanced to optimize a refrigerant system. The parameters that affect the performance of the evaporator are mass flow rate, convective heat transfer coefficient, and pressure drop. The nominal operating pressure of the evaporator is determined by the required temperature of the evaporator and the properties of the refrigerant used in the system. The mass flow rate of refrigerant through the evaporator must be high enough for it to absorb the amount of thermal energy from the confection to freeze it, in a given amount of time. Mass flow rate is primarily determined by the size of the compressor. It is desirable to use the smallest possible compressor to reduce, cost, weight and size. The convective heat transfer coefficient is influenced by the mass velocity and wetted surface area of the evaporator. The convective heat transfer coefficient will increase with increased mass velocity. However, pressure drop will also increase with mass velocity. This in turn increases the power required to operate the compressor and reduces the mass flow rate the compressor can deliver. It is desirable to design the evaporator to meet performance objectives while using the smallest least expensive compressor possible. We have determined that evaporators with a mass velocity of 75,000-125,000 lb/hr ft$^2$ are effective in helping provide a system capable of freezing up to 12 ounces of confection in less than 2 minutes. The latest prototype has a mass velocity of approximately 100,000 lb/hr ft$^2$ and provides a good balance of high mass velocity, manageable pressure drop in the system, and a reasonable sized compressor.

Another important factor that affects performance in an evaporator is the surface area wetted by refrigerant which is the area of all the cooling channels within the evaporator exposed to refrigerant. Increasing the wetted surface area can improve heat transfer characteristics of an evaporator. However, increasing the wetted surface area can increase the mass of the evaporator which would increase thermal inertia and degrade heat transfer characteristics of the evaporator.

The amount of heat that can be transferred out of the liquid in a pod is proportional to the surface area of the pod/evaporator heat transfer surface. A larger surface area is desirable but increases in surface area can require increasing the mass of the evaporator which would degrade heat transfer characteristics of the evaporator. We have determined that evaporators in which the area of the pod/evaporator heat transfer surface is between 20 and 40 square inches are effectively combined with the other characteristics to help provide a system capable of freezing up to 12 ounces of confection in less than 2 minutes.

Thermal conductivity is the intrinsic property of a material which relates its ability to conduct heat. Heat transfer by conduction involves transfer of energy within a material without any motion of the material as a whole. An evaporator with walls made of a high conductivity material (e.g., aluminum) reduces the temperature difference across the evaporator walls. Reducing this temperature difference reduces the work required for the refrigeration system to cool the evaporator to the right temperature.

For the desired heat transfer to occur, the evaporator must be cooled. The greater the mass of the evaporator, the longer this cooling will take. Reducing evaporator mass reduces the amount of material that must be cooled during a freezing cycle. An evaporator with a large mass will increase the time require to freeze up to 12 ounces of confection.

The effects of thermal conductivity and mass can be balanced by an appropriate choice of materials. There are materials with higher thermal conductivity than aluminum such as copper. However, the density of copper is greater that the density of aluminum. For this reason, some evaporators have been constructed that use high thermal conductive copper only on the heat exchange surfaces of the evaporator and use aluminum everywhere else.

FIGS. 3A-3F show components of the pod-machine interface 106 that are operable to open pods in the evaporator 108 to dispense the food or drink being produced by the machine 100. This is an example of one approach to opening pods but some machines and the associated pods use other approaches.

Figure 3A:
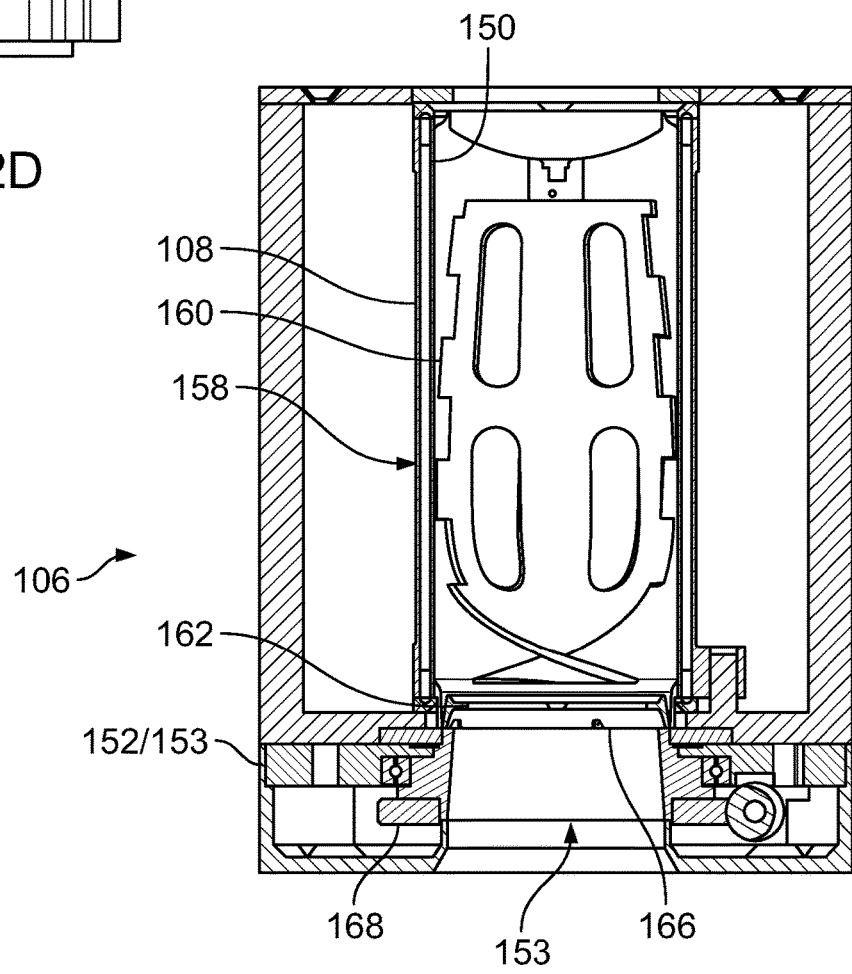
FIGS. 3A-3F show components of a pod-machine interface that are operable to open and close pods in the evaporator to dispense the food or drink being produced.
Figure 3B:
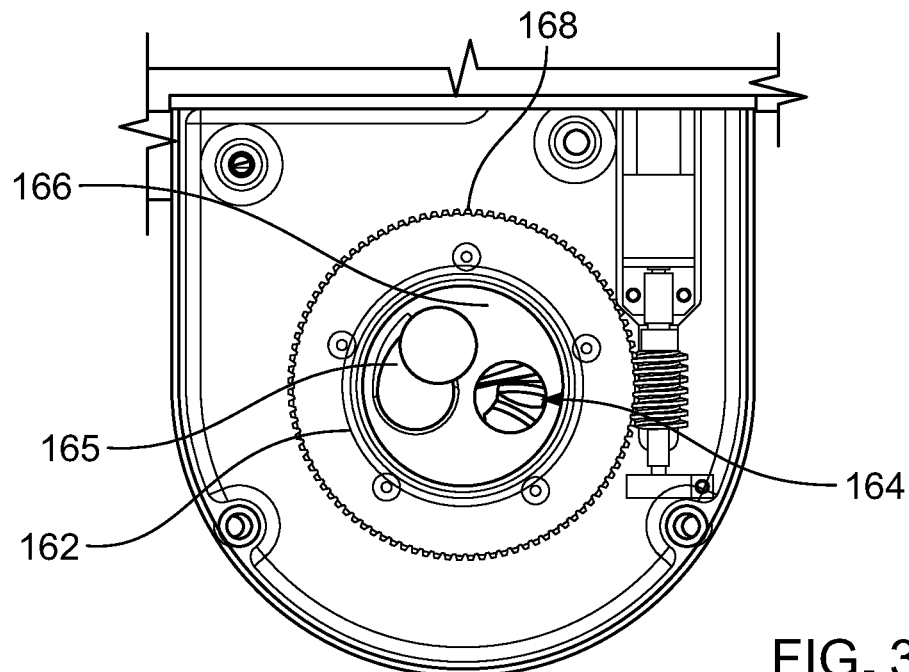
Figure 3C:
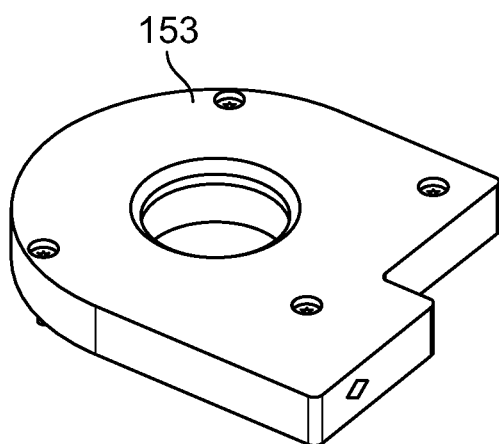
Figure 3D:
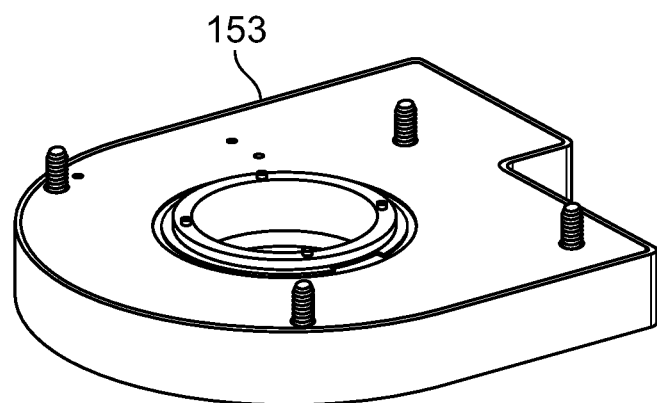
Figure 3E:
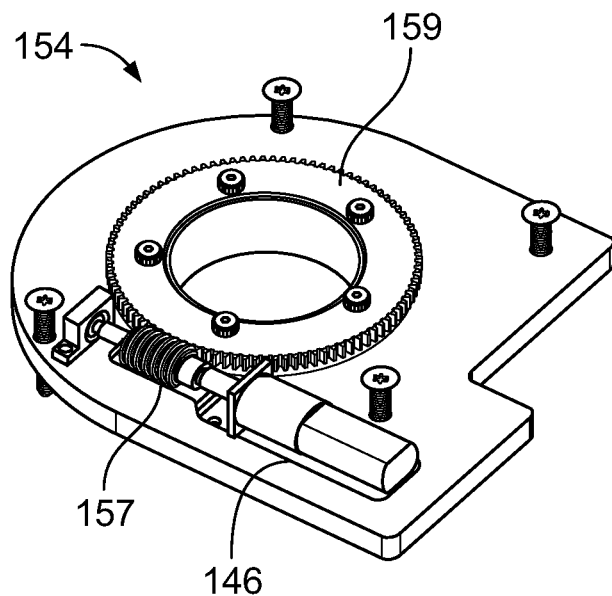
Figure 3F:
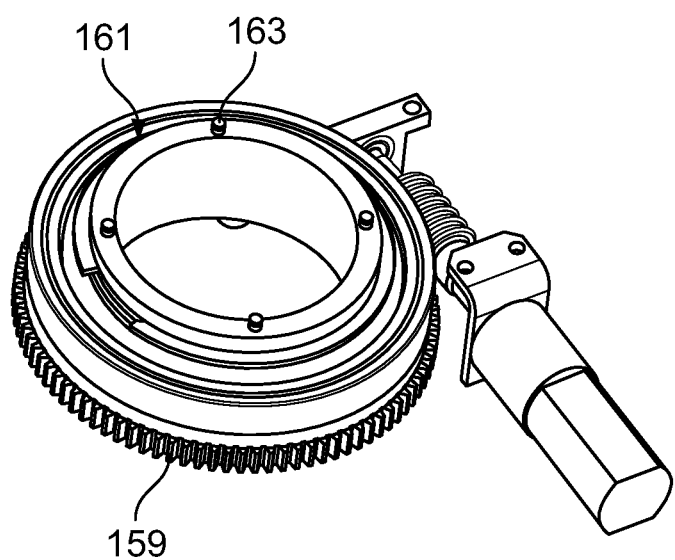

FIG. 3A is a partially cutaway schematic view of the pod-machine interface 106 with a pod 150 placed in the evaporator 108. FIG. 3B is a schematic plan view looking upwards that shows the relationship between the end of the pod 150 and the floor 152 of the pod-machine interface 106. The floor 152 of the pod-machine interface 106 is formed by a dispenser 153. FIGS. 3C and 3D are perspective views of a dispenser 153. FIGS. 3E and 3F are perspective views of an insert 154 that is disposed in the dispenser 153. The insert 154 includes an electric motor 146 operable to drive a worm gear 157 floor 152 of the pod-machine interface 106. The worm gear 157 is engaged with a gear 159 with an annular configuration. An annular member 161 mounted on the gear 159 extends from the gear 159 into an interior region of the pod-machine interface 106. The annular member 161 has protrusions 163 that are configured to engage with a pod inserted into the pod-machine interface 106 to open the pod. The protrusions 163 of the annular member 161 are four dowel-shaped protrusions. Some annular gears have more protrusions or fewer protrusions and the protrusions can have other shapes, for example, "teeth."

The pod 150 includes a body 158 containing a mixing paddle 160 (see FIG. 3A). The pod 150 also has a base 162 defining an aperture 164 and a cap 166 extending across the base 162 (see FIG. 3B). The base 162 is seamed/fixed onto the body 158 of the pod 150. The base 162 includes a protrusion 165. The cap 166 mounted over base 162 is rotatable around the circumference/axis of the pod 150. In use, when the product is ready to be dispensed from the pod 150, the dispenser 153 of the machine engages and rotates the cap 166 around the first end of the pod 150. Cap 166 is rotated to a position to engage and then separate the protrusion 165 from the rest of the base 162. The pod 150 and its components are described in more detail with respect to FIGS. 6A-10.

The aperture 164 in the base 162 is opened by rotation of the cap 166. The pod-machine interface 106 includes an electric motor 146 with threading that engages the outer circumference of a gear 168. Operation of the electric motor 146 causes the gear 168 to rotate. The gear 168 is attached to a annular member 161 and rotation of the gear 168 rotates the annular member 161. The gear 168 and the annular member 161 are both annular and together define a central bore through which food or drink can be dispensed from the pod 150 through the aperture 164 without contacting the gear 168 or the annular member 161. When the pod 150 is placed in the evaporator 108, the annular member 161 engages the cap 166 and rotation of the annular member 161 rotates the cap 166.

Figure 4:
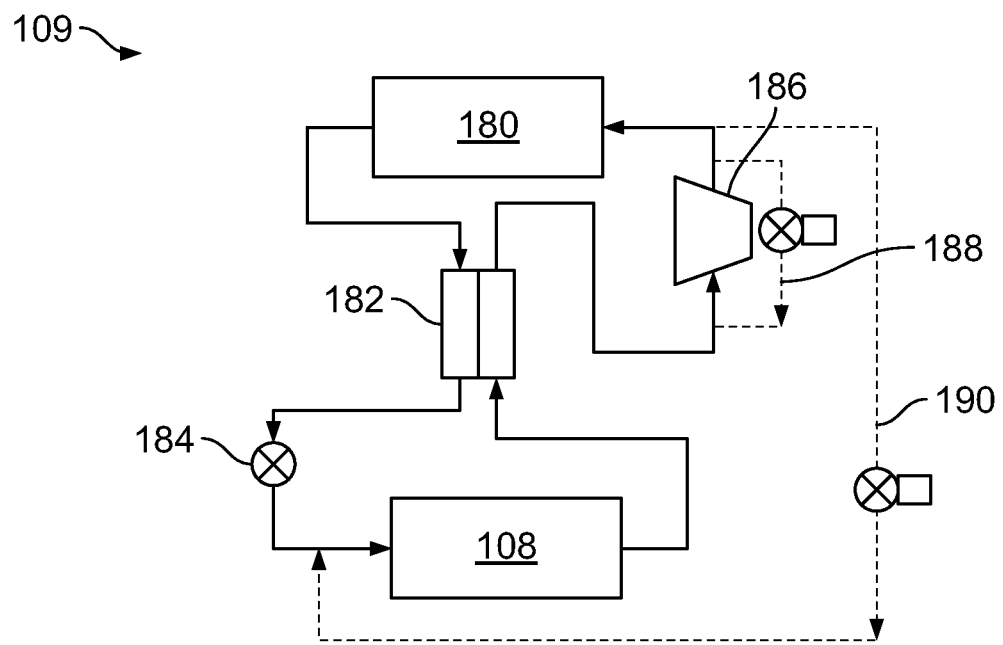
FIG. 4 is a schematic of a refrigeration system.

FIG. 4 is a schematic of the refrigeration system 109 that includes the evaporator 108. The refrigeration system also includes a condenser 180, a suction line heat exchanger 182, an expansion valve 184, and a compressor 186. High-pressure, liquid refrigerant flows from the condenser 180 through the suction line heat exchanger 182 and the expansion valve 184 to the evaporator 108. The expansion valve 184 restricts the flow of the liquid refrigerant fluid and lowers the pressure of the liquid refrigerant as it leaves the expansion valve 184. The low-pressure liquid-vapor mixture then moves to the evaporator 108 where heat absorbed from a pod 150 and its contents in the evaporator 108 changes the refrigerant from a liquid-vapor mixture to a gas. The gas-phase refrigerant flows from the evaporator 108 to the compressor 186 through the suction line heat exchanger 182. In the suction line heat exchanger 182, the cold vapor leaving the evaporator 108 pre-cools the liquid leaving the condenser 180. The refrigerant enters the compressor 186 as a low-pressure gas and leaves the compressor 186 as a high-pressure gas. The gas then flows to the condenser 180 where heat exchange cools and condenses the refrigerant to a liquid.

The refrigeration system 109 includes a first bypass line 188 and second bypass line 190. The first bypass line 188 directly connects the discharge of the compressor 186 to the inlet of the compressor 186. Disposed on the both the first bypass line and second bypass line are bypass valves that open and close the passage to allow refrigerant bypass flow. Diverting the refrigerant directly from the compressor discharge to the inlet can provide evaporator defrosting and temperature control without injecting hot gas to the evaporator. The first bypass line 188 also provides a means for rapid pressure equalization across the compressor 186, which allows for rapid restarting (i.e., freezing one pod after another quickly). The second bypass line 190 enables the application of warm gas to the evaporator 108 to defrost the evaporator 108. The bypass valves may be, for example, solenoid valves or throttle valves.

Figure 5A:
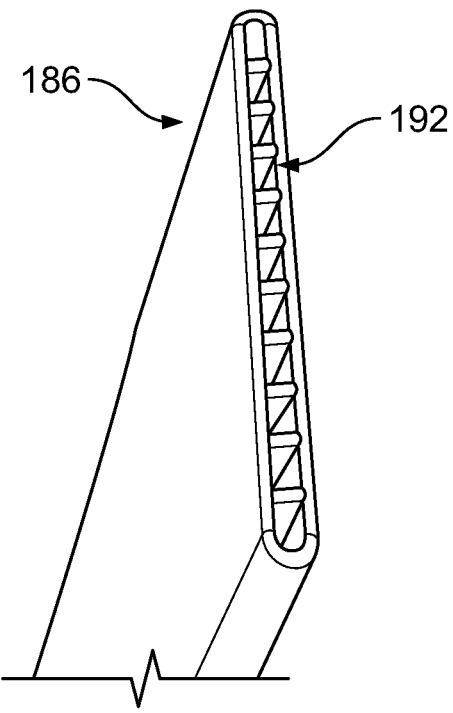
FIGS. 5A and 5B are views of a prototype of a condenser.
Figure 5B:
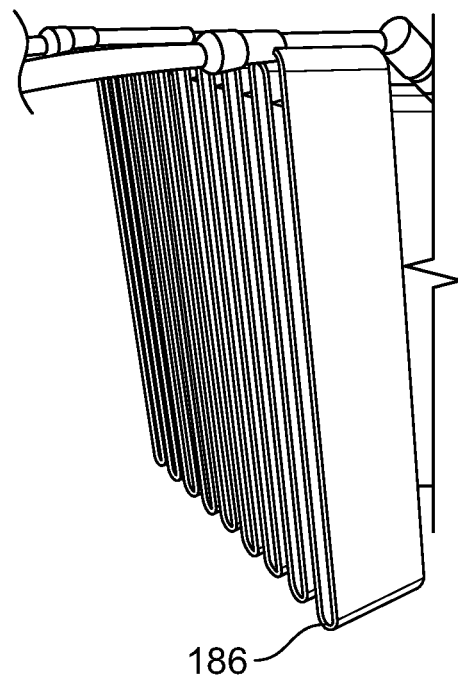

FIGS. 5A and 5B are views of a prototype of the condenser 180. The condenser has internal channels 192. The internal channels 192 increase the surface area that interacts with the refrigerant cooling the refrigerant quickly. These images show micro-channel tubing which are used because they have small channels which keeps the coolant velocity up and are thin wall for good heat transfer and have little mass to prevent the condenser for being a heat sink.

Figure 6A:
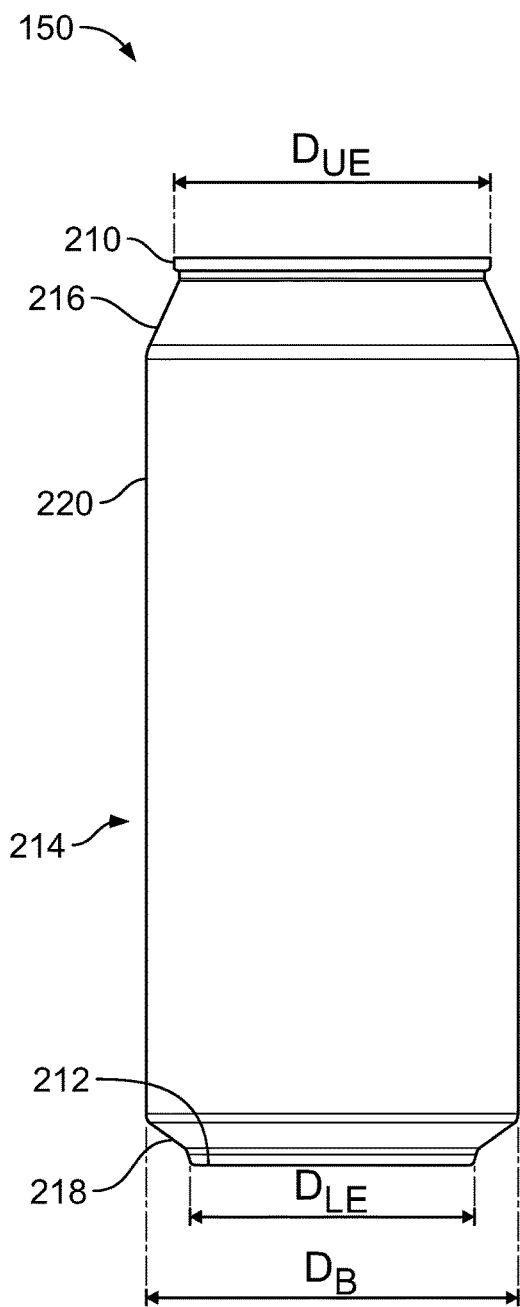
FIG. 6A is a side view of a pod.
Figure 6B:
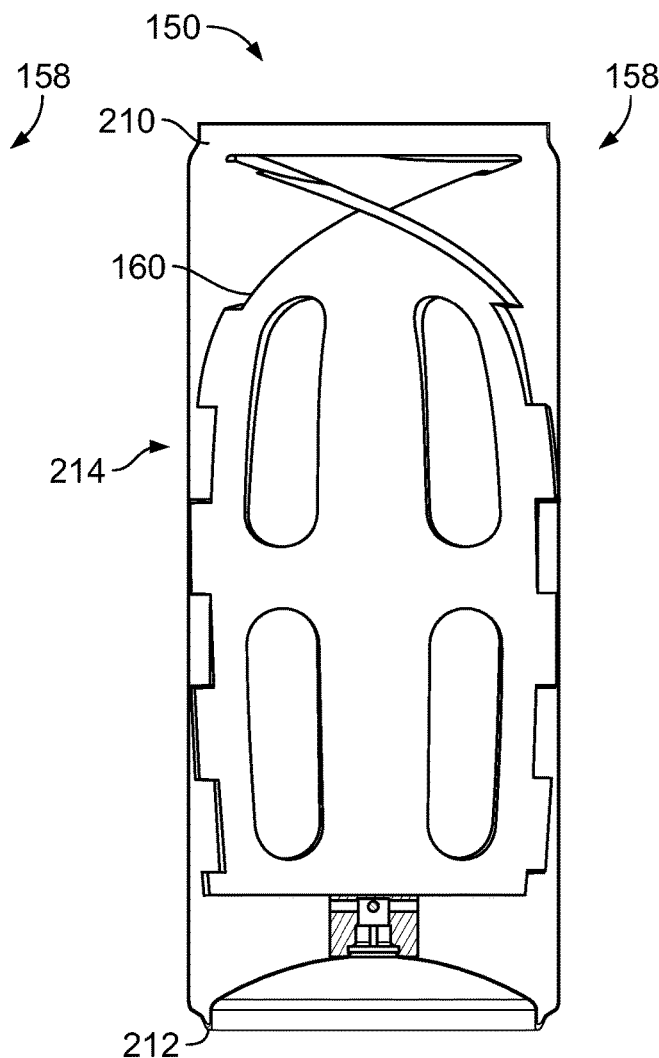
FIG. 6B is a schematic side view of the pod and a mixing paddle disposed in the pod.

FIGS. 6A and 6B show an example of a pod 150 for use with the machine 100 described with respect to FIGS. 1A-3F. FIG. 6A is a side view of the pod 150. FIG. 6B is a schematic side view of the pod 150 and the mixing paddle 160 disposed in the body 158 of the pod 150. Other pod-machine interfaces that can be used with this and similar machines are described in more detail in U.S. patent application Ser. No. 16/459,322 filed Jul. 1, 2019 and incorporated herein by reference in its entirety.

The pod 150 is sized to fit in the receptacle 110 of the machine 100. The pods can be sized to provide a single serving of the food or drink being produced. Typically, pods have a volume between 6 and 18 fluid ounces. The pod 150 has a volume of approximately 8.5 fluid ounces.

The body 158 of the pod 150 is a can that contains the mixing paddle 160. The body 158 extends from a first end 210 at the base to a second end 212 and has a circular cross-section. The first end 210 has a diameter $D_{UE}$ that is slightly larger than the diameter $D_{LE}$ of the second end 212. This configuration facilitates stacking multiple pods 200 on top of one another with the first end 210 of one pod receiving the second end 212 of another pod.

A wall 214 connects the first end 210 to the second end 212. The wall 214 has a first neck 216, second neck 218, and a barrel 220 between the first neck 216 and the second neck 218. The barrel 220 has a circular cross-section with a diameter $D_B$. The diameter $D_B$ is larger than both the diameter $D_{UE}$ of the first end 210 and the diameter $D_{LE}$ of the second end 212. The first neck 216 connects the barrel 220 to the first end 210 and slopes as the first neck 216 extends from the smaller diameter $D_{UE}$ to the larger diameter DB the barrel 220. The second neck 218 connects the barrel 220 to the second end 212 and slopes as the second neck 218 extends from the larger diameter $D_B$ of the barrel 220 to the smaller diameter $D_{LE}$ of the second end 212. The second neck 218 is sloped more steeply than the first neck 216 as the second end 212 has a smaller diameter than the first end 210.

This configuration of the pod 150 provides increased material usage; i.e., the ability to use more base material (e.g., aluminum) per pod. This configuration further assists with the columnar strength of the pod.

The pod 150 is designed for good heat transfer from the evaporator to the contents of the pod. The body 158 of the pod 150 is made of aluminum and is between 5 and 50 microns thick. The bodies of some pods are made of other materials, for example, tin, stainless steel, and various polymers such as Polyethylene terephthalate (PTE).

Pod 150 may be made from a combination of different materials to assist with the manufacturability and performance of the pod. In one embodiment, the pod walls and the second end 212 may be made of Aluminum 3104 while the base may be made of Aluminum 5182.

In some pods, the internal components of the pod are coated with a lacquer to prevent corrosion of the pod as it comes into contact with the ingredients contained within pod. This lacquer also reduces the likelihood of "off notes" of the metal in the food and beverage ingredients contained within pod. For example, a pod made of aluminum may be internally coated with one or a combination of the following coatings: Sherwin Williams/Valspar V70Q11, V70Q05, 32SO2AD, 40Q60AJ; PPG Innovel 2012-823, 2012-820C; and/or Akzo Nobel Aqualure G1 50. Other coatings made by the same or other coating manufacturers may also be used.

Some mixing paddles are made of similar aluminum alloys and coated with similar lacquers/coatings. For example, Whitford/PPG coating 8870 may be used as a coating for mixing paddles. The mixing paddle lacquer may have additional non-stick and hardening benefits for mixing paddle.

FIGS. 7A-7C illustrate the engagement between the driveshaft 126 of the machine 100 and the mixing paddle 160 of a pod 150 inserted in the machine 100. FIGS. 7A and 7B are perspective views of the pod 150 and the driveshaft 126. In use, the pod 150 is inserted into the receptacle 110 of the evaporator 108 with the first end 210 of the pod 150 downward. This orientation exposes the second end 212 of the pod 150 to the driveshaft 126 as shown in FIG. 7A. Closing the lid 112 (see FIG. 1A) presses the driveshaft 126 against the second end 212 of the pod 150 with sufficient force that the driveshaft 126 pierces the second end 212 of the pod 150. FIG. 7B shows the resulting hole exposing the mixing paddle 160 with the driveshaft 126 offset for ease of viewing. FIG. 7C is a cross-section of a portion of the pod 150 with the driveshaft 126 engaged with the mixing paddle 160 after the lid is closed. Typically, there is not a tight seal between the driveshaft 126 and the pod 150 so that air can flow in as the frozen confection is evacuating/dispensing out the other end of the pod 150. In an alternative embodiment, there is a tight seal such that the pod 150 retains pressure in order to enhance contact between the pod 150 and evaporator 108.

Some mixing paddles contain a funnel or receptacle configuration that receives the punctured end of the second end of the pod when the second end is punctured by driveshaft.

Figure 8:
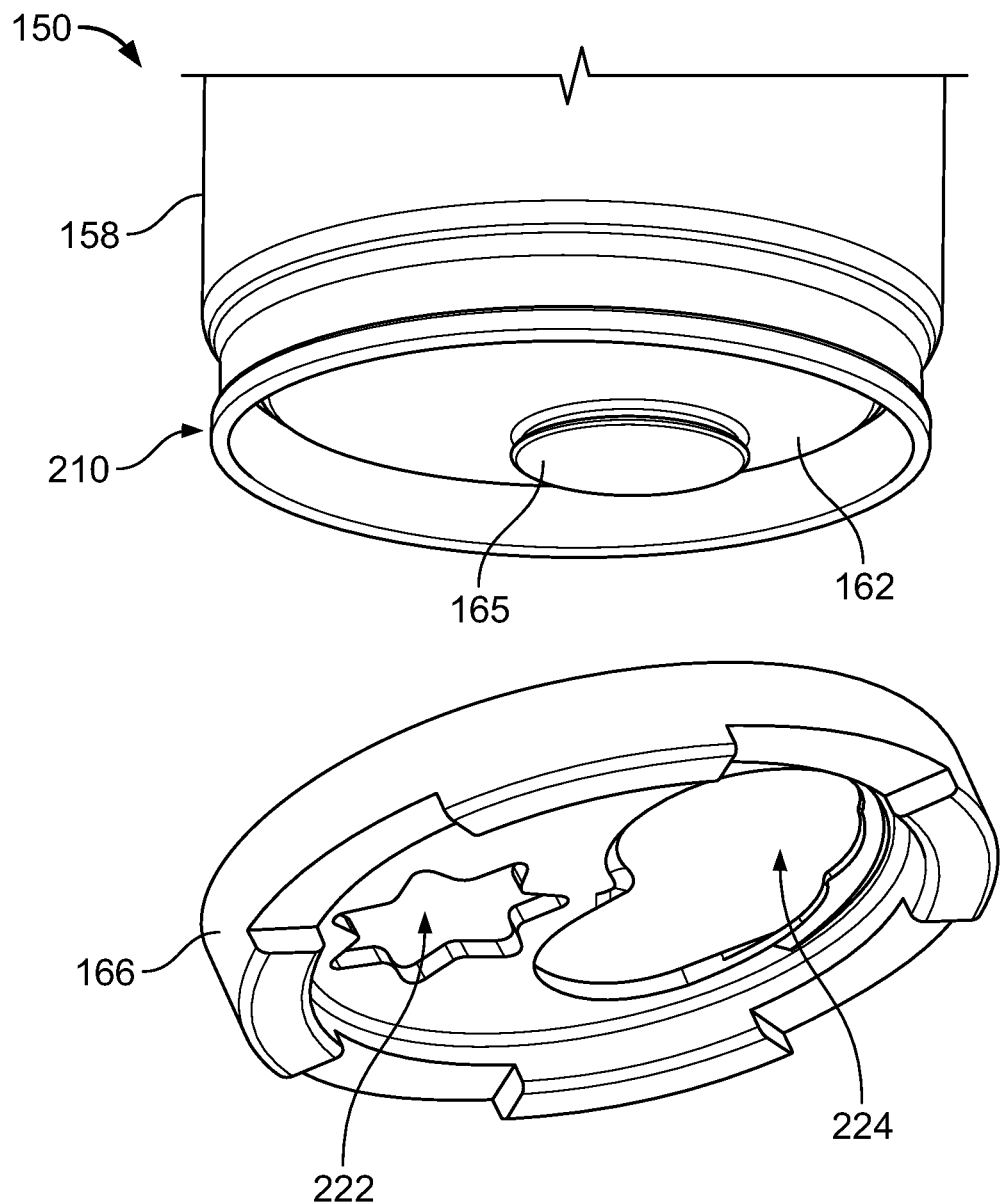
FIG. 8 shows a first end of a pod with its cap spaced apart from its base for ease of viewing.

FIG. 8 shows the first end 210 of the pod 150 with the cap 166 spaced apart from the base 162 for ease of viewing. FIGS. 9A-9D illustrate rotation of the cap 166 around the first end 210 of the pod 150 to cut and carry away protrusion 165 of base 162 and expose aperture 164 extending through the base 162.

The base 162 is manufactured separately from the body 158 of the pod 150 and then attached (for example, by crimping or seaming) to the body 158 of the pod 150 covering an open end of the body 158. The protrusion 165 of the base 162 can be formed, for example, by stamping, deep drawing, or heading a sheet of aluminum being used to form the base. The protrusion 165 is attached to the remainder of the base 162, for example, by a weakened score line 173. The scoring can be a vertical score into the base of the aluminum sheet or a horizontal score into the wall of the protrusion 165. For example, the material can be scored from an initial thickness of 0.008 inches to 0.010 inches to a post-scoring thickness of 0.001 inches-0.008 inches. In an alternative embodiment, there is no post-stamping scoring but rather the walls are intentionally thinned for ease of rupture. In another version, there is not variable wall thickness but rather the cap 166 combined with force of the machine dispensing mechanism engagement are enough to cut the 0.008 inches to 0.010 inches wall thickness on the protrusion 165. With the scoring, the protrusion 165 can be lifted and sheared off the base 162 with 5-75 pounds of force, for example between 15-40 pounds of force.

The cap 166 has a first aperture 222 and a second aperture 224. The first aperture approximately matches the shape of the aperture 164. The aperture 164 is exposed and extends through the base 162 when the protrusion 165 is removed. The second aperture 224 has a shape corresponding to two overlapping circles. One of the overlapping circles has a shape that corresponds to the shape of the protrusion 165 and the other of the overlapping circles is slightly smaller. A ramp 226 extends between the outer edges of the two overlapping circles. There is an additional 0.020" material thickness at the top of the ramp transition. This extra height helps to lift and rupture the protrusion's head and open the aperture during the rotation of the cap as described in more detail with reference to FIGS. 9A-9G.

Figure 9A:
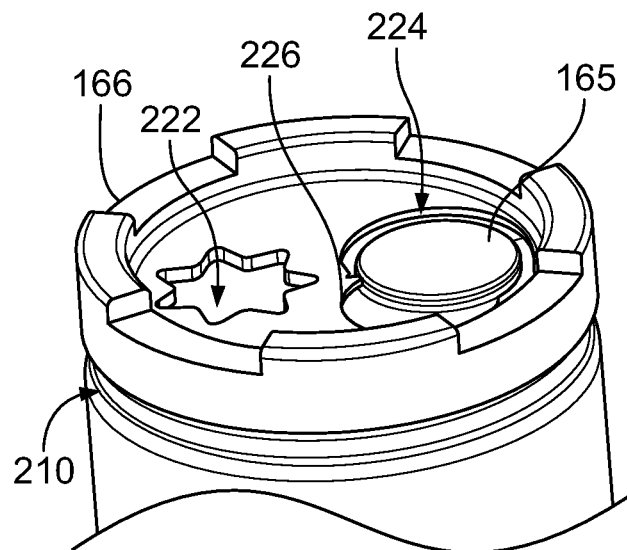
FIGS. 9A-9G illustrate rotation of a cap around the first end of the pod to open an aperture extending through the base.
Figure 9B:
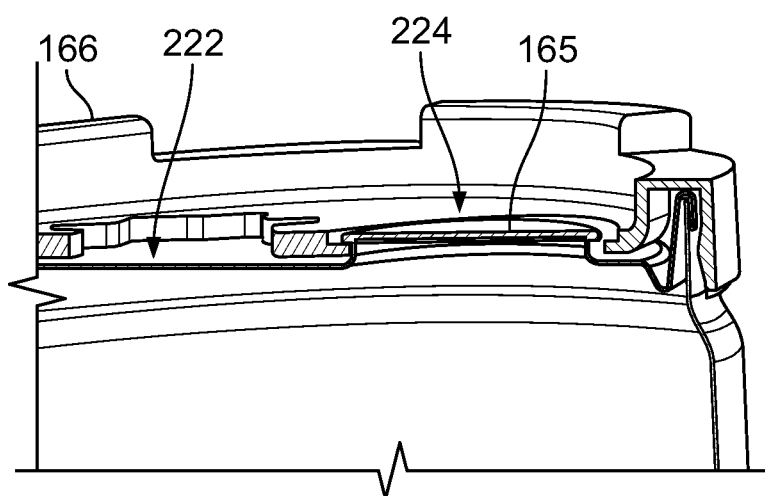
Figure 9C:
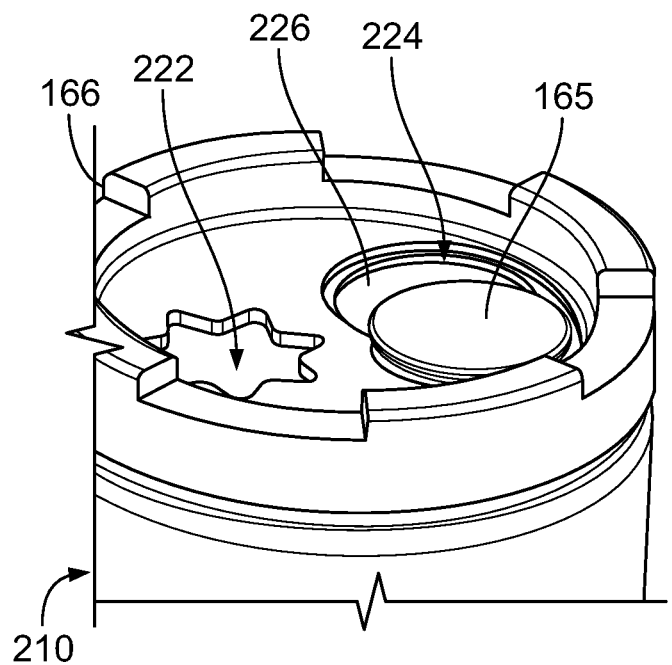
Figure 9D:
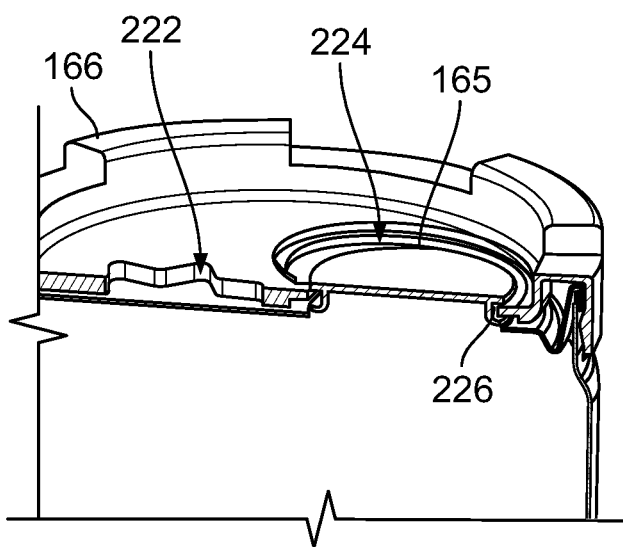
Figure 9E:
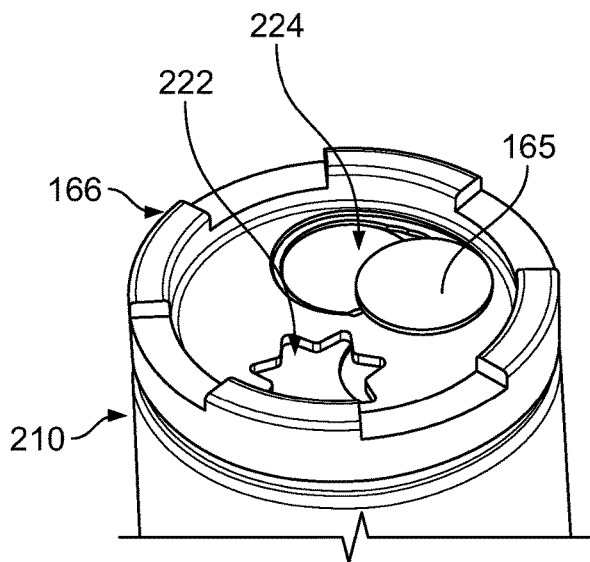
Figure 9F:
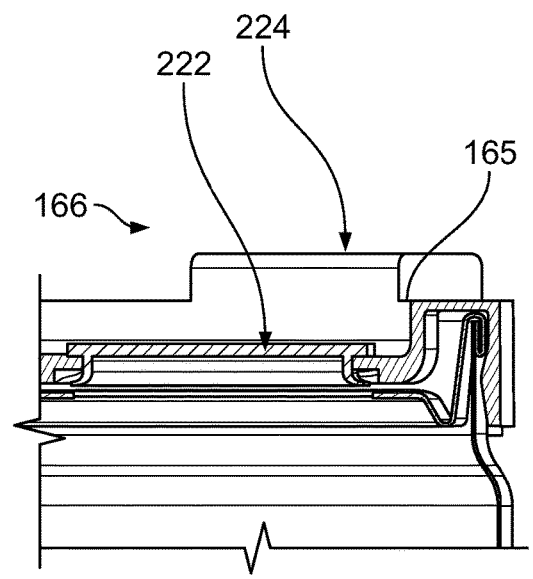
Figure 9G:
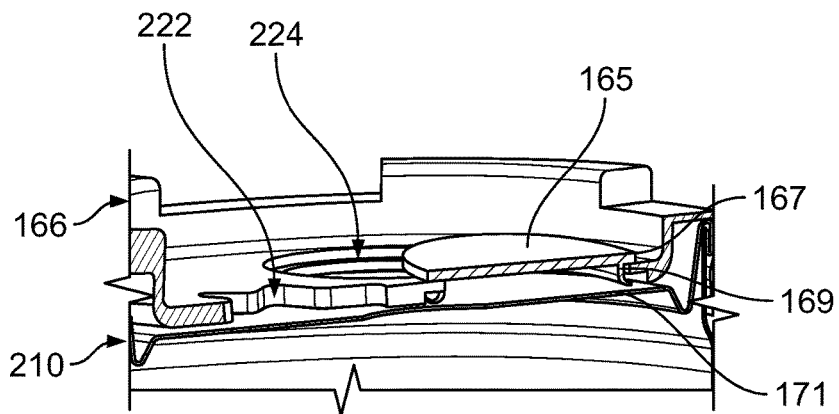

As shown in FIGS. 9A and 9B, the cap 166 is initially attached to the base 162 with the protrusion 165 aligned with and extending through the larger of the overlapping circles of the second aperture 224. When the processor 122 of the machine activates the electric motor 146 to rotate the gear 168 and the annular member 161, rotation of the cap 166 slides the ramp 226 under a lip of the protrusion 165 as shown in FIGS. 9C and 9D. Continued rotation of the cap 166 applies a lifting force that separates the protrusion 165 from the remainder of the base 162 (see FIGS. 9E-9G) and then aligns the first aperture 222 of the cap 166 with the aperture 164 in the base 162 resulting from removal of the protrusion 165.

Some pods include a structure for retaining the protrusion 165 after the protrusion 165 is separated from the base 162. In the pod 150, the protrusion 165 has a head 167, a stem 169, and a foot 171 (best seen in FIG. 9G). The stem 169 extends between the head 167 and the foot 171 and has a smaller cross-section that the head 167 and the foot 171. As rotation of the cap 166 separates the protrusion 165 from the remainder of the base 162, the cap 166 presses laterally against the stem 169 with the head 167 and the foot 171 bracketing the cap 166 along the edges of one of the overlapping circles of the second aperture 224. This configuration retains the protrusion 165 when the protrusion 165 is separated from the base 166. Such a configuration reduces the likelihood that the protrusion falls into the waiting receptacle that when the protrusion 165 is removed from the base.

Some pods include other approaches to separating the protrusion 165 from the remainder of the base 162. For example, in some pods, the base has a rotatable cutting mechanism that is riveted to the base. The rotatable cutting mechanism has a shape similar to that described relative to cap 166 but this secondary piece is riveted to and located within the perimeter of base 162 rather than being mounted over and around base 162. When the refrigeration cycle is complete, the processor 122 of the machine activates an arm of the machine to rotate the riveted cutting mechanism around a rivet. During rotation, the cutting mechanism engages, cuts and carries away the protrusion 165, leaving the aperture 164 of base 162 in its place.

In another example, some pods have caps with a sliding knife that moves across the base to remove the protrusion. The sliding knife is activated by the machine and, when triggered by the controller, slides across the base to separate, remove, and collect the protrusion 165. The cap 166 has a guillotine feature that, when activated by the machine, may slide straight across and over the base 162. The cap 166 engages, cuts, and carries away the protrusion 165. In another embodiment, this guillotine feature may be central to the machine and not the cap 166 of pod 150. In another embodiment, this guillotine feature may be mounted as a secondary piece within base 162 and not a secondary mounted piece as is the case with cap 166.

Some pods have a dispensing mechanism that includes a pop top that can be engaged and released by the machine. When the refrigeration cycle is complete, an arm of the machine engages and lifts a tab of the pod, thereby pressing the puncturing the base and creating an aperture in the base. Chilled or frozen product is dispensed through the aperture. The punctured surface of the base remains hinged to base and is retained inside the pod during dispensing. The mixing avoids or rotates over the punctured surface or, in another embodiment, so that the mixing paddle continues to rotate without obstruction. In some pop tops, the arm of the machine separates the punctured surface from the base.

Figure 10:
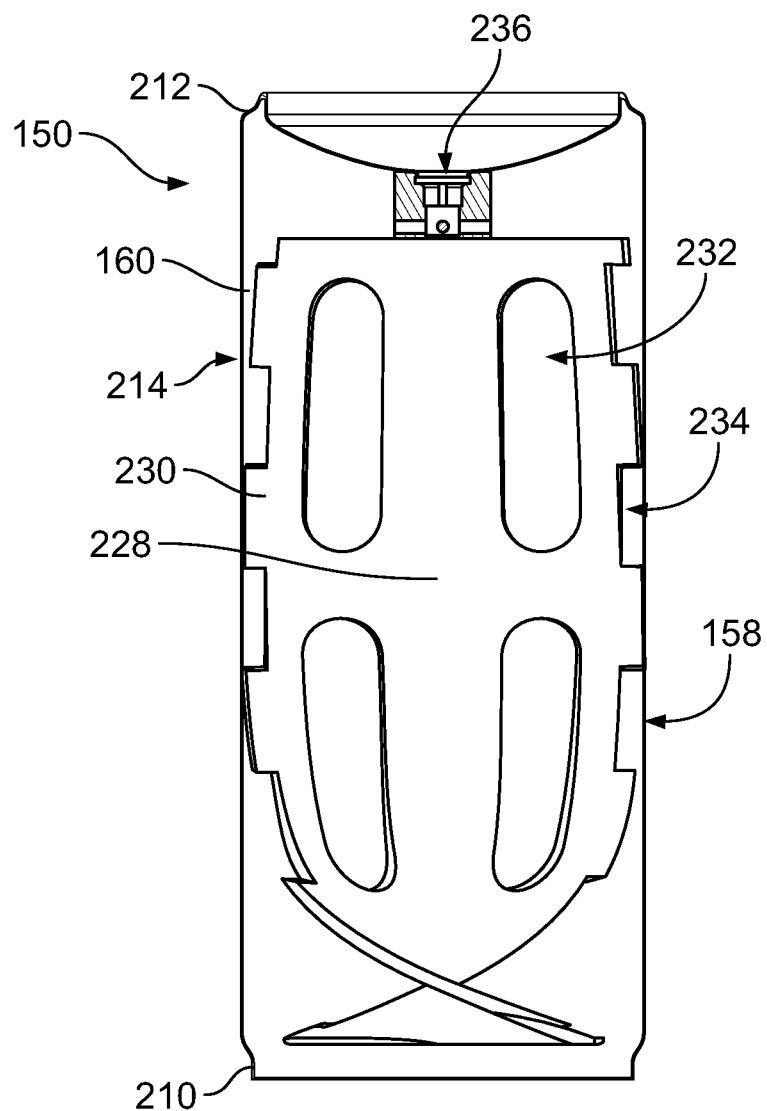
FIG. 10 is an enlarged schematic side view of a pod.

FIG. 10 is an enlarged schematic side view of the pod 150. The mixing paddle 160 includes a central stem 228 and two blades 230 extending from the central stem 228. The blades 230 are helical blades shaped to churn the contents of the pod 150 and to remove ingredients that adhere to inner surface of the body 158 of the pod 150. Some mixing paddles have a single blade and some mixing paddles have more than two mixing paddles.

Fluids (for example, liquid ingredients, air, or frozen confection) flow through openings 232 in the blades 230 when the mixing paddle 160 rotates. These openings reduce the force required to rotate the mixing paddle 160. This reduction can be significant as the viscosity of the ingredients increases (e.g., as ice cream forms). The openings 232 further assist in mixing and aerating the ingredients within the pod.

The lateral edges of the blades 230 define slots 234. The slots 234 are offset so that most of the inner surface of the body 158 is cleared of ingredients that adhere to inner surface of the body by one of the blades 230 as the mixing paddle 160 rotates. Although the mixing paddle is 160 wider than the first end 210 of the body 158 of the pod 150, the slots 234 are alternating slots that facilitate insertion of the mixing paddle 160 into the body 158 of the pod 150 by rotating the mixing paddle 160 during insertion so that the slots 234 are aligned with the first end 210. In another embodiment, the outer diameter of the mixing paddle are less than the diameter of the pod 150 opening, allowing for a straight insertion (without rotation) into the pod 150. In another embodiment, one blade on the mixing paddle has an outer-diameter that is wider than the second blade diameter, thus allowing for straight insertion (without rotation) into the pod 150. In this mixing paddle configuration, one blade is intended to remove (e.g., scrape) ingredients from the sidewall while the second, shorter diameter blade, is intended to perform more of a churning operation.

Some mixing paddles have one or more blades that are hinged to the central stem. During insertion, the blades can be hinged into a condensed formation and released into an expanded formation once inserted. Some hinged blades are fixed open while rotating in a first direction and collapsible when rotating in a second direction, opposite the first direction. Some hinged blades lock into a fixed, outward, position once inside the pod regardless of rotational directions. Some hinged blades are manually condensed, expanded, and locked.

The mixing paddle 160 rotates clockwise and removes frozen confection build up from the pod 214 wall. Gravity forces the confection removed from the pod wall to fall towards first end 210. In the counterclockwise direction, the mixing paddle 160 rotate, lift and churn the ingredients towards the second end 212. When the paddle changes direction and rotates clockwise the ingredients are pushed towards the first end 210. When the protrusion 165 of the base 162 is removed as shown and described with respect to FIG. 9D, clockwise rotation of the mixing paddle dispenses produced food or drink from the pod 150 through the aperture 164. Some paddles mix and dispense the contents of the pod by rotating a first direction. Some paddles mix by moving in a first direction and a second direction and dispense by moving in the second direction when the pod is opened.

The central stem 228 defines a recess 236 that is sized to receive the driveshaft 126 of the machine 100. The recess and driveshaft 126 have a square cross section so that the driveshaft 126 and the mixing paddle 160 are rotatably constrained. When the motor rotates the driveshaft 126, the driveshaft rotates the mixing paddle 160. In some embodiments, the cross section of the driveshaft is a different shape and the cross section of the recess is compatibly shaped. In some cases the driveshaft and recess are threadedly connected. In some pods, the recess contains a mating structure that grips the driveshaft to rotationally couple the driveshaft to the paddle.

Figure 11:
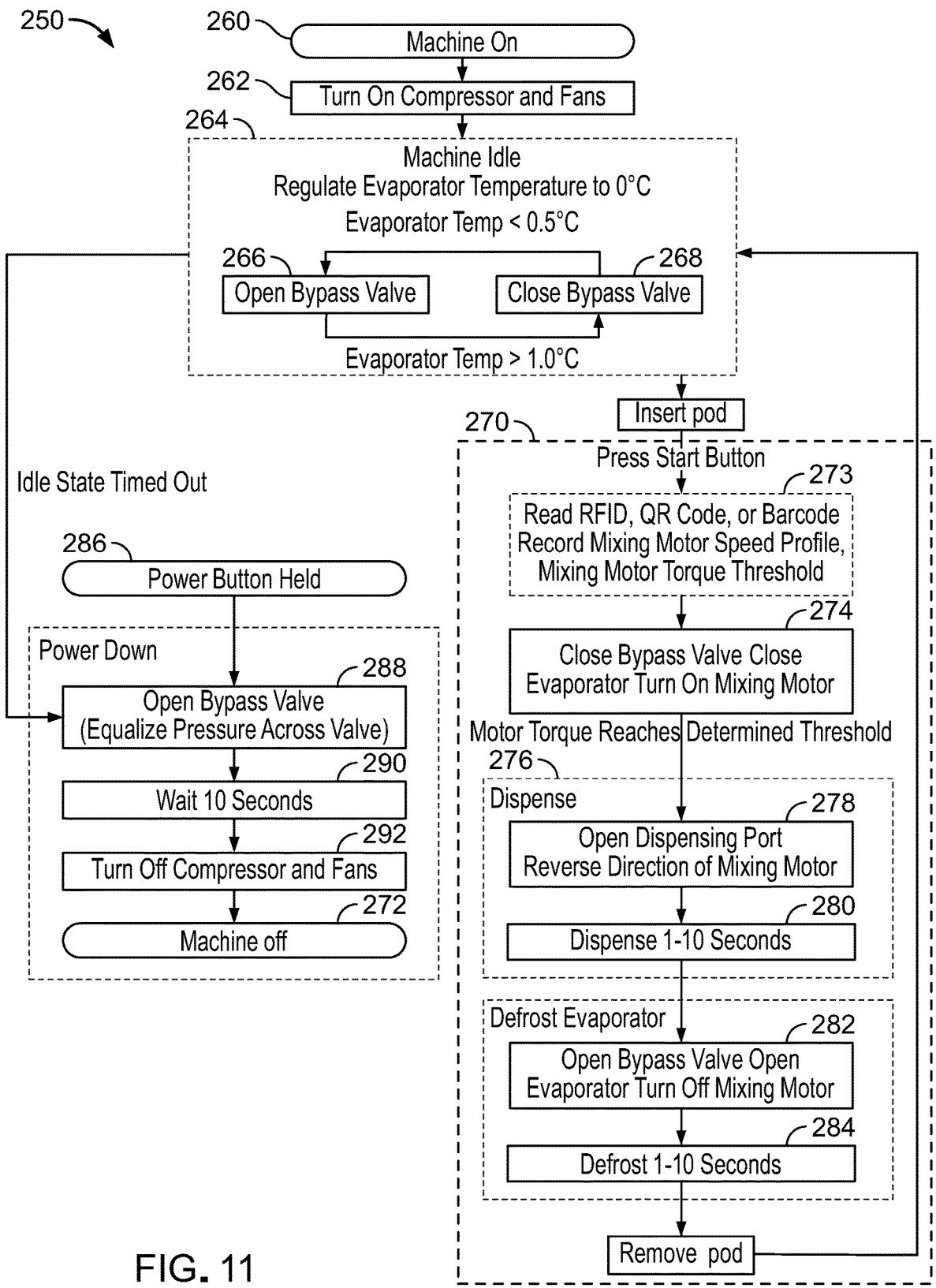
FIG. 11 is a flow chart of a method for operating a machine for producing cooled food or drinks.

FIG. 11 is a flow chart of a method 250 implemented on the processor 122 for operating the machine 100. The method 250 is described with references to refrigeration system 109 and machine 100. The method 250 may also be used with other refrigeration systems and machines. The method 250 is described as producing soft serve ice cream but can also be used to produce other cooled or frozen drinks and foods.

The first step of the method 250 is to turn the machine 100 on (step 260) and turn on the compressor 186 and the fans associated with the condenser 180 (step 262). The refrigeration system 109 then idles at regulated temperature (step 264). In the method 250, the evaporator 108 temperature is controlled to remain around 0.75° C. but may fluctuate by ±0.25° C. Some machines are operated at other idle temperatures, for example, from 0.75° C. to room temperature (22.0° C.). If the evaporator temperature is below 0.5° C., the processor 122 opens the bypass valve 190 to increase the heat of the system (step 266). When the evaporator temperature goes over 1° C., the bypass valve 190 is closed to cool the evaporator (step 268). From the idle state, the machine 100 can be operated to produce ice cream (step 270) or can shut down (step 272).

After inserting a pod, the user presses the start button. When the user presses the start button, the bypass valve 190 closes, the evaporator 108 moves to its closed position, and the motor 124 is turned on (step 274). In some machines, the evaporator is closed electronically using a motor. In some machines, the evaporator is closed mechanically, for example by the lid moving from the open position to the closed position. In some systems, a sensor confirms that a pod 150 is present in the evaporator 108 before these actions are taken.

Some systems include radio frequency identification (RFID) tags or other intelligent bar codes such as UPC bar or QR codes. Identification information on pods can be used to trigger specific cooling and mixing algorithms for specific pods. These systems can optionally read the RFID, QR code, or barcode and identify the mixing motor speed profile and the mixing motor torque threshold (step 273).

The identification information can also be used to facilitate direct to consumer marketing (e.g., over the internet or using a subscription model). This approach and the systems described in this specification enable selling ice cream thru e-commerce because the pods are shelf stable. In the subscription mode, customers pay a monthly fee for a predetermined number of pods shipped to them each month. They can select their personalized pods from various categories (e.g., ice cream, healthy smoothies, frozen coffees or frozen cocktails) as well as their personalized flavors (e.g., chocolate or vanilla).

The identification can also be used to track each pod used. In some systems, the machine is linked with a network and can be configured to inform a vendor as to which pods are being used and need to be replaced (e.g., through a weekly shipment). This method is more efficient than having the consumers go to the grocery store and purchase pods.

These actions cool the pod 150 in the evaporator 108 while rotating the mixing paddle 160. As the ice cream forms, the viscosity of the contents of the pod 150 increases. A torque sensor of the machine measures the torque of the motor 124 required to rotate the mixing paddle 160 within the pod 150. Once the torque of the motor 124 measured by a torque sensor satisfies a predetermined threshold, the machine 100 moves into a dispensing mode (276). The dispensing port opens and the motor 124 reverses direction (step 278) to press the frozen confection out of the pod 150. This continues for approximately 1 to 10 seconds to dispense the contents of the pod 150 (step 280). The machine 100 then switches to defrost mode (step 282). Frost that builds up on the evaporator 108 can reduce the heat transfer efficiency of the evaporator 108. In addition, the evaporator 108 can freeze to the pod 150, the first portion 128 and second portion 130 of the evaporator can freeze together, and/or the pod can freeze to the evaporator. The evaporator can be defrosted between cycles to avoid these issues by opening the bypass valve 170, opening the evaporator 108, and turning off the motor 124 (step 282). The machine then diverts gas through the bypass valve for about 1 to 10 seconds to defrost the evaporator (step 284). The machine is programmed to defrost after every cycle, unless a thermocouple reports that the evaporator 108 is already above freezing. The pod can then be removed. The machine 100 then returns to idle mode (step 264). In some machines, a thermometer measures the temperature of the contents of pod 150 and identifies when it is time to dispense the contents of the pod. In some machines, the dispensing mode begins when a predetermined time is achieved. In some machines, a combination of torque required to turn the mixing paddle, mixing motor current draw, temperature of the pod, and/or time determines when it is time to dispense the contents of the pod.

If the idle time expires, the machine 100 automatically powers down (step 272). A user can also power down the machine 100 by holding down the power button (286). When powering down, the processor opens the bypass valve 190 to equalize pressure across the valve (step 288). The machine 100 waits ten seconds (step 290) then turns off the compressor 186 and fans (step 292). The machine is then off.

Figure 12:
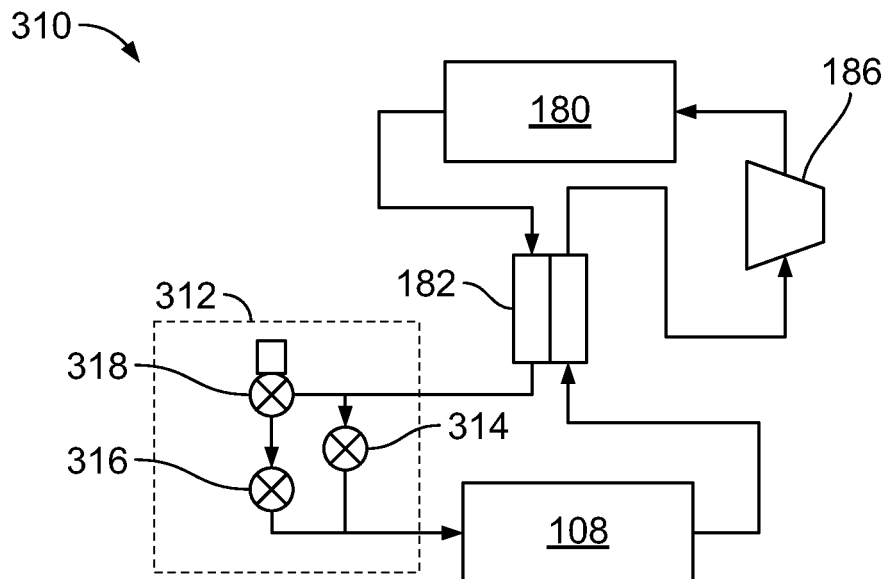
FIG. 12 is a schematic of a refrigeration system that includes an evaporator and an expansion sub-system.

FIG. 12 is a schematic of a refrigeration system 310 that includes the evaporator 108 and an expansion sub-system 312. The refrigeration system 310 is substantially similar to the refrigeration system 109. However, the refrigeration system 310 includes the expansion sub-system 312 rather than the expansion valve 184 shown in the refrigeration system 109. The refrigeration system 310 does not include the first bypass line 188 and the second bypass line 190 that are part of the refrigeration system 109. However, some systems include the with the expansion sub-system 312, the first bypass line, and the second bypass line.

The expansion sub-system 312 includes multiple valves to control expansion of the refrigeration fluid. These valves include a first fixed orifice valve 314, a second fixed orifice valve 316, and a control valve 318. The control valve 318 is upstream from the second fixed orifice valve 316. The control valve 318 and second fixed orifice valve 316 are in parallel with the first fixed orifice valve 314. The expansion device has two modes to control the temperature of the refrigerant entering the evaporator 108. In the first mode, the control valve 318 is open allowing the refrigerant to flow to the second fixed orifice valve 316. In the first mode, the refrigerant flows through both the first fixed orifice valves 314 and the second fixed orifice valves 316. In the second mode, the control valve 318 is closed and the refrigerant does not flow through the second fixed orifice valve 316. All refrigerant flows through the first fixed orifice valve 314.

As discussed with reference to FIG. 4, the expansion valve 184 or expansion sub-system 312 receives a high-pressure refrigerant and releases low-pressure refrigerant. This pressure drop cools the refrigerant. Larger changes in pressure ($\Delta P$) cause larger changes in temperature ($\Delta T$). In the second mode (i.e., with control valve 318 closed), the pressure drop through the expansion sub-system 312 will be higher than in the first mode providing a lower evaporator pressure and associated lower evaporator temperature. The effect on heat transfer of the increased temperature differential between the refrigerant and the contents of a pod in the evaporator 108 is offset to some extent by the fact that this lower pressure refrigerant is less dense. Since the compressor moves a fixed volume of refrigerant each compression cycle, the mass flow per cycle is reduced, which lowers heat transfer. In the second mode of operation, there is a big temperature difference between the pod and evaporator, requiring large heat transfer, which increases the amount of mass flow needed.

During initial operation, the refrigeration system 310 is in the first mode. The control valve 318 is open and the refrigerant flows through both the first fixed orifice valve 314 and second fixed orifice valve 316. This results in the evaporator operating at around a temperature of −20° C. to −10° C. At this temperature, the cooling system provides more cooling capacity than it can at lower temperatures by taking advantage of the higher density refrigerant passing through the evaporator.

The pod 150 is inserted into the evaporator 108 around room temperature (e.g., 22° C.). The initial difference in temperature between the evaporator 108 and the pod 150 is high. As a result, the heat transfers rapidly from the pod 150 to the evaporator 108. The difference between the temperature of the pod 150 and the evaporator 108 decreases as the pod 150 cools and the transfer of heat from the pod 150 to the evaporator 108 also slows. At this point, the system 310 enters the second mode and the control valve 318 closes. The refrigerant flows only through the first fixed orifice valve 314 and the ΔP between the refrigerant entering the first fixed orifice valve 314 and exiting the first fixed orifice valve 314 increases. The ΔT also increases resulting in a colder evaporator 108 with temperatures of approximately −15° C. to −30° C. This reduces the cooling capacity of the system, but increases the temperature difference between the pod and nest, which allows for quick final freezing of the ice cream. In the second mode activated when the temperature difference between the pod and evaporator reduces to the point of impacting heat transfer, the lower refrigerant temperature augments the overall heat transfer even through less mass is flowing in the system.

In some embodiments, the temperature of the evaporator in the first mode is above freezing. This configuration can precool the evaporator before use and defrost the evaporator after use.

The configuration of the refrigeration system 310 increases temperature control, which can reduce freezing time and reduce the required compressor output. The reduction in required compressor output allows for a reduction in the size of the compressor.

In some refrigeration systems, the expansion sub-system includes more than two valves. The multi-valve sub-systems can have more than two modes, further increasing temperature control.

In some refrigeration systems use other types of valves such as, for example, thermostatic expansion valves and electronic expansion valves. Both thermostatic expansion valves and electronic expansion valves can adapt the orifice size based on various loads and operating conditions. For example, the thermostatic expansion valves sense the evaporator outlet temperature of the refrigerant and adjusts flow through the thermostatic expansion valve to maintain predetermined or desired operating conditions. The electronic expansion valves are electrically actuated to adapt the orifice size based on evaporator outlet temperature and electronic signals from a control unit 371.

Figure 13:
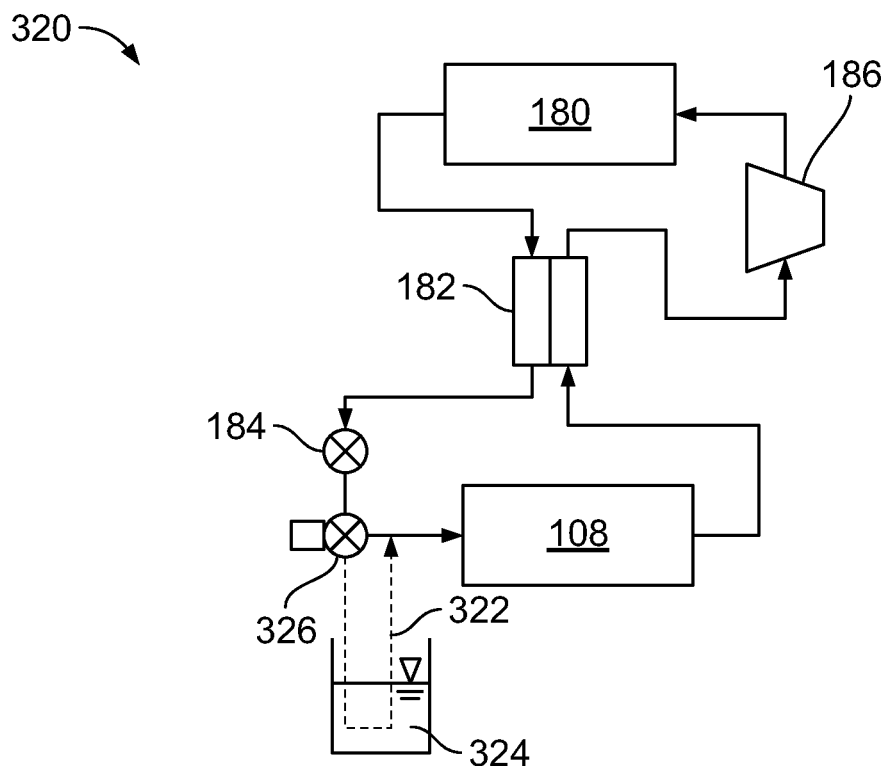
FIG. 13 is a schematic of a refrigeration system that includes a bypass line that pre-chills a tank of water prior upstream of an evaporator.

FIG. 13 is a schematic of a refrigeration system 320 that includes a refrigerant line 322 that pre-chills a tank 324 of water prior to entering the evaporator 108. The refrigeration system 320 is substantially similar to the refrigeration system 109. However, the refrigeration system 320 includes the pre-chilling line 322 and omits the first bypass line 188 and the second bypass line 190 that are part of the refrigeration system 109. Some systems include the first bypass line, the second bypass line, and the pre-chilling line.

The refrigeration system 320 is used in machines include the water tank 324. Machines with water tanks inject fluid into the pod during mixing, for example, to dissolve dry ingredients or dilute the contents of the pod. Chilled water freezes more quickly than hot or room temperature water.

In use, a valve 326 is operated to route refrigerant through pre-chilling to route refrigerant exiting the expansion valve 184 through the pre-chilling line 322. The cold, low-pressure refrigerant flows through the pre-chilling line 322 that is partially or fully disposed in the water tank 324. If the water tank 324 is filled with water, the pre-chilling line 322 is partially or fully submerged in the water. The refrigerant cools the water in the water tank 324 and exits the pre-chilling line 322. The refrigerant then enters the evaporator 108 to cool the evaporator 108.

Figure 14:
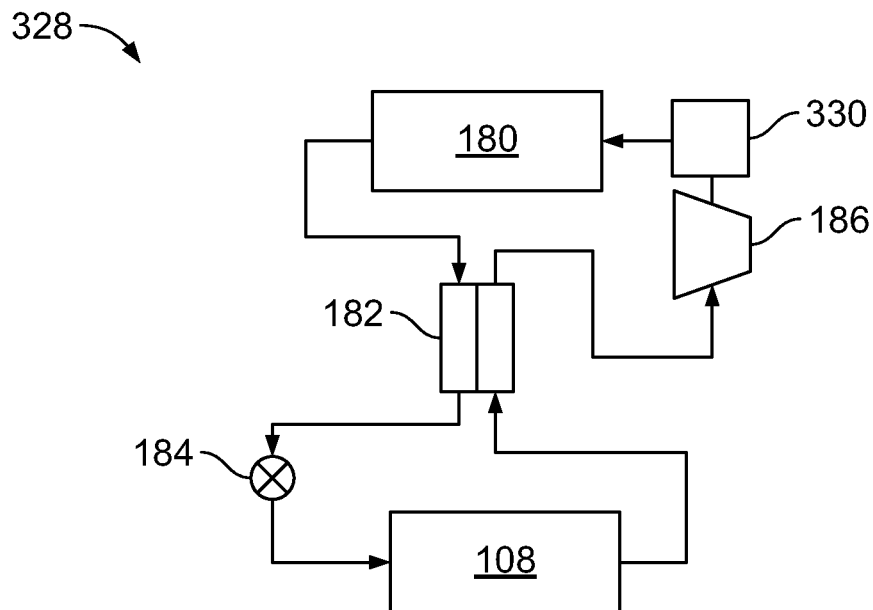
FIG. 14 is a schematic of a refrigeration system that includes a thermal mass disposed between a compressor and a condenser.

FIG. 14 is a schematic of a refrigeration system 328 that includes a thermal mass 330 disposed between the compressor 186 and the condenser 180. The refrigeration system 328 is substantially similar to the refrigeration system 109. However, the refrigeration system 328 includes the thermal mass 330. The refrigeration system 328 does not include the first bypass line 188 and the second bypass line 190 that are part of the refrigeration system 109. Some systems include the first bypass line, the second bypass line, and the thermal mass 330.

The thermal mass may be, for example, ethylene glycol and water mixture, saltwater, paraffin wax (alkanes) or pure water. In some machines, the thermal mass 330 is disposed between the condenser 180 and heat exchanger 182.

The thermal mass 330 stores thermal energy and releases thermal energy at a later time. When disposed on between the compressor 186 and the condenser 180, the thermal mass 330 stores heat emitted from the refrigerant. At this point in the cycle, the refrigerant is a high-pressure vapor. The condenser 180 isothermally releases heat from the high-pressure vapor to produce a high-pressure liquid. Precooling the vapor refrigerant with the thermal mass 330 reduces the load of the compressor 186. When the machine 100 powers down, the thermal mass 330 releases heat into the environment and reaches an equilibrium at ambient temperatures.

Some systems include both the second bypass line and the thermal mass. The second bypass line redirects refrigerant from the thermal mass, idling the refrigeration system. During this idling period, the thermal mass releases heat from previous cycles into the environment.

Figure 15:
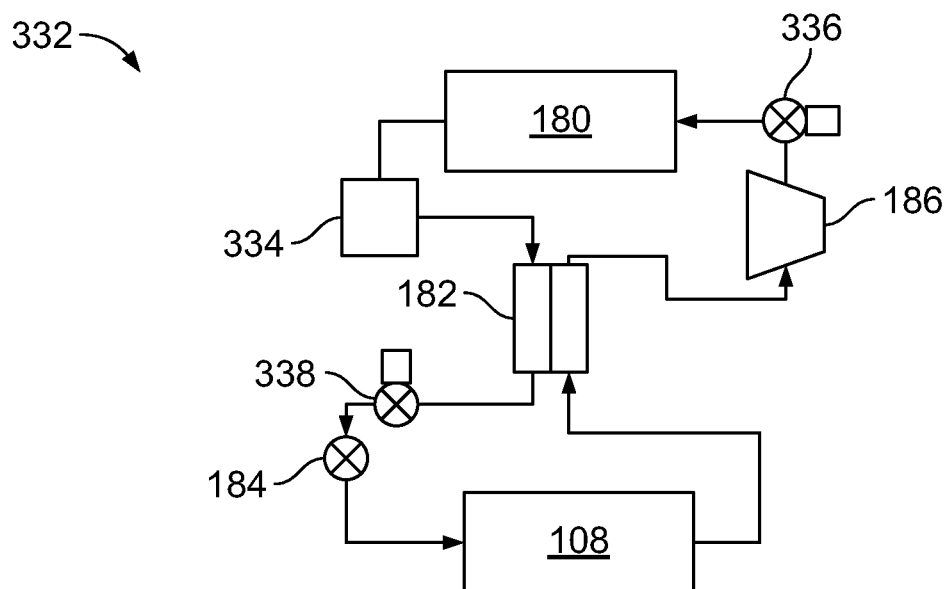
FIG. 15 is a schematic of a refrigeration system that includes a pressure vessel, a first control valve, and a second control valve.

FIG. 15 is a schematic of a refrigeration system 332 that includes a pressure vessel 334, a first control valve 336, and a second control valve 338. The pressure vessel 334 can act as pressure reservoir that enables rapid startup of the system and decreases the time required to cool (e.g., to freezing) contents of a pod in the evaporator 108. The refrigeration system 332 is substantially similar to the refrigeration system 109. However, the refrigeration system 332 includes the pressure vessel 334, the first control valve 336, and the second control valve 338. The refrigeration system 332 further does not include the first bypass line 188 and the second bypass line 190 that are part of the refrigeration system 109. Some systems include the first bypass line, the second bypass line, the pressure vessel 334, the first control valve 336, and the second control valve 338.

The first control valve 336 is disposed between the compressor 186 and the condenser 180. The second control valve 338 is disposed between the heat exchanger 182 and the expansion valve 184. The pressure vessel 334 is disposed between the condenser 180 and the heat exchanger 182. The refrigerant exits the compressor 186 at a high-pressure and maintains that high-pressure until the liquid refrigerant is released by the expansion valve 184. The system 332 controls the position of the valves 336, 338 (e.g., open or closed) based on the desired outcome.

During normal operation of the system 332 (e.g., when cooling pods), both the first control valve 336 and the second control valve 338 are open. Prior to idling, the second control valve 338 closes and the first control valve 336 remains open. The compressor 186 continues to run for a short time, for example, 1-5 seconds, before the first control valve 336 closes. After the first control valve 336 closes, the compressor shuts down.

When the system 332 is reactivated (e.g., to produce a serving of a cooled food or drink), the compressor 186 restarts, the first control valve 336 opens, and the second control valve 338 opens. Because high-pressure fluid is already present in the pressure vessel 334, high-pressure refrigerant flows through the expansion valve 184 with the pressure drop cooling the refrigerant. This approach decreases the time required to cool the contents of a pod relative to refrigeration systems that allow to system pressures to return to ambient conditions when shutting down. If the system is at ambient conditions, no pressure drop occurs across the expansion valve initially when restarting the system. This approach has demonstrated to decrease the time required to cool the contents of a 8-ounce pod from room temperature to freezing to less than 90 seconds. The refrigeration system 332 is able to cool the refrigerant quickly or instantaneously when the system 332 initiates or boots up, for example prior to the insertion of a pod 150.

Figure 16:
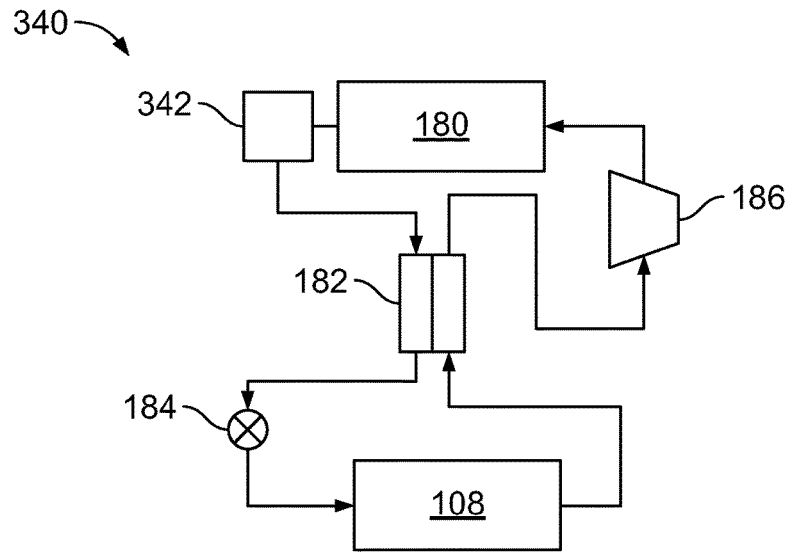
FIG. 16 is a schematic of a refrigeration system that includes a thermoelectric module.

FIG. 16 is a schematic of a refrigeration system 340 that includes a thermoelectric module 342. The refrigeration system 340 is substantially similar to the refrigeration system 109. However, does not include the first bypass line 188 and the second bypass line 190 that are part of the refrigeration system 109. Some systems include the first bypass line, the second bypass line, and thermoelectric module 342.

Thermoelectric module 342 is a cooling element disposed between the condenser 180 and the heat exchanger 182. The thermoelectric module 342 cools the refrigerant that exits the condenser 180 prior to transferring heat to the refrigerant vapor exiting the evaporator 108 in the heat exchanger 182. Cooling the liquid refrigerant prior to expansion increases the cooling capacity of the system 340 and reduce the required compressor output. The reduction in required compressor output reduces the size of the compressor needed.

Figure 17:
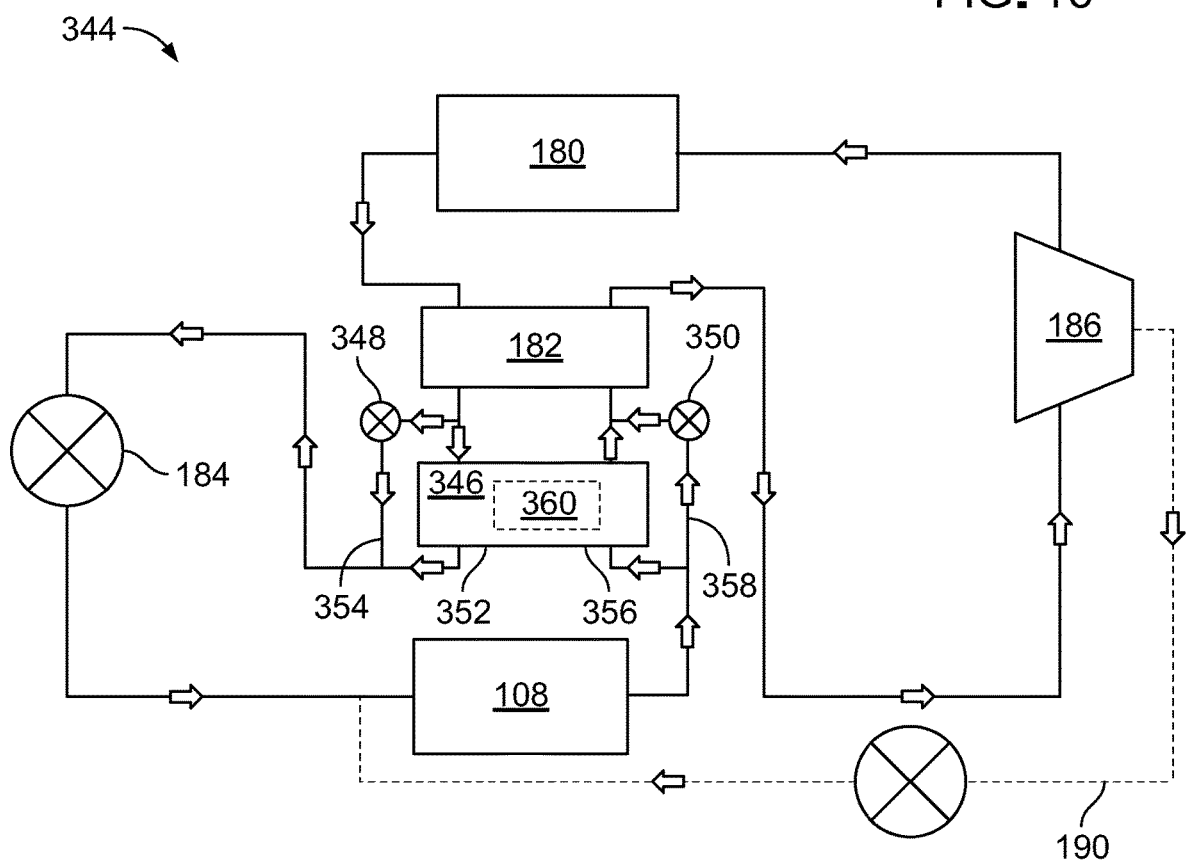
FIG. 17 is a schematic of a refrigeration system that includes a thermal battery, a first battery bypass valve, and a second battery bypass valve.

FIG. 17 is a schematic of a refrigeration system 344 that includes a thermal battery 346, a first battery bypass valve 348, and a second battery bypass valve 350. The refrigeration system 344 is substantially similar to the refrigeration system 109 but does not include the first bypass line 188 that is part of the refrigeration system 109. Some systems with the thermal battery 346 and associated valves also includes the first bypass line.

The thermal battery 346 has a first portion 352 that is disposed between the heat exchanger 182 and the expansion valve 184. The first battery bypass valve 348 is disposed on a first branch line 354 that bypasses the first portion 352 of the thermal battery 346. When the first battery bypass valve 348 is open, a majority or all the refrigerant flows through the first branch line 354. The thermal battery 346 has a high pressure drop. The refrigerant primarily flows through the branch line 354 because the branch line 354 has a comparatively low pressure drop to the thermal battery 346. When the first battery bypass valve 348 is closed, the refrigerant flows through the first portion 352 of the thermal battery 346.

The thermal battery 346 has a second portion 356, thermally connected to the first portion 352, that is disposed between the evaporator 108 and the heat exchanger 182. The second battery bypass valve 350 is disposed on a second branch line 358 that bypasses the second portion 356 of the thermal battery 346. When the second battery bypass valve 350 is open a majority or all of the refrigerant flows through the second branch line 358. The thermal battery 346 has a high pressure drop. The refrigerant primarily flows through the branch line 358 because the branch line 358 has a comparatively low pressure drop to the thermal battery 346. When the second battery bypass valve 350 is closed, the refrigerant flows through the second portion 356 of the thermal battery 346.

The thermal battery 346 includes a thermal material that retains heat. The thermal battery 346 includes a reservoir 360 with a phase change material (e.g., paraffin) receives heat or emits heat, depending on the position of the first battery bypass valve 348 and the second battery bypass valve 350. The thermal battery 346 is described as using paraffin as an example of a phase change material. Some thermal batteries include other materials that retain heat or expend heat, for example ethylene glycol and water mixture, saltwater or pure water.

The thermal battery 346 emits heat from its second portion 356 to the refrigerant when the first battery bypass valve 348 is open and the second battery bypass valve 350 is closed. If the paraffin is warm or melted, the cold refrigerant will chill and solidify the paraffin in the reservoir 360. By heating the low-pressure refrigerant, the thermal battery reducing the likelihood that liquid refrigerant will flow into the compressor.

The thermal battery 346 receives heat at the first portion 352 from the refrigerant when the first battery bypass valve 348 is closed and the second battery bypass valve 350 is open. If the wax is solidified, the hot liquid refrigerant will heat and melt the wax in the wax reservoir 360. If the wax is liquid, the hot refrigerant will continue to heat the liquid wax in the wax reservoir 360.

On activation of the system 344 and during the cooling cycle, both the first battery bypass valve 348 and the second battery bypass valve 350 are open and little to no refrigerant flows interacts with the thermal battery 346. At the end of the cooling cycle, the second battery bypass valve 350 closes and the reservoir 360 cools due to the cold, low-pressure refrigerant. As the next cycle begins with a cooled battery, the second battery bypass valve 350 opens, and the first battery bypass valve 348 closes. The first portion 352 of the thermal battery 346 then pre-cools the hot liquid refrigerant exiting the condenser 180 via the heat exchanger 182.

This configuration can prevent end-of-cycle compressor flooding and can reduce the output of the compressor by reducing the heat load on the compressor. Some waxes may have a melting point in a range of 5° C.-10° C., for example, Dodecane wax or Tridecane wax.

Figure 18A:
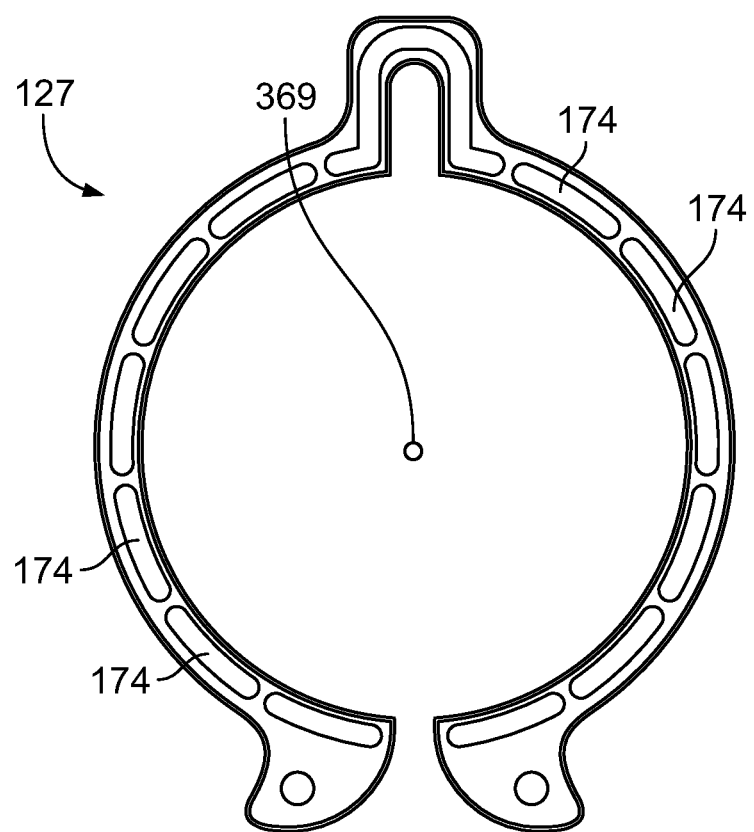
FIG. 18A is top view of an evaporator cover 127 and FIG. 18B is a top view of the body of the evaporator.
Figure 18B:
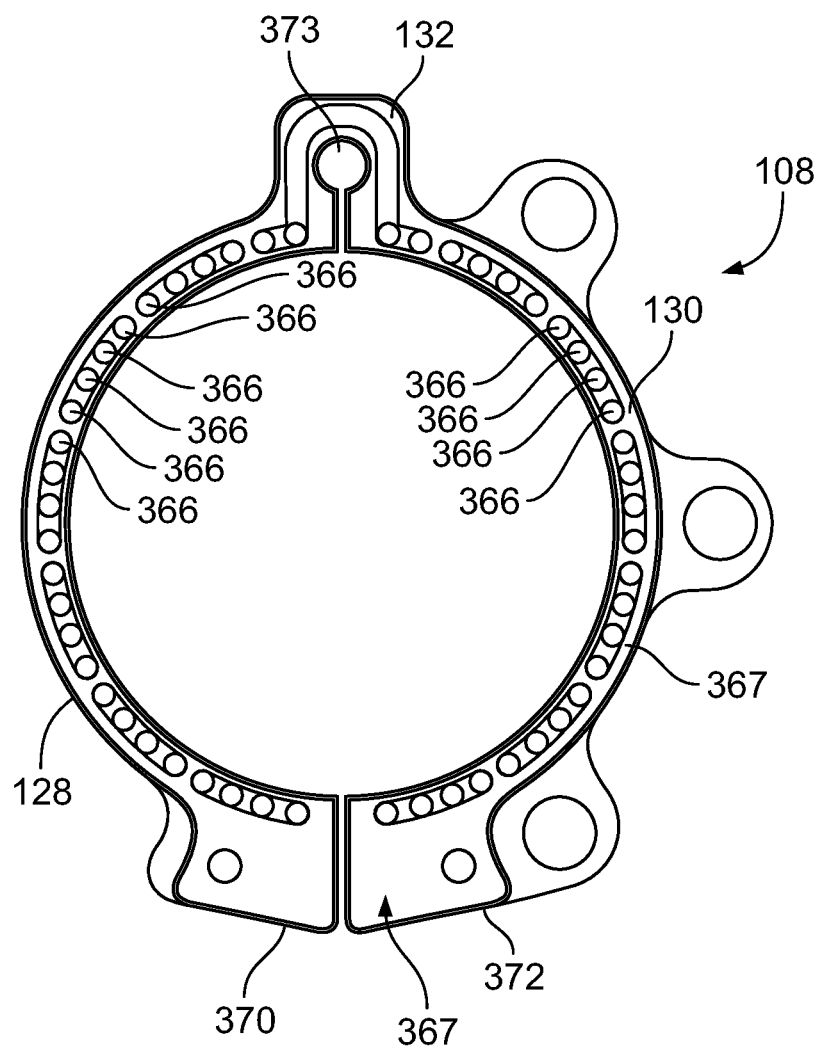

FIG. 18A is top view of an evaporator cover 127 and FIG. 18B is a top view of the body of the evaporator 108. The body of the evaporator 108 defines the channels 366 through which refrigerant flows to cool the evaporator 108. The channels 366 are open at a lip 367, as shown in FIG. 18B, of the evaporator 108. The channels 366 are also open at the opposite end of the evaporator 108 with a similarly configured lip.

The cover 127 includes multiple recesses 174 that align with four adjacent channels 366 of the evaporator 108 when the cover 127 is attached to the body of the evaporator 108. Some covers include recesses that align with other numbers of adjacent channels. The recesses 174 act as manifolds fluidly connect the adjacent channels 366. The cover 127 on the opposite ends of the body of the evaporator are offset so that the two covers 127 and the body of the evaporator 108 together define a serpentine flow path through the evaporator 108.

The cover 127 has an inlet 370 and an outlet 372 that fluidly connects the evaporator 108 to the refrigeration system 109. Refrigerant flows through the inlet 370, through the channels defined by recesses in the body of the evaporator 108 and the cover 127, and exits the evaporator 108 through the outlet 372. The refrigerant enters the inlet 370 as a cold fluid at a first temperature. As the refrigerant flows through the flow path 368, the refrigerant warms and evaporates due to the heat received by the evaporator 108 from the pod 150. The pod 150 freezes due to this heat transfer. To maintain a constant flow speed, the inlet 370 is about 0.25 inches in diameter and the outlet 372 is about 0.31 inches in diameter.

The living hinge 132 defines a connecting channel 373 that fluidly connects channels in the first portion 128 of the evaporator 108 to channels 366 in the second portion 130 of the evaporator 108. The connecting channel 373 is defined within the evaporator 108 near the lip 367 of the evaporator 108. In some evaporators, the lip of the evaporator defines a groove and the lid defines a corresponding groove so that the connecting channel is formed between the groove of the lid and the groove of the evaporator, when the lid and evaporator engage. Some connecting channel are defined within the cover 127. This configuration defines the continuous flow path 368 from the inlet 370 to the outlet 372 in which channels 366 extend parallel to the axis 369 and flow fluid parallel to the axis 369.

In some evaporators, the channels 366 connect within the evaporator at the opposite end from the lip 367, to form a "U" shape. When assembled, the cover 127 is disposed on the lip 367 of the evaporator 108. The channels 366 are a series of unconnected "U" shaped units. In each unit, a first channel flows the refrigerant in a first direction and a second channel flows the fluid in a second direction, opposite the first direction.

The channels 366 extend parallel to an axis 369 of the evaporator. In some evaporators, the channels do not extend parallel to the axis but do extend parallel to each other. In some evaporators, the channels do not extend parallel to each other or parallel to the axis.

Figure 19A:
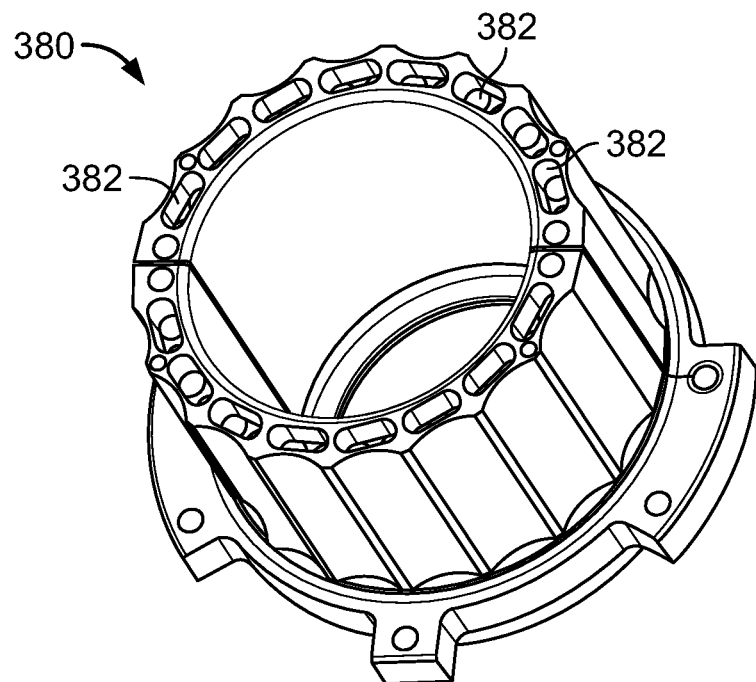
FIGS. 19A and 19B are perspective views of an evaporator with and without an associated lid.
Figure 19B:
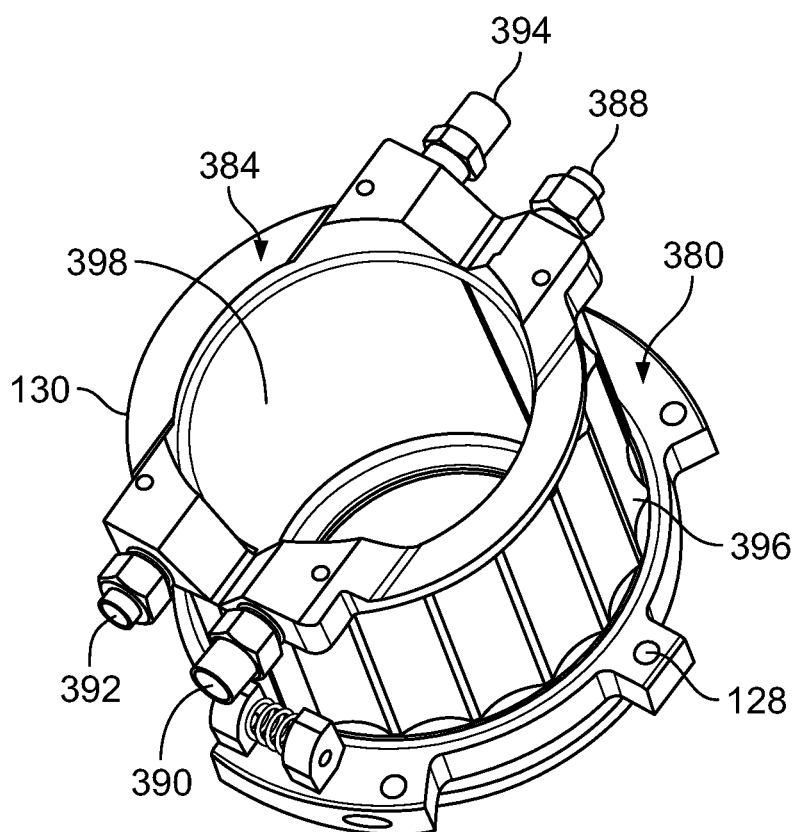

FIGS. 19A and 19B are perspective views of an evaporator 380 without and with, respectively, its cover 127. The evaporator 380 in FIGS. 19A and 19B operates similarly to the evaporator 108 described in FIGS. 18A-18E. However, the evaporator 380 includes recesses 382 that fluidly connect the second channel 366b of a unit 371 to a first channel 366a of a different unit 371. The cover 384 is substantially similar to the cover 127. However, the cover 384 is flat rather than recessed on the surface that abuts the lip 367, and includes multiple inlets and outlets, rather than a single inlet and a single outlet. The cover 384 includes a first inlet 388 on the first portion 128, a first outlet 390 on the first portion 128, a second inlet 392 on the second portion 130, and a second outlet 394 on the second portion. The first inlet 388 and first outlet 390 are fluidly connected to form a first flow path 396 on the first portion 128. The second inlet 392 and second outlet 394 fluidly connect to form a second flow path 398 on the second portion 130. This configuration forms two flow paths 396, 398 that flow refrigerant in parallel and does not use a hinge connector. To maintain flow speed, the diameters of the flow paths 396, 398 are reduced such that the divided flow paths have a similar flow area to the originating flow path.

When the cover 384 engages the evaporator 380, the recesses 382 are closed and the evaporator 380 and cover 384 form the flow paths 396, 398.

In the previously described evaporators, the units 371 have "One-up/One-down" configurations. In some evaporators, the units define "Two-Up/Two-Down" or "Three-Up/Three-Down" configurations. This can maintain proper flow speeds while minimizing the pressure drop within evaporator. Different flow path arrangements are needed for different compressors and different cooling tasks. The number of parallel flow paths can be increased for larger compressors and cooling loads and be reduced for smaller requirements.

FIGS. 20A-20D are schematic views of flow paths formed by the channels of the evaporator and recesses of its cover 127. FIGS. 20A and 20B are views of the channels defined within an evaporator. FIGS. 20C and 20D are perspective views of an evaporator and its cover 127.

FIG. 20A is a flow path 402 that increases the number of channels 400 as the refrigerant evaporates. The refrigerant enters the inlet and flows through one or more single channels 400a. At the refrigerant evaporates, it expands in volume and begins to move faster. The vapor may expand about 50-70 times in specific volume. To slow the mixed-phase refrigerant within the evaporator 108, the flow path 402 branches into two parallel channels 400b that connect at the recesses 374 and within the evaporator 108 at a turning point 306. As the refrigerant evaporates more, the flow path 402 branches again into three parallel channels 400c that connect at the recesses 374 and within the evaporator 108 at the turning point 306. In some evaporators, the "Two-Up/Two-Down" configuration is maintained for multiple units. In some evaporators, the "Three-Up/Three-Down" configuration is maintained for multiple units. In some evaporators, the flow path increase to a "Four-Up/Four-Down" or "Five-Up/Five-Down" configuration. Increasing the number of channels throughout the evaporator increases performance early in the evaporating process while limiting high velocity/pressure drop towards the outlet of the evaporator.

FIG. 20B is a schematic of the flow path 402 with a ramped recess 408 in the cover 127 that acts as a manifold. The ramped recess 408 has a smoothly increasing and decreasing cross-sectional area that helps maintains the flow speed of refrigerant flowing through manifold. A ramped cross section recess in the cover would help maintain flow velocities and also reduce pressure drop and flow separation of liquid and gas refrigerant due to low flow velocity areas.

FIG. 20C shows a flow path 420 that includes a first manifold at the bottom of the evaporator 108 and multiple branches 424 extending towards the cover 127 from the first manifold 422. The first manifold 422 connects to the inlet 370. The branches 424 fluidly connect to a second manifold 426 at the top of the evaporator 108. The second manifold 426 fluidly connects to the outlet 372.

The refrigerant flows from the inlet through the first manifold 422, up the branches 424, and through the second manifold 426 to the outlet 372. Vapor is less dense that the liquid and tends to rise to the top. This preferential flow direction can create unpredictable flow and performance when flow direction is downward. This configuration can increase thermal performance of the evaporator 108 by flowing refrigerant the in the same direction as the buoyancy force present when the refrigerant is in vapor form.

FIG. 20D shows a flow path 430 that winds around the evaporator 108. The flow path 430 is a spiral that follows the outer diameter of the evaporator 108. This configuration increases surface area and reduces pressure drop by reducing or eliminating tight turns in the flow path 430. In some evaporators, multiple hinge connectors are used to connect the first portion of the evaporator and the second portion of the evaporator when the flow path extends across the first and second portion Some flow paths define a serpentine passage on the first portion and a serpentine passage on the second portion that are connected by a "transit passage" that spans the hinge.

Figure 21A:
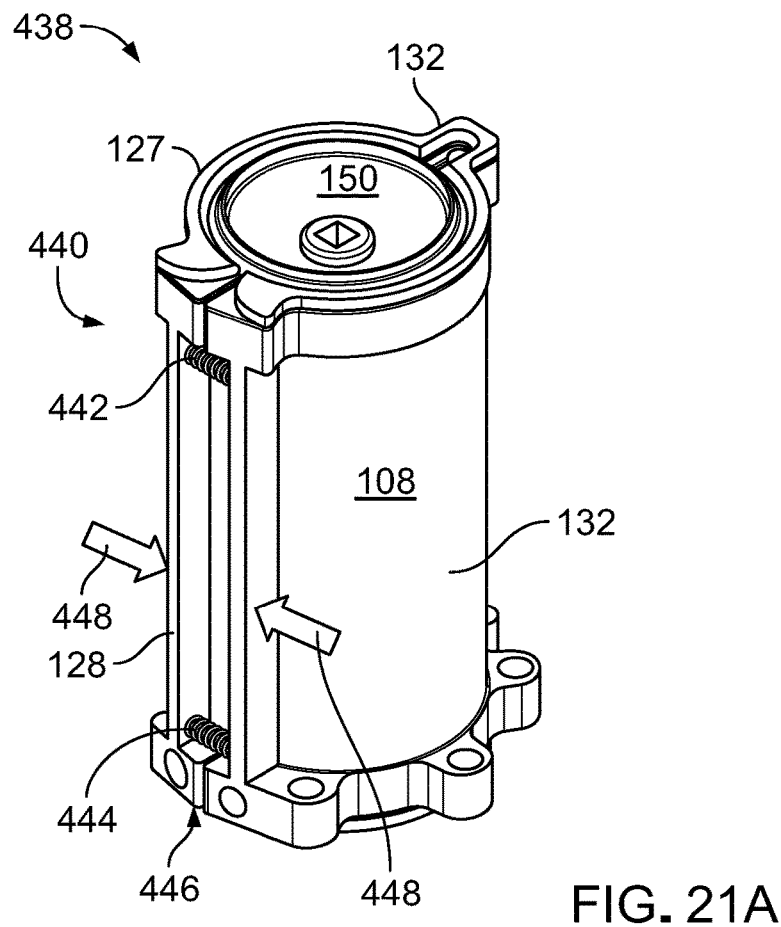
FIGS. 21A-21C are views of the pod and the evaporator of with a closing mechanism.
Figure 21B:
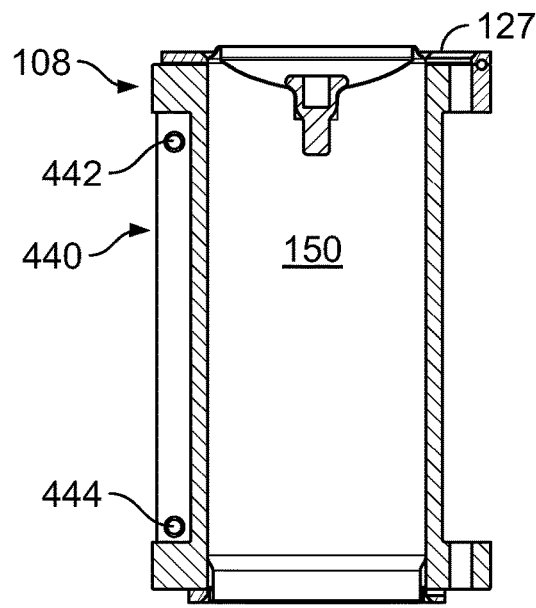
Figure 21C:
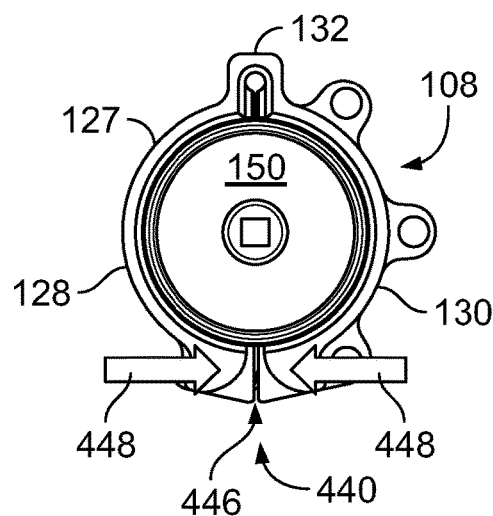

FIGS. 21A-21C are views of the pod 150 and an evaporator 438 with a closing mechanism 440. FIG. 21A is a perspective view of the evaporator 438 and pod 150. FIG. 21B is a cross-sectional view of the pod 150 and the evaporator 438. FIG. 21C is a top view of the pod 150 and the evaporator 438.

The closing mechanism 440 includes biasing elements (e.g. springs) that connects the first portion 128 of the evaporator 438 to the second portion 130 of the evaporator 438. The closing mechanism 440 also includes a circumferential cable 441 that extends around the outer diameter of the evaporator. The cable is tightened close the pod and loosened to open the evaporator.

The biasing element in evaporator 438 includes a first and second spring 442, 444 that bias the first portion 128 and the second portion 130 away from each other. The living hinge 132 facilitates the movement of the first and second portions 128, 130 such that the first and second portions 128, 130 rotation about the hinge 132 due to the biasing force of the springs 442, 444. In this configuration, the evaporator 438 is in the open position and a small gap 446 forms between the first and second portions 128, 130. The evaporator 438 is in the open position when the cover 127 is in the open position. In some machines, the position of the evaporator is independent from the position of the lid. In the open position, a small air gap exists between the evaporator 438 and the pod 150.

The evaporator 438 has a closed position in which the airgap between the evaporator 438 and the pod 150 is eliminated to promote heat transfer. In some evaporators, the air gap is simply reduced. In the closed position, the gap 446 is also eliminated. In some evaporators, the gap is reduced rather than eliminated. To move from the open position to the closed position, the closing mechanism 440 applies a force in the direction of arrows 448 to overcome the biasing force of the first and second springs 442, 444.

The closing mechanism produces a force within the range of 10 to 1500 lbs. To prevent crushing of the pod 150, the internal pressure of the pod 150 is preferably equal to or greater than the force produced by the closing mechanism 440.

The closing mechanism 440 may be, for example, an electromechanical actuator, a pulley system, a lever, projections on the lid, a ball screw, a solenoid, or a mechanical latch.

Figure 22A:
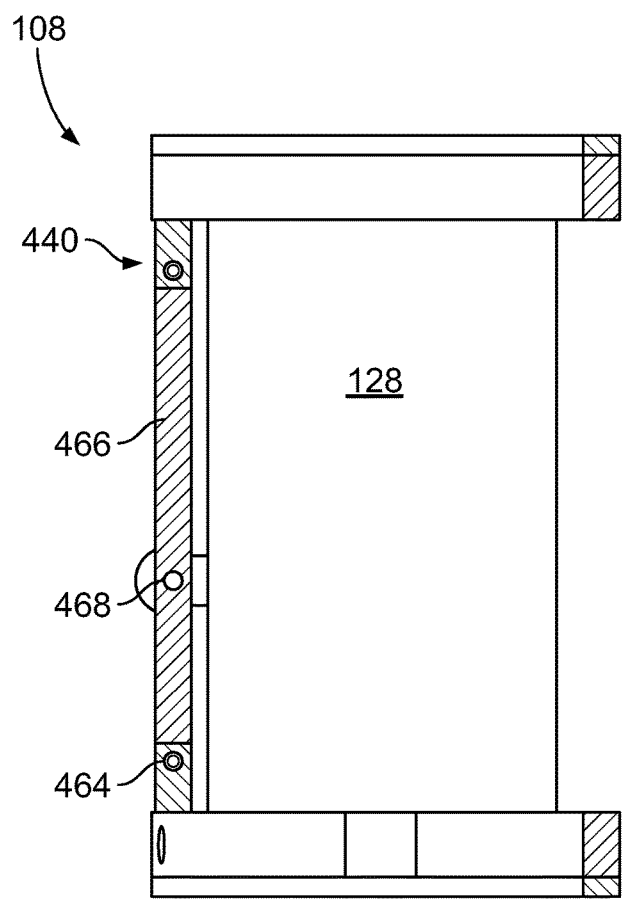
FIGS. 22A and 22B are side views of a closing mechanism that includes a first bolt and a second bolt.
Figure 22B:
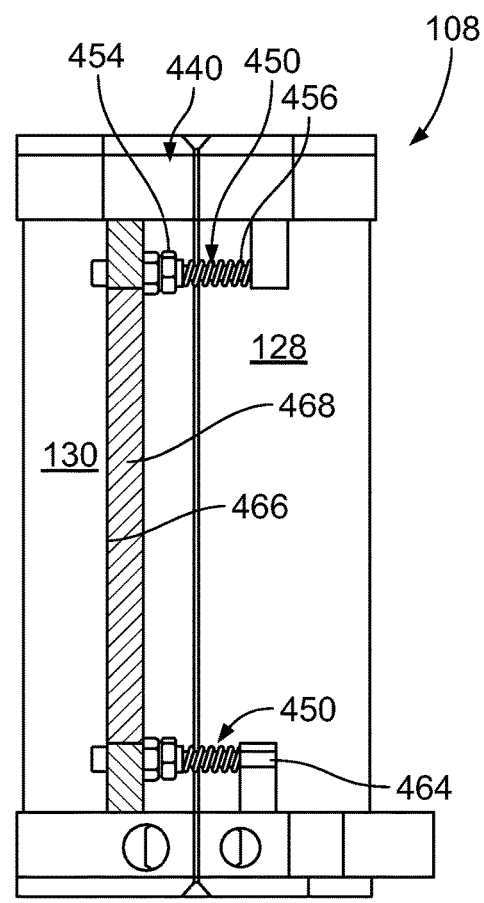

FIGS. 22A and 22B are, respectively, side and front views of an evaporator 108 with a closing mechanism 440 that includes two bolts 450 inside springs 456. The bolts 450 bias the bar 466 away from flanges 464. Optionally, a cable 468 is received in a hole defined in the bar 466 and extends around the evaporator 108.

Figure 23A:
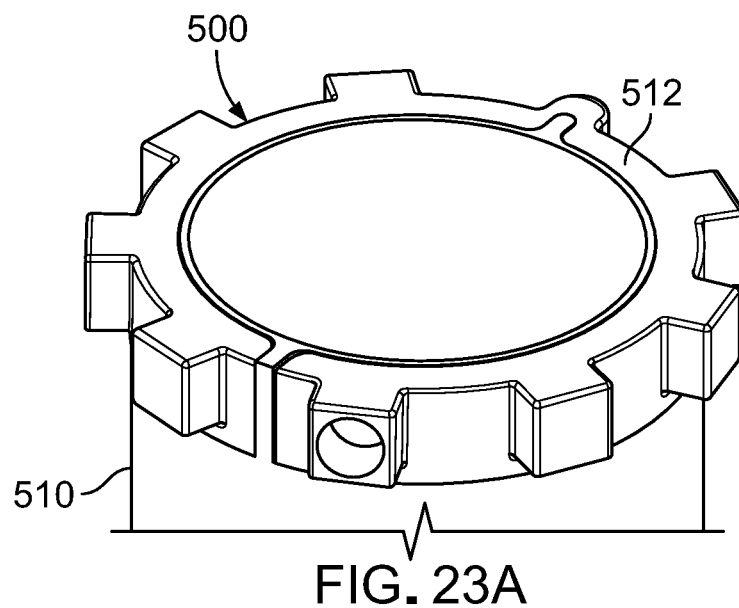
FIGS. 23A-23H illustrate an evaporator with an extruded body.

FIG. 23A shows an evaporator 500 that can be produced primarily by extrusion. The evaporator 500 has a body 510 with two end caps 512. The body 510 and the end caps are produced separately and then assembled.

Figure 23B:
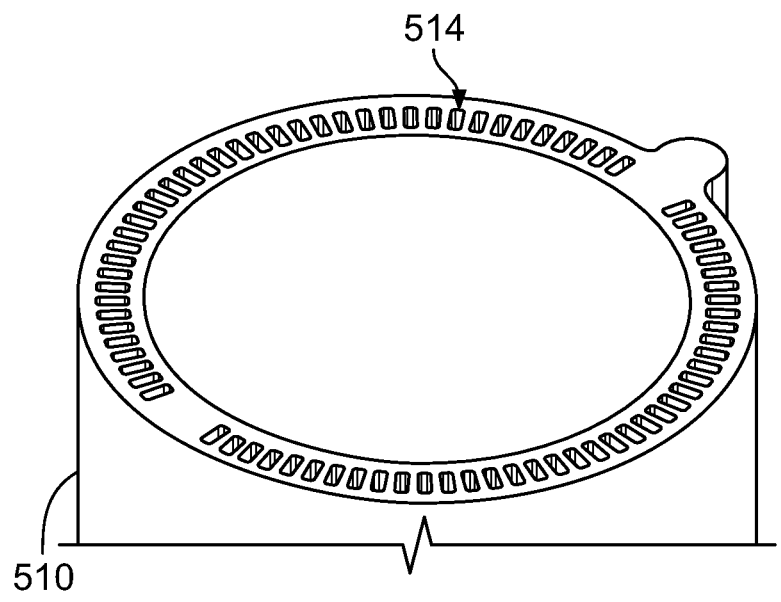
Figure 23C:
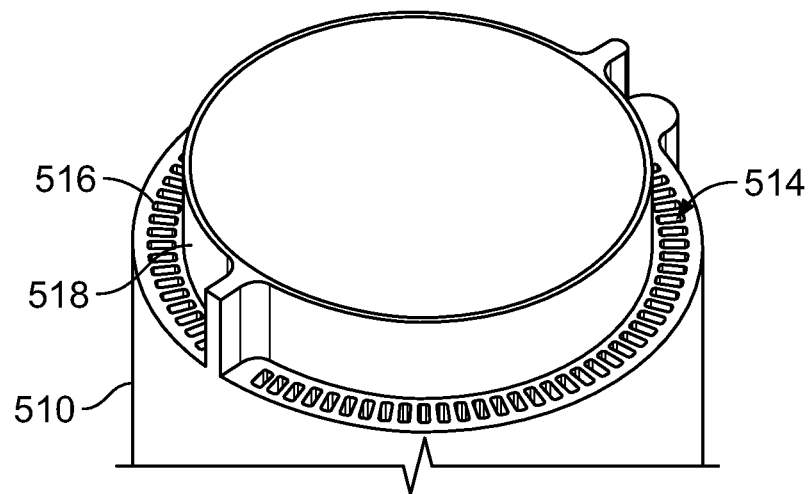

FIGS. 23B and 23C illustrate production of the body 510. The evaporator body 510 is produced by low cost extrusion. The body is extruded with the channels 514 defined in the body 510 (see FIG. 23B). Each end of the body 510 is machined to provide a shoulder 516 that mates with an end cap (see FIG. 23C). A wall 518 extends beyond the shoulder 516.

Figure 23D:
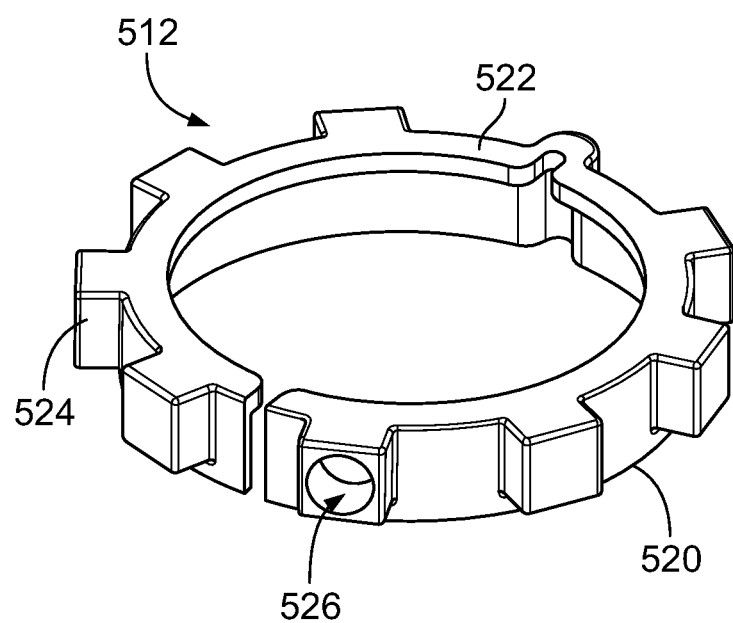
Figure 23E:
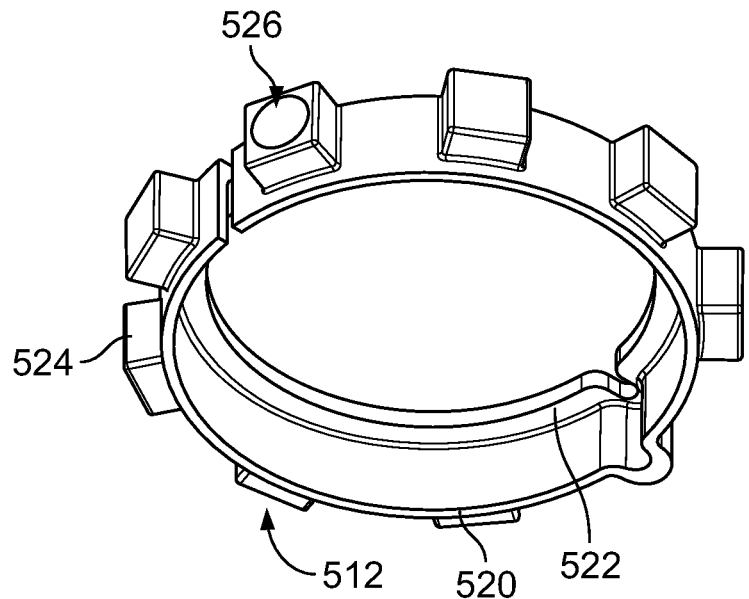

FIGS. 23D and 23E are perspective views of an end cap 512. The end caps 512 can be forged or machined. The end caps 512 provide the mounting, inlet/outlet, and closure features of the evaporator 500. The end cap 512 has a sidewall 520 and an end wall 522.

The end cap 512 has multiple bosses 524 extending outward from the sidewall 520. The bosses 524 can be used for mounting and handling the end cap 512 and, after assembly with the body 510, the evaporator 500. A port 526 extends through the sidewall 520. The port 526 of the end cap 512 on one end of the evaporator 500 is used as an inlet and the port 526 of the end cap 512 on the other end of the evaporator 500 is used as an outlet.

Figure 23F:
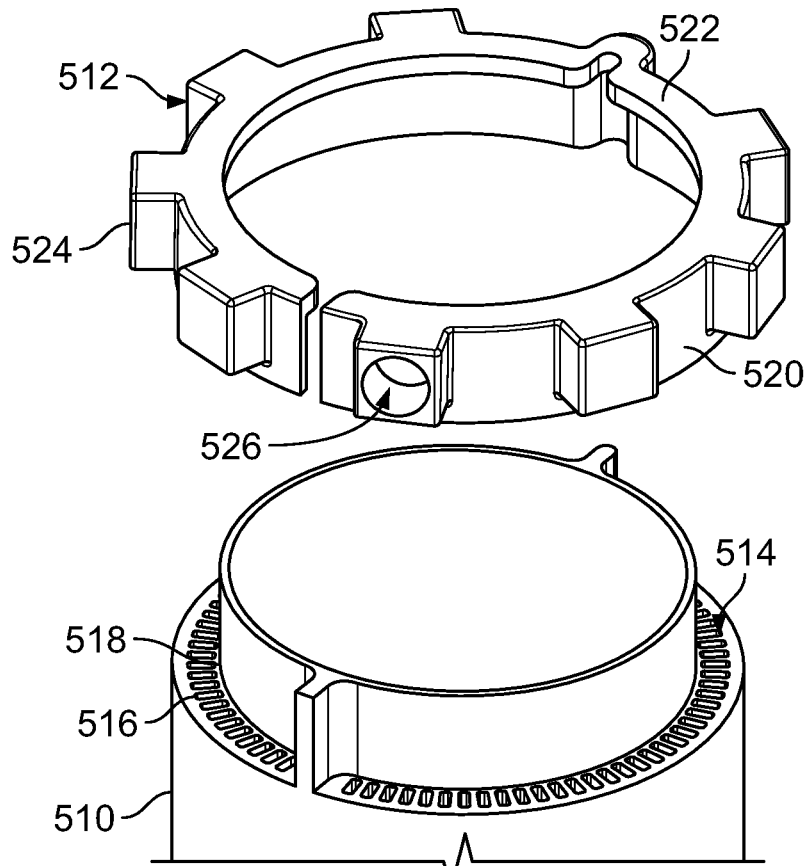

FIG. 23F illustrates assembly of the evaporator 500. The end cap 512 is mounted on the shoulder 516 on one end of the body 510. After mounting, the joints between the evaporator body 510 and the end caps 512 are easily accessible. This configuration facilitates use of used for laser welding, vacuum brazing, friction stir welding or TIG welding to attach the end caps 512 to the evaporator body 510.

Figure 23G:
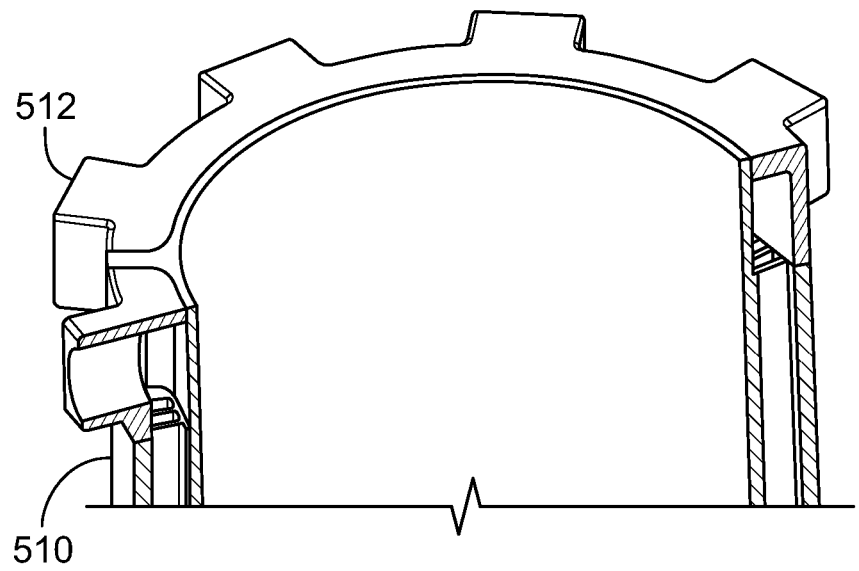
Figure 23H:
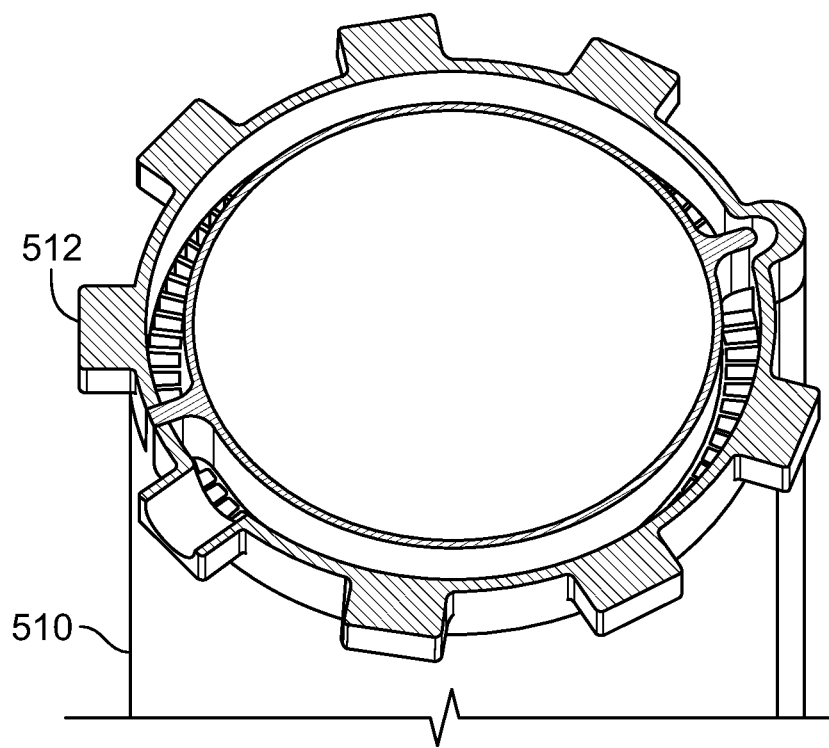

FIGS. 23G and 23H illustrate the relationship between the body 510 and the end cap 512 after assembly. When assembled with the body 510, the sidewall 520 and the end wall 522 of the end cap and the wall 518 of the body 510 define a chamber that acts as a manifold connecting the channels defined in the body 510 of the evaporator 500. The end cap 512 is shown with "hollow" configuration for evaporating up with all passages in parallel but it could be adapted for a multipath design with multiple 180 degree turnarounds.

Figure 24:
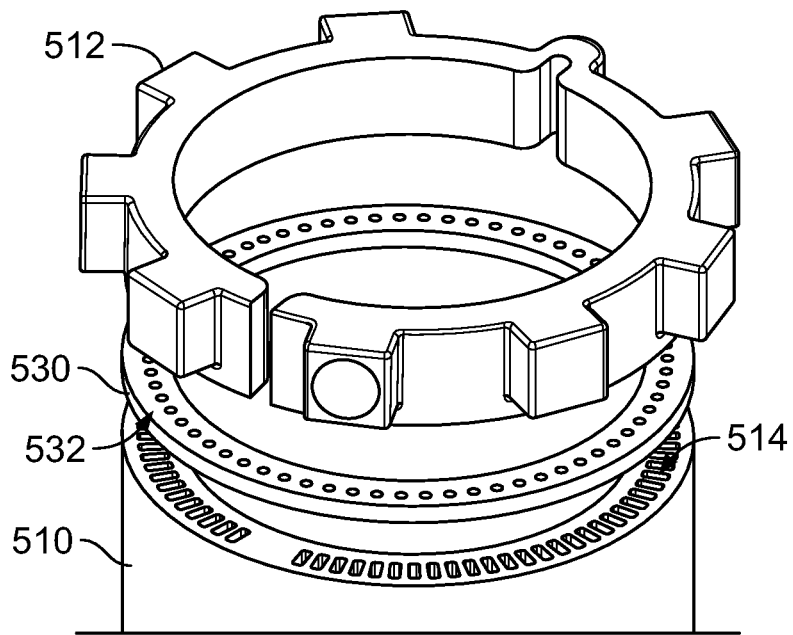
FIG. 24 illustrates an evaporator incorporating an orifice plate.

FIG. 24 shows a configuration of the evaporator 500 that incorporates an orifice plate 530. The orifice plate 530 is disposed between the body 510 and the end cap 512. The orifice plate 530 defines multiple orifices 532 that, after assembly, are aligned with the channels 514 in the body 510. The orifice plate can be used to distribute flow evenly to the channels 514 by accumulating refrigerant prior to the orifice plate 530 and injecting liquid-gas mixture equally to the channels 524. In some cases, the orifices are identical in size. In some cases, where there is likely to be maldistribution of flow between passages 514, the orifices can be different sizes.

Figure 25:
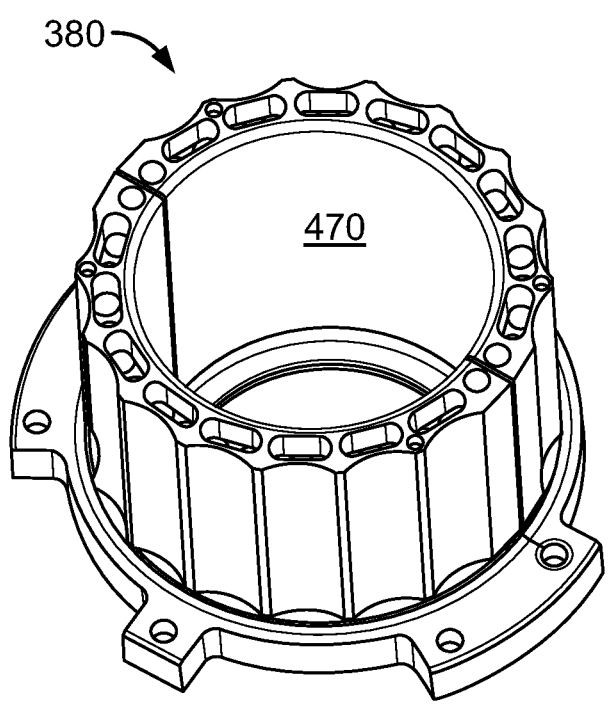
FIG. 25 is a perspective view of an evaporator, shown in FIGS. 19A and 19B with an internal surface made of a different material than the evaporator.

FIG. 25 is a perspective view of an embodiment of the evaporator 380 described with reference to FIGS. 19A and 19B with an internal surface 470 made of a different material than the remainder of the evaporator 380. The inner surface 470 is mainly or completely formed of copper. Copper has a higher thermal conductivity (approximately 391 W/mK) than aluminum that has a thermal conductivity of 180 W/mK. A high thermal conductivity moves heat quickly and efficiently from the pod to the refrigerant. A material with low thermal conductivity pass heat slower and with less efficiency. The tendency of a component to act as a heat sink is a function of both its thermal conductivity and its mass. Table 2 lists the thermal conductivity and density of a variety of materials.

TABLE 2

Conductivity under standard conditions (atmospheric pressure and 293 degrees Kelvin)

| Material | Thermal conductivity [W · m$^{-1}$ · K$^{-1}$] |
|---|---|
| Acrylic glass (Plexiglas V045i) | 0.170-0.200 |
| Alcohols, oils | 0.100 |
| Aluminium | 237 |
| Alumina | 30 |
| Boron arsenide | 1,300 |
| Copper (pure) | 401 |
| Diamond | 1,000 |
| Fiberglass or foam-glass | 0.045 |
| Polyurethane foam | 0.03 |
| Expanded polystyrene | 0.033-0.046 |
| Manganese | 7.810 |
| Water | 0.5918 |
| Marble | 2.070-2.940 |
| Silica aerogel | 0.02 |
| Snow (dry) | 0.050-0.250 |
| Teflon | 0.250 |

Figure 26A:
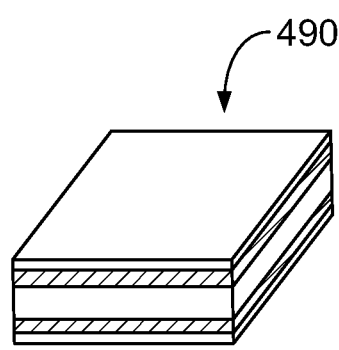
FIGS. 26A-26C are schematic views of claddings.
Figure 26B:
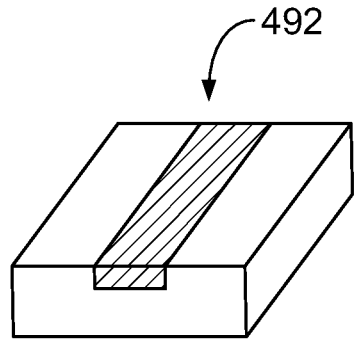
Figure 26C:
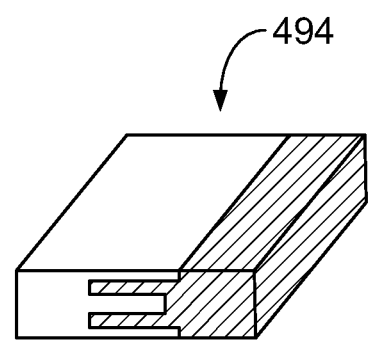

FIGS. 26A-26C are schematic views of claddings. These claddings can be used in an evaporator that includes both aluminum and copper. FIG. 26A shows an overlay cladding 490. FIG. 26B shows an inlay clad 492. FIG. 26C shows an edge clad 495. Cladding techniques as shown in FIGS. 26A-26C are applied to the inner surface of the evaporator. Different clad techniques can increase heat transfer and spread heat out, due to the high thermal conductivity of copper.

Figure 27:
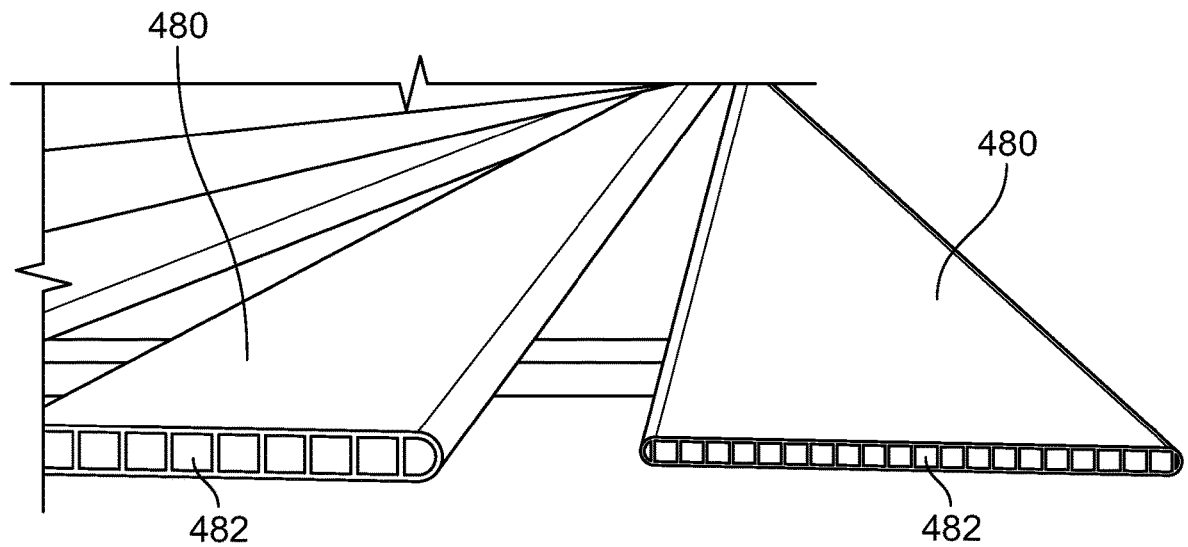
FIG. 27 is an exemplary view of a material that includes microchannels.

FIG. 27 is an exemplary view of a material 480 that includes microchannels 482. When the material 480 is used to make, for example, evaporators, refrigerant flows through the microchannels 482. The material 480 can be bent to form an evaporator that cools the pod 150. The material 480 is permanently deformed into a cylindrical shape to create a round evaporator. Such an evaporator has a high surface area which increases evaporator performance while keep costs low.

Figure 28A:
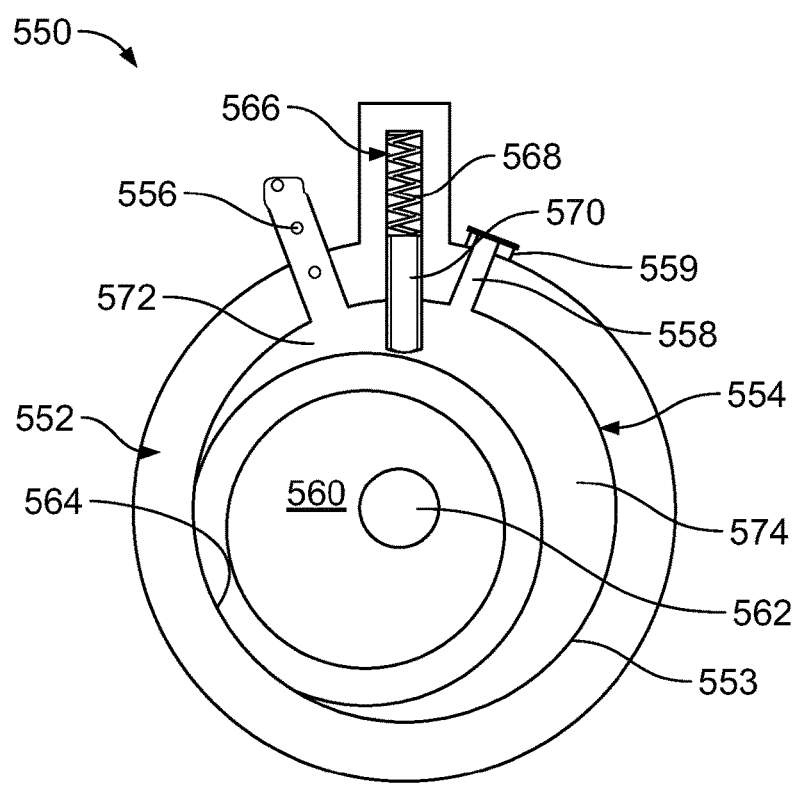
FIGS. 28A-28C are top views of a rotary compressor.
Figure 28B:
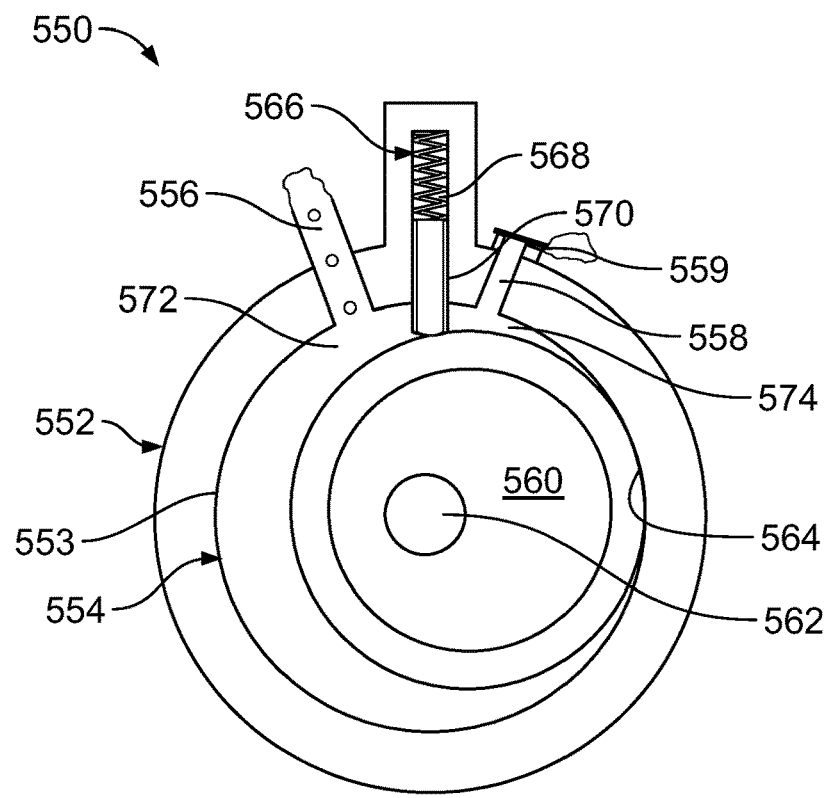
Figure 28C:
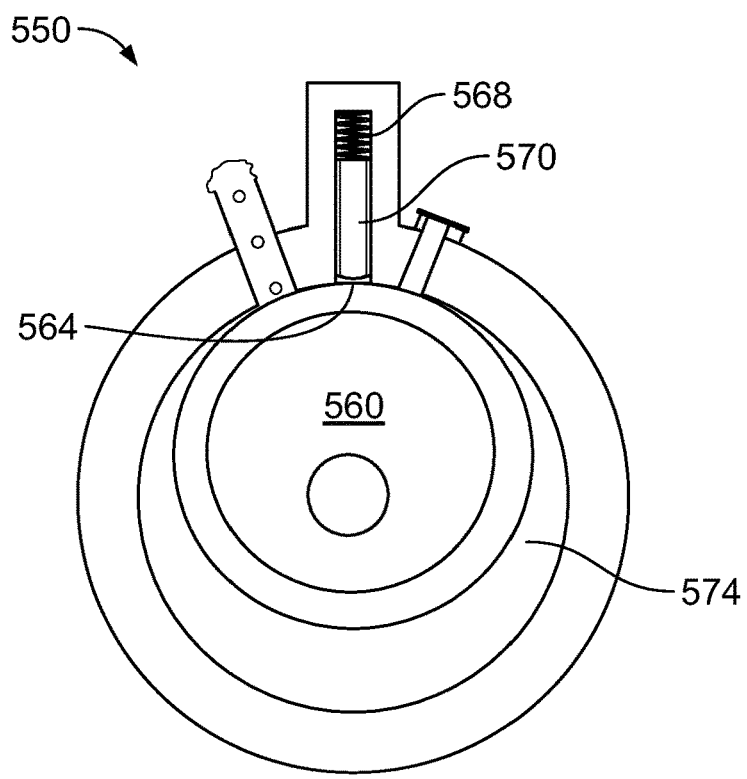

FIGS. 28A-28C show a rotary compressor 550 that is used in some refrigeration systems instead of the reciprocating compressor 186 previously described. The compressor 550 includes a housing 552 with an interior wall 553 that defines an interior cavity 554. An inlet 556 and an outlet 558 fluidly connect the interior cavity 554 of the compressor 550 to other components of the refrigeration system. A pressure valve 559 releases fluid when the fluid reaches a predetermined pressure. A roller 560 with a circular cross section, is rotationally and axially constrained to a rod 562 that extends through a bottom section of the housing 552. Some rollers have ellipse shaped or gear shaped cross sections. The rod 562 is attached off center from the circular cross section of the roller 560. The rod 562 and roller 560 rotate relative to the housing 557 using a motor (not shown). The roller 560 is arranged in the cavity 554 such that an edge 564 of the roller 560 extends to the interior wall 553 of the housing. In this configuration, the roller 560 forms a seal with the housing 557. The edge 564 of the roller 560 maintains contact on the wall 553 as the rod 562 and the roller 560 rotate within the interior cavity 554. The housing 557 includes a notched area 566 for containing a compressed spring 568. The spring 568 abuts the roller 560. A rubber member 570 surrounds a portion of the spring 568 to form a seal that extends from the wall 553 to the roller 560. The spring 568 expands and contracts as the roller 560 rotates within the interior cavity 554, to maintain the seal.

In FIG. 28A, the compressor 550 is in a first state. In FIG. 28B, the rotary compressor 550 is in a second state and in FIG. 28C, the rotary compressor 550 is in a third state. The rotary compressor 550 moves from the first state to the second state, from the second state to the third state, and from the third state to the first state. In the first state, the roller 560 receives low-pressure pressure cool vapor from the evaporator 108 via the inlet 556. The seal between the contact edge 564 and the wall 553 and the seal between the member 570 and the roller 560 define an intake chamber 572 and a pressurizing chamber 574. In some rotary compressors, additional seals are formed that increase the number of chambers. The roller 560 rotates to compress and pressurize vapor in the pressurizing chamber 574 and to draw in vapor to intake chamber 572 from the inlet 556. In the second state, shown in FIG. 28B, the roller 560 continues to rotate counterclockwise and increase the pressure of the vapor in the pressurizing chamber 574 until the pressure valve 559 releases the high-pressure vapor out of the compressor 550. The intake chamber continues to receive low-pressure vapor from the inlet 556. The compressed spring 568 extends into the interior cavity 554 as the roller 560 rotates, to maintain connection between the member 570 and the roller 560. In the third state, shown in FIG. 28C, the high-pressure vapor has been expelled from the pressurizing chamber 574 and the spring 568 is compressed into the notched area 566. In this state, only one seal is formed between the contact edge 564 and the member 570. For a brief period in the cycle the number of chambers is reduced by one. At this state in the compressor 550, the intake chamber 572 becomes the pressurizing chamber 574. The intake chamber 572 is reformed when the contact edge 564 passes the member 570 and two seals are formed, one by the member 570 and roller 560 and the other by the contact edge 564 and the wall 553.

The rotary compressor performs the same thermal duty as the reciprocating compressor at a much lower weight and smaller size. The rotary compressor has a weight of about 10 to about 18 lbs. The rotary compressor has a displacement of refrigerant of about 4 cc to about 8 cc. The rotary compressor has a performance vs. weight ratio of about 0.3 cc/lb to about 0.5 cc/lb.

A number of embodiments of the invention have been described. Nevertheless, it will be understood that various modifications may be made without departing from the spirit and scope of this disclosure invention. Accordingly, other embodiments are within the scope of the following claims.

What is claimed is:
1. A machine for producing a single serving of a cooled food or drink, the machine comprising:
    a refrigeration system comprising:
        an evaporator defining a receptacle shaped and sized to receive a pod containing ingredients to produce the single serving of the cooled food or drink, the evaporator defining a plurality of channels for refrigerant, and the evaporator being movable between (i) an open configuration in which the pod is axially insertable into the receptacle and (ii) a closed configuration in which the pod is held in a fixed position within the receptacle;
    a condenser; and a working fluid loop from the evaporator, to the condenser, and back to the evaporator, the working fluid loop comprising:
  a primary path between the condenser and the evaporator;
  a first expansion valve or capillary tube located along the primary path;
  a secondary path between the condenser and the evaporator and running in parallel to the primary path;
  a second expansion valve or capillary tube located along the secondary path; and
  a control valve located along the secondary path and configured to selectively open the secondary path in addition to the primary path reducing the pressure drop between the condenser and the evaporator; and
a processor configured to control the refrigeration system to open the control valve opening the secondary path such that refrigerant flows through the primary and secondary paths and through the plurality of channels of the evaporator to precool the receptacle defined by the evaporator before the pod containing the ingredients is received in the receptacle.

2. The machine of claim 1, wherein the control valve is located upstream of the second expansion valve or capillary tube.

3. The machine of claim 1, wherein the refrigeration system is configured such that refrigerant enters the evaporator at a lower pressure when the control valve is closed compared to when the control valve is open.

4. The machine of claim 1, wherein the refrigeration system is configured such that refrigerant enters the evaporator at a lower temperature when the control valve is closed compared to when the control valve is open.

5. The machine of claim 1, wherein the refrigeration system is configured to cool the receptacle defined by the evaporator when the pod is in the receptacle to cool the ingredients in the pod by flowing refrigerant through the primary and secondary paths and through the plurality of channels of the evaporator while the control valve is open.

6. The machine of claim 1, wherein refrigerant enters the evaporator through an inlet port located at a bottom portion of the evaporator and refrigerant exits the evaporator through an outlet port located at the bottom portion of the evaporator.

7. The machine of claim 1, wherein the machine is configured to, while the pod is received in the receptacle of the evaporator, (i) open a bottom portion of the pod, and (ii) dispense the produced single serving of the cooled food or drink from the opened bottom portion of the pod.

8. The machine of claim 1, wherein the processor is configured to control the opening of the control valve based on a refrigerant temperature.

9. The machine of claim 1, wherein the refrigeration system comprises a compressor and a bypass line connected from a first location between the compressor and the condenser to a second location upstream of the evaporator.

10. The machine of claim 1, wherein the primary path and the secondary path are both upstream of the evaporator and downstream of the condenser.

11. The machine of claim 1, wherein the primary path is always open to refrigerant flow.

12. The machine of claim 1, wherein the primary path is void of control valves.

13. The machine of claim 1, wherein selectively opening the secondary path in addition to the primary path causes the secondary path to supplement the primary path.

14. The machine of claim 1, wherein the receptacle is an aluminum-walled receptacle, and the pod comprises an aluminum-walled container having a paddle movably disposed in the aluminum-walled container.

15. The machine of claim 1, wherein the evaporator is a clamshell evaporator comprising an axis in which a first portion of the clamshell evaporator moves relative to a second portion of the clamshell evaporator when the evaporator moves between the open configuration and the closed configuration.

16. The machine of claim 1, wherein the processor is configured to control a first movement of the evaporator from the open configuration to the closed configuration after the pod has been received in the evaporator to hold the pod in the fixed position while producing the single serving of the cooled food or drink.

17. The machine of claim 16, wherein the processor is configured to control a second movement of the evaporator from the closed configuration to the open configuration after dispensing the single serving of the cooled food or drink from the pod to allow the pod to be removed from the receptacle.

18. A machine for producing a single serving of a cooled food or drink, the machine comprising:
  a refrigeration system comprising:
    an evaporator defining a receptacle shaped and sized to receive a pod containing ingredients to produce the single serving of the cooled food or drink, the evaporator being movable between (i) an open configuration in which the pod is axially insertable into the receptacle and (ii) a closed configuration in which the pod is held in a fixed position within the receptacle, the evaporator defining a plurality of channels for refrigerant;
    a condenser; and
    a working fluid loop from the evaporator, to the condenser, and back to the evaporator, the working fluid loop comprising:
      a primary path between the condenser and the evaporator;
      a secondary path between the condenser and the evaporator and running in parallel to the primary path; and
      a control valve located along the secondary path and configured to selectively open the secondary path in addition to the primary path reducing the pressure drop between the condenser and the evaporator; and
  a processor configured to control the refrigeration system to open the control valve opening the secondary path such that refrigerant flows through the primary and secondary paths and through the plurality of channels of the evaporator to cool the ingredients within the pod when the pod containing the ingredients is received in the receptacle.

19. The machine of claim 18, wherein the evaporator comprises two inlet ports and two outlet ports.

20. The machine of claim 18, wherein the refrigeration system comprises a rotary compressor.

21. The machine of claim 18, wherein the refrigerant is a two-phase liquid-vapor refrigerant.

22. The machine of claim 18, wherein the machine is configured to, while the pod is received in the receptacle of the evaporator, (i) open a bottom portion of the pod, and (ii)

dispense the produced single serving of the cooled food or drink from the opened bottom portion of the pod.

23. The machine of claim 18, wherein the plurality of channels of the evaporator comprise a plurality of longitudinal channels extending between one or more first manifolds defined by a top portion of the evaporator and one or more second manifolds defined by a bottom portion of the evaporator.

24. The machine of claim 18, wherein the processor is configured to control the refrigeration system to precool the receptacle by opening the control valve and causing refrigerant to flow through the primary and secondary paths and through the plurality of channels of the evaporator before the pod is received in the receptacle.

25. The machine of claim 18, wherein the processor is configured to control the opening of the control valve to control a temperature of refrigerant entering the evaporator.

26. The machine of claim 25, wherein the processor is configured to control the opening of the control valve based on an operating load or condition of the machine.

27. The machine of claim 26, wherein the operating load or condition comprises refrigerant temperature or pressure.

28. The machine of claim 25, wherein refrigerant exits the evaporator through an outlet port located at a bottom portion of the evaporator.

29. The machine of claim 28, wherein refrigerant enters the evaporator through an inlet port located at the bottom portion of the evaporator.

30. A machine for producing a single serving of a cooled food or drink from ingredients contained in a pod, the machine comprising a refrigeration system comprising:
   an evaporator defining a receptacle shaped and sized to receive the pod containing ingredients to produce the single serving of the cooled food or drink, the evaporator defining a plurality of channels for refrigerant, and the evaporator being movable between (i) an open configuration in which the pod is axially insertable into the receptacle and (ii) a closed configuration in which the pod is held in a fixed position within the receptacle;
   a condenser; and
   a working fluid loop from the evaporator, to the condenser, and back to the evaporator, the working fluid loop comprising:
      a primary path between the condenser and the evaporator;
      a first expansion device located along the primary path;
      a secondary path between the condenser and the evaporator and running in parallel to the primary path;
      a second expansion device located along the secondary path; and
      a control valve located along the secondary path and configured to selectively open the secondary path to supplement the primary path,
   wherein the machine is configured such that when the control valve is open refrigerant flows through the primary and secondary paths and through the plurality of channels of the evaporator to cool the ingredients in the pod while the pod containing the ingredients is received in the evaporator.

31. The machine of claim 30, wherein the first expansion device is a first expansion valve or capillary tube and the second expansion device is a second expansion valve or capillary tube.

32. The machine of claim 30, wherein the refrigeration system is configured such that refrigerant enters the evaporator at a lower pressure when the control valve is closed compared to when the control valve is open.

33. The machine of claim 30, wherein the refrigeration system is configured such that refrigerant flows through both the primary path and the secondary path when the control valve is open and refrigerant does not flow through the secondary path when the control valve is closed.

34. The machine of claim 30, wherein the refrigeration system comprises a rotary compressor and a bypass line connected from a first location between the rotary compressor and the condenser to a second location upstream of the evaporator.

35. The machine of claim 30, wherein the machine is configured to, while the pod is received in the receptacle of the evaporator, (i) open a bottom portion of the pod, and (ii) dispense the produced single serving of the cooled food or drink from the opened bottom portion of the pod.

36. The machine of claim 30, wherein the refrigeration system is configured to precool the receptacle defined by the evaporator before the pod containing the ingredients is received in the receptacle by flowing refrigerant through the primary and secondary paths and through the plurality of channels of the evaporator while the control valve is open.

37. The machine of claim 30, wherein the plurality of channels of the evaporator are integrally formed in one or more aluminum sidewalls of the evaporator, and inner surfaces of the one or more aluminum sidewalls define the receptacle.

38. The machine of claim 30, comprising a processor configured to:
   control the opening of the control valve; and
   control a movement of the evaporator from the closed configuration to the open configuration after dispensing the single serving of the produced food or drink from the pod to allow the pod to be removed from the receptacle.

39. The machine of claim 30, further comprising a processor configured to control the opening of the control valve to control an inlet temperature of refrigerant entering the evaporator.

40. The machine of claim 39, wherein the processor is configured to control the opening of the control valve based on a refrigerant temperature.

41. The machine of claim 39, wherein refrigerant enters the evaporator through an inlet port located at a bottom portion of the evaporator and refrigerant exits the evaporator through an outlet port located at the bottom portion of the evaporator.

* * * * *